United States Patent
Zeng et al.

(10) Patent No.: US 11,516,850 B2
(45) Date of Patent: Nov. 29, 2022

(54) METHOD FOR A MOBILE DEVICE TO TRANSMIT DATA IN A DORMANT STATE

(71) Applicant: HUAWEI TECHNOLOGIES CO., LTD., Shenzhen (CN)

(72) Inventors: Qinghai Zeng, Shanghai (CN);
Mingzeng Dai, Shanghai (CN);
Hongping Zhang, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 15/884,345

(22) Filed: Jan. 30, 2018

(65) Prior Publication Data

US 2018/0176963 A1   Jun. 21, 2018

Related U.S. Application Data

(63) Continuation of application No. PCT/CN2016/091704, filed on Jul. 26, 2016.

(30) Foreign Application Priority Data

Jul. 31, 2015   (CN) .......................... 201510464269.X

(51) Int. Cl.
*H04W 74/08*   (2009.01)
*H04L 5/00*   (2006.01)
*H04L 69/323*   (2022.01)
*H04W 72/04*   (2009.01)
*H04W 84/04*   (2009.01)

(52) U.S. Cl.
CPC ....... *H04W 74/0833* (2013.01); *H04L 5/0007* (2013.01); *H04L 69/323* (2013.01); *H04W 72/0413* (2013.01); *H04W 84/045* (2013.01)

(58) Field of Classification Search
CPC ......... H04W 74/0833; H04W 72/0413; H04W 74/08; H04W 84/045; H04L 5/0007; H04L 69/323
See application file for complete search history.

(56) References Cited

U.S. PATENT DOCUMENTS 6,693,892 B1 *  2/2004  Rinne ............... H04W 72/0446
                                                       370/329
8,514,779 B2 *  8/2013  Ozturk ................. H04L 1/0017
                                                       370/328

(Continued)

FOREIGN PATENT DOCUMENTS

CN      101064560 A      10/2007
CN      101695196 A       4/2010

(Continued)

OTHER PUBLICATIONS

U.S. Appl. No. 62/074,538, filed Nov. 3, 2014.*

*Primary Examiner* — Ian N Moore
*Assistant Examiner* — Rushil Parimal Sampat

(57) ABSTRACT

In the embodiments of the present invention, UE can complete, by using only two interaction steps instead of six steps in the prior art, a process of sending a data packet to an eNodeB. Even a random access process in the six steps in the prior art includes four interaction steps, and by contrast, in the embodiments, signaling that needs to be consumed on an eNodeB when the UE sends data can be significantly reduced. This is relatively suitable for a scenario in which small data or occasional data is sent.

18 Claims, 37 Drawing Sheets

(56) References Cited

U.S. PATENT DOCUMENTS

| | | | |
|---|---|---|---|
| 10,075,269 B2* | 9/2018 | Chun | H04L 27/26 |
| 2013/0010711 A1 | 1/2013 | Larsson et al. | |
| 2015/0049635 A1* | 2/2015 | Lee | H04W 4/21 |
| | | | 370/254 |
| 2015/0230204 A1* | 8/2015 | Lin | H04W 76/10 |
| | | | 370/312 |
| 2015/0312004 A1* | 10/2015 | Zhou | H04L 1/16 |
| | | | 370/330 |
| 2016/0127020 A1* | 5/2016 | Abraham | H04L 1/1829 |
| | | | 370/312 |
| 2016/0142939 A1* | 5/2016 | Yi | H04W 28/065 |
| | | | 370/329 |
| 2016/0143011 A1 | 5/2016 | Xia et al. | |
| 2016/0219593 A1* | 7/2016 | Ashraf | H04W 72/10 |
| 2021/0127417 A1* | 4/2021 | Lee | H04L 1/1893 |

FOREIGN PATENT DOCUMENTS

| | | |
|---|---|---|
| CN | 102158981 A | 8/2011 |
| CN | 102413476 A | 4/2012 |
| CN | 102740283 A | 10/2012 |
| CN | 102742337 A | 10/2012 |
| CN | 104144030 A | 11/2014 |
| EP | 2136592 A1 | 12/2009 |
| EP | 2365658 A1 | 9/2011 |
| WO | 2007073040 A1 | 6/2007 |
| WO | WO 2016/116166 A1 * | 1/2015 |
| WO | WO 2015008966 A1 * | 1/2015 |

* cited by examiner

METHOD FOR A MOBILE DEVICE TO TRANSMIT DATA IN A DORMANT STATE

CROSS-REFERENCE TO RELATED APPLICATIONS

This application is a continuation of International Application No. PCT/CN2016/091704, filed on Jul. 26, 2016, which claims priority to Chinese Patent Application No. 201510464269.X, filed on Jul. 31, 2015. The disclosures of the aforementioned applications are hereby incorporated by reference in their entireties.

TECHNICAL FIELD

The present invention relates to the communications field, and in particular, to a data sending method, apparatus, and system.

BACKGROUND

In an evolved packet core (EPC) system, user equipment (UE) enters an idle state when the user equipment does not transmit data for a long time.

When the UE in the idle state needs to send data, the UE needs to sequentially complete a random access process, a radio resource control (RRC) connection establishment process, a security activation process, a radio bearer establishment process, a data sending process, and an RRC connection release process with an evolved NodeB (Evolved Node Base station, eNodeB for short).

The UE in the idle state usually only needs to intermittently transmit a small quantity of data packets. For example, the UE sends one data packet to maintain a heartbeat signal between an application program and a background server in a public network. If the UE performs the foregoing six processes each time the UE sends a data packet, a large quantity of signaling needs to be consumed.

SUMMARY

To resolve a problem that a large quantity of signaling is consumed each time UE sends a data packet, embodiments of the present invention provide a data sending method, apparatus, and system. The technical solutions are as follows:

According to a first aspect, a data sending method is provided, and the method includes:

generating, by user equipment UE, a physical-layer-protocol-data-unit that carries a data packet;

sending, by the UE, the physical-layer-protocol-data-unit to a radio access network element by using an uplink contention data channel, where the uplink contention data channel is a channel where uplink data is transmitted based on contention; and receiving, by the UE, reception acknowledgement information sent by the radio access network element, where the reception acknowledgement information carries all or some data content of the physical-layer-protocol-data-unit.

In a first possible implementation of the first aspect, the generating, by UE, a physical-layer-protocol-data-unit that carries a data packet includes:

generating, when uplink timing advance is known, a physical-layer-protocol-data-unit that carries only the data packet; or generating, when the uplink timing advance is unknown, a physical-layer-protocol-data-unit that carries a synchronization code and the data packet.

With reference to the first possible implementation of the first aspect, in a second possible implementation of the first aspect, the generating, when the uplink timing advance is unknown, a physical-layer-protocol-data-unit that carries a synchronization code and the data packet includes:

selecting the synchronization code according to a service type of the data packet, where different service types correspond to respective synchronization codes; and generating the physical-layer-protocol-data-unit that carries the selected synchronization code and the data packet; or selecting a time-frequency resource location on the uplink contention data channel according to a modulation and coding scheme of the data packet, where different modulation and coding schemes correspond to respective time-frequency resource locations; and sending the physical-layer-protocol-data-unit to the radio access network element at the selected time-frequency resource location.

With reference to the first aspect, the first possible implementation of the first aspect, or the second possible implementation of the first aspect, in a third possible implementation of the first aspect, the sending, by the UE, the physical-layer-protocol-data-unit to a radio access network element by using an uplink contention data channel includes:

selecting a time-frequency resource location on the uplink contention data channel according to the service type of the data packet, where different service types correspond to respective time-frequency resource locations; and sending the physical-layer-protocol-data-unit to the radio access network element at the selected time-frequency resource location.

With reference to the first aspect, the first possible implementation of the first aspect, the second possible implementation of the first aspect, or the third possible implementation of the first aspect, in a fourth possible implementation of the first aspect, the data packet carries any one of the following types or any combination of the following types:

an IP packet;

an IP packet and an identifier of the UE;

an IP packet, an identifier of the UE, and an identifier of a home cell of the UE;

an IP packet and a first predetermined identifier, where the first predetermined identifier is used to indicate a target mobility management entity MME; or a second predetermined identifier, where the second predetermined identifier is used to indicate that the data packet is an uplink control message.

With reference to the first aspect, the first possible implementation of the first aspect, the second possible implementation of the first aspect, the third possible implementation of the first aspect, or the fourth possible implementation, in a fifth possible implementation of the first aspect, after the receiving, by the UE, reception acknowledgement information sent by the radio access network element, the method further includes:

detecting, according to the reception acknowledgement information, whether the physical-layer-protocol-data-unit is successfully received by the radio access network element; and if the physical-layer-protocol-data-unit is not successfully received by the radio access network element, resending the physical-layer-protocol-data-unit to the radio access network element.

With reference to the fifth possible implementation of the first aspect, in a sixth possible implementation of the first aspect, the resending the physical-layer-protocol-data-unit to the radio access network element includes:

resending the physical-layer-protocol-data-unit to the radio access network element by using the uplink contention data channel; or obtaining, from the reception acknowledgement information, an uplink resource and/or an uplink timing calibration value that are/is allocated by the radio access network element, and resending the physical-layer-protocol-data-unit to the radio access network element according to the uplink resource and/or the uplink timing calibration.

With reference to the fifth possible implementation of the first aspect, in a seventh possible implementation, the reception acknowledgement information further carries:

information about the time-frequency resource location occupied when the physical-layer-protocol-data-unit is transmitted on the uplink contention data channel, or information about the synchronization code.

According to a second aspect of the present invention, a data sending method is provided, and the method includes:

receiving, by a radio access network element by using an uplink contention data channel, a physical-layer-protocol-data-unit sent by user equipment UE, where the uplink contention data channel is a channel where uplink data is transmitted based on contention;

obtaining, by the radio access network element, a data packet from the physical-layer-protocol-data-unit;

sending, by the radio access network element, reception acknowledgement information to the UE, where the reception acknowledgement information carries all or some data content of the physical-layer-protocol-data-unit; and determining, by the radio access network element, a downstream network element according to information carried in the physical-layer-protocol-data-unit or a time-frequency resource location occupied when the physical-layer-protocol-data-unit is transmitted, and sending the data packet to the downstream network element.

In a first possible implementation of the second aspect, the obtaining, by the radio access network element, a data packet from the physical-layer-protocol-data-unit includes:

when uplink timing advance is known, directly obtaining the data packet from the physical-layer-protocol-data-unit; or when the uplink timing advance is unknown, performing uplink synchronization by using a synchronization code carried in the physical-layer-protocol-data-unit, and obtaining the data packet from the physical-layer-protocol-data-unit after the uplink synchronization is completed.

With reference to the second aspect or the first possible implementation of the second aspect, in a second possible implementation of the second aspect, the reception acknowledgement information further carries:

information about the time-frequency resource location occupied when the physical-layer-protocol-data-unit is transmitted on the uplink contention data channel, or information about the synchronization code.

With reference to the second aspect, the first possible implementation of the second aspect, or the second possible implementation of the second aspect, in a third possible implementation of the second aspect, the method further includes:

when failing to obtain the data packet from the physical-layer-protocol-data-unit, allocating an uplink transmission resource and/or an uplink timing calibration value to the UE, where the uplink transmission resource and/or the uplink timing calibration value are/is used to retransmit the physical-layer-protocol-data-unit; and adding the uplink transmission resource and/or the uplink timing calibration value to the reception acknowledgement information.

With reference to the second aspect, the first possible implementation of the second aspect, the second possible implementation of the second aspect, or the third possible implementation of the second aspect, in a fourth possible implementation of the second aspect, the downstream network element is a mobility management entity MME;

the determining, by the radio access network element, a downstream network element according to information carried in the physical-layer-protocol-data-unit or a time-frequency resource location occupied when the physical-layer-protocol-data-unit is transmitted includes:

obtaining an identifier of the UE that is carried in the data packet, and determining an MME corresponding to the identifier of the UE as a target MME; or obtaining a source IP address of an IP packet carried in the data packet, and determining an MME corresponding to the source IP address as a target MME; or obtaining a first predetermined identifier carried in the data packet, and determining an MME corresponding to the first predetermined identifier as the target MME; or determining, as the target MME, an MME corresponding to the synchronization code carried in the physical-layer-protocol-data-unit; or determining, as the target MME, an MME corresponding to the time-frequency resource location occupied when the physical-layer-protocol-data-unit is transmitted; and the sending, by the radio access network element, the data packet to the downstream network element specifically includes:

sending the data packet to the target MME.

With reference to the fourth possible implementation of the second aspect, in a fifth possible implementation of the second aspect, the sending, by the radio access network element, the data packet to the target MME includes:

sending the data packet to the target MME by using an S1-MME data channel corresponding to the UE; or sending the data packet to the target MME by using a newly added data channel between the radio access network element and the target MME.

With reference to the second aspect, the first possible implementation of the second aspect, the second possible implementation of the second aspect, or the third possible implementation of the second aspect, in a sixth possible implementation of the second aspect, the downstream network element is a data gateway; and the determining, by the radio access network element, a downstream network element according to information carried in the physical-layer-protocol-data-unit or a time-frequency resource location occupied when the physical-layer-protocol-data-unit is transmitted, and sending the data packet to the downstream network element specifically includes:

obtaining the IP packet from the data packet;

determining the data gateway according to an identifier of the UE that is carried in the data packet or a source IP address of the IP packet; and sending the IP packet to the data gateway.

With reference to the sixth possible implementation of the second aspect, in a seventh possible implementation of the second aspect, the data gateway is:

a packet data network gateway PDN-GW; or a local gateway of the radio access network element.

With reference to the seventh possible implementation of the second aspect, in an eighth possible implementation of the second aspect, the data gateway is the packet data network gateway PDN-GW; and the determining, by the radio access network element, the data gateway according to an identifier of the UE that is carried in the data packet or a source IP address of the IP packet includes:

searching, according to the identifier of the UE, for an S1-U data channel maintained for the UE, and sending the IP packet to a serving gateway SGW by using the S1-U data channel, so that the SGW sends the IP packet to the PDN-GW by using an S5 data channel corresponding to the S1-U data channel, and the PDN-GW sends the IP packet to a target device; or searching, according to the source IP address of the IP packet, for a target PDN-GW corresponding to the IP packet, and sending the IP packet to the target PDN-GW by using a first data channel established between the radio access network element and the target PDN-GW, so that the target PDN-GW sends the IP packet to a target device; or searching, according to the source IP address of the IP packet, for a target SGW corresponding to the IP packet, and sending the IP packet to the target S-GW by using a second data channel established between the radio access network element and the target SGW, so that the target S-GW sends the IP packet to the target PDN-GW by using a third data channel established between the target S-GW and the target PDN-GW, and the target PDN-GW sends the IP packet to a target device; or searching, according to the source IP address of the IP packet, for a target SGW and a target PDN-GW that correspond to the IP packet, and sending the IP packet to the target S-GW by using a routing function, so that the target S-GW sends the IP packet to the target PDN-GW by using a routing function, and the target PDN-GW sends the IP packet to a target device.

With reference to the second aspect, the first possible implementation of the second aspect, the second possible implementation of the second aspect, or the third possible implementation of the second aspect, in a ninth possible implementation of the second aspect, the downstream network element is a second radio access network element connected to the radio access network element; and the determining, by the radio access network element, a downstream network element according to information carried in the physical-layer-protocol-data-unit or a time-frequency resource location occupied when the physical-layer-protocol-data-unit is transmitted, and sending the data packet to the downstream network element specifically includes:

obtaining an identifier of a home cell of the UE from the data packet; and when the identifier of the home cell is an identifier of a cell that belongs to the second radio access network element, sending the data packet to the second radio access network element, so that the second radio access network element searches, according to an identifier of the UE, for an S1-U data channel maintained for the UE, the second radio access network element sends the IP packet to a serving gateway SGW by using the S1-U data channel, the SGW sends the IP packet to a PDN-GW by using an S5 data channel corresponding to the UE, and the PDN-GW sends the IP packet to a target device.

With reference to the second aspect, the first possible implementation of the second aspect, the second possible implementation of the second aspect, or the third possible implementation of the second aspect, in a tenth possible implementation of the second aspect, the downstream network element is a second radio access network element; and the determining, by the radio access network element, a downstream network element according to information carried in the physical-layer-protocol-data-unit or a time-frequency resource location occupied when the physical-layer-protocol-data-unit is transmitted, and sending the data packet to the downstream network element specifically includes:

obtaining a second predetermined identifier from the data packet, where the second predetermined identifier is used to indicate that the data packet is an uplink control message; and sending, to the second radio access network element according to the second predetermined identifier, a control instruction corresponding to the uplink control message.

According to a third aspect of the present invention, a data sending method is provided, and the method includes:

receiving, by a mobility management entity MME, a data packet sent by a radio access network element, where the data packet is obtained by the radio access network element from a received physical-layer-protocol-data-unit, the physical-layer-protocol-data-unit is sent by user equipment UE to the radio access network element by using an uplink contention data channel, and the uplink contention data channel is a channel where uplink data is transmitted based on contention;

obtaining, by the MME, an IP packet from the data packet; and sending, by the MME, the IP packet to a destination device by using a data gateway.

In a first possible implementation of the third aspect, the receiving, by an MME, a data packet sent by a radio access network element includes:

receiving the data packet by using an S1-MME data channel corresponding to the UE; or receiving the data packet by using a newly added data channel between the MME and the radio access network element.

With reference to the third aspect or the first possible implementation of the third aspect, in a second possible implementation of the third aspect, the data gateway is:

a packet data network gateway PDN-GW; or a local gateway of the MME.

With reference to the second possible implementation of the third aspect, in a third possible implementation of the third aspect, the data gateway is the packet data network gateway PDN-GW; and the sending, by the MME, the IP packet to a destination device by using a data gateway includes:

sending the IP packet to a serving gateway SGW by using an S11 data channel corresponding to the UE, so that the SGW sends the IP packet to the PDN-GW by using an S5 data channel corresponding to the UE, and the PDN-GW sends the IP packet to the target device; or searching, according to a source IP address of the IP packet, for a target PDN-GW corresponding to the IP packet, and sending the IP packet to the target PDN-GW by using a fourth data channel established between the MME and the target PDN-GW, so that the target PDN-GW sends the IP packet to the target device; or searching, according to a source IP address of the IP packet, for a target SGW corresponding to the IP packet, and sending the IP packet to the target S-GW by using a fifth data channel established between the MME and the target SGW, so that the target S-GW sends the IP packet to a target PDN-GW by using a sixth data channel established between the target S-GW and the target PDN-GW, and the target PDN-GW sends the IP packet to the target device; or searching, according to a source IP address of the IP packet, for a target SGW corresponding to the IP packet, and sending the IP packet to the target S-GW by using a routing function, so that the target S-GW sends the IP packet to a target PDN-GW by using a routing function, and the target PDN-GW sends the IP packet to the target device.

According to a fourth aspect of the present invention, a data sending apparatus is provided, and the apparatus includes:

a first processing module, configured to generate a physical-layer-protocol-data-unit that carries a data packet;

a first sending module, configured to send the physical-layer-protocol-data-unit to a radio access network element by using an uplink contention data channel, where the uplink contention data channel is a channel where uplink data is transmitted based on contention; and a first receiving module, configured to receive reception acknowledgement information sent by the radio access network element, where the reception acknowledgement information carries all or some data content of the physical-layer-protocol-data-unit.

In a first possible implementation of the fourth aspect, the first processing module is further configured to: when uplink timing advance is known, generate a physical-layer-protocol-data-unit that carries only the data packet; or the first processing module is further configured to: when the uplink timing advance is unknown, generate a physical-layer-protocol-data-unit that carries a synchronization code and the data packet.

With reference to the first possible implementation of the fourth aspect, in a second possible implementation of the fourth aspect, the first processing module is further configured to select the synchronization code according to a service type of the data packet, where different service types correspond to respective synchronization codes; and the first processing module is further configured to generate the physical-layer-protocol-data-unit that carries the selected synchronization code and the data packet; or the first processing module is further configured to select a time-frequency resource location on the uplink contention data channel according to a modulation and coding scheme of the data packet, where different modulation and coding schemes correspond to respective time-frequency resource locations; and the first sending module is further configured to send the physical-layer-protocol-data-unit to the radio access network element at the selected time-frequency resource location.

With reference to the fourth aspect, the first possible implementation of the fourth aspect, or the second possible implementation of the fourth aspect, in a third possible implementation of the fourth aspect, the first processing module is further configured to select a time-frequency resource location on the uplink contention data channel according to the service type of the data packet, where different service types correspond to respective time-frequency resource locations; and the first sending module is further configured to send the physical-layer-protocol-data-unit to the radio access network element at the selected time-frequency resource location.

With reference to the fourth aspect, the first possible implementation of the fourth aspect, the second possible implementation of the fourth aspect, or the third possible implementation of the fourth aspect, in a fourth possible implementation of the fourth aspect, the data packet carries any one of the following types or any combination of the following types:

an IP packet;

an IP packet and an identifier of the UE;

an IP packet, an identifier of the UE, and an identifier of a home cell of the UE;

an IP packet and a first predetermined identifier, where the first predetermined identifier is used to indicate a target mobility management entity MME; or a second predetermined identifier, where the second predetermined identifier is used to indicate that the data packet is an uplink control message.

With reference to the fourth aspect, the first possible implementation of the fourth aspect, the second possible implementation of the fourth aspect, the third possible implementation of the fourth aspect, or the fourth possible implementation of the fourth aspect, in a fifth possible implementation of the fourth aspect, the first receiving module is further configured to detect, according to the reception acknowledgement information, whether the physical-layer-protocol-data-unit is successfully received by the radio access network element; and the first sending module is further configured to: if the physical-layer-protocol-data-unit is not successfully received by the radio access network element, re-perform the step of sending the physical-layer-protocol-data-unit to the radio access network element by using the uplink contention data channel.

With reference to the fifth possible implementation of the fourth aspect, in a sixth possible implementation of the fourth aspect, the first sending module is further configured to resend the physical-layer-protocol-data-unit to the radio access network element by using the uplink contention data channel; or the first sending module is further configured to: obtain, from the reception acknowledgement information, an uplink resource and/or an uplink timing calibration value that are/is allocated by the radio access network element, and resend the physical-layer-protocol-data-unit to the radio access network element according to the uplink resource and/or the uplink timing calibration.

With reference to the fifth possible implementation of the fourth aspect, in a seventh possible implementation of the fourth aspect, the reception acknowledgement information further carries:

information about the time-frequency resource location occupied when the physical-layer-protocol-data-unit is transmitted on the uplink contention data channel, or information about the synchronization code.

According to a fifth aspect of the present invention, a data sending apparatus is provided, and the apparatus includes:

a second receiving module, configured to receive, by using an uplink contention data channel, a physical-layer-protocol-data-unit sent by user equipment UE, where the uplink contention data channel is a channel where uplink data is transmitted based on contention;

a second processing module, configured to obtain a data packet from the physical-layer-protocol-data-unit; and a second sending module, configured to send reception acknowledgement information to the UE, where the reception acknowledgement information carries all or some data content of the physical-layer-protocol-data-unit, where the second processing module is further configured to determine a downstream network element according to information carried in the physical-layer-protocol-data-unit or a time-frequency resource location occupied when the physical-layer-protocol-data-unit is transmitted; and the second sending module is further configured to send the data packet to the downstream network element.

In a first possible implementation of the fifth aspect, the second processing module is further configured to: when uplink timing advance is known, directly obtain the data packet from the physical-layer-protocol-data-unit; or the second processing module is further configured to: when the uplink timing advance is unknown, perform uplink synchronization by using a synchronization code carried in the physical-layer-protocol-data-unit, and obtain the data packet from the physical-layer-protocol-data-unit after the uplink synchronization is completed.

With reference to the fifth aspect or the first possible implementation of the fifth aspect, in a second possible implementation of the fifth aspect, the reception acknowledgement information further carries:

information about the time-frequency resource location occupied when the physical-layer-protocol-data-unit is transmitted on the uplink contention data channel, or information about the synchronization code.

With reference to the fifth aspect, the first possible implementation of the fifth aspect, or the second possible implementation of the fifth aspect, in a third possible implementation of the fifth aspect, the second processing module is configured to: when failing to obtain the data packet from the physical-layer-protocol-data-unit, allocate an uplink transmission resource and/or an uplink timing calibration value to the UE, where the uplink transmission resource and/or the uplink timing calibration value are/is used to retransmit the physical-layer-protocol-data-unit; and the second processing module is further configured to add the uplink transmission resource and/or the uplink timing calibration value to the reception acknowledgement information.

With reference to the fifth aspect, the first possible implementation of the fifth aspect, the second possible implementation of the fifth aspect, or the third possible implementation of the fifth aspect, in a fourth possible implementation of the fifth aspect, the downstream network element is a mobility management entity MME;

the second processing module is configured to: obtain an identifier of the UE that is carried in the data packet, and determine an MME corresponding to the identifier of the UE as a target MME; or obtain a source IP address of an IP packet carried in the data packet, and determine an MME corresponding to the source IP address as the target MME; or obtain a first predetermined identifier carried in the data packet, and determine an MME corresponding to the first predetermined identifier as the target MME; or determine, as the target MME, an MME corresponding to the synchronization code carried in the physical-layer-protocol-data-unit; or determine, as the target MME, an MME corresponding to the time-frequency resource location occupied when the physical-layer-protocol-data-unit is transmitted; and the second sending module is configured to send the data packet to the target MME.

With reference to the fourth possible implementation of the fifth aspect, in a fifth possible implementation of the fifth aspect, the second sending module is configured to send the data packet to the target MME by using an S1-MME data channel corresponding to the UE; or the second sending module is configured to send the data packet to the target MME by using a newly added data channel between the data sending apparatus and the target MME.

With reference to the fifth aspect, the first possible implementation of the fifth aspect, the second possible implementation of the fifth aspect, or the third possible implementation of the fifth aspect, in a sixth possible implementation of the fifth aspect, the downstream network element is a data gateway;

the second processing module is configured to obtain the IP packet from the data packet;

the second processing module is configured to determine the data gateway according to an identifier of the UE that is carried in the data packet or a source IP address of the IP packet; and the second sending module is configured to send the IP packet to the data gateway.

With reference to the sixth possible implementation of the fifth aspect, in a seventh possible implementation of the fifth aspect, the data gateway is:

a packet data network gateway PDN-GW; or a local gateway of the radio access network element.

With reference to the seventh possible implementation of the fifth aspect, in an eighth possible implementation of the fifth aspect, the data gateway is the packet data network gateway PDN-GW; and the second processing module is configured to search, according to the identifier of the UE, for an S1-U data channel maintained for the UE; and the second sending module is configured to send the IP packet to a serving gateway SGW by using the S1-U data channel, so that the SGW sends the IP packet to the PDN-GW by using an S5 data channel corresponding to the S1-U data channel, and the PDN-GW sends the IP packet to a target device; or the second processing module is configured to search, according to the source IP address of the IP packet, for a target PDN-GW corresponding to the IP packet; and the second sending module is configured to send the IP packet to the target PDN-GW by using a first data channel established between the data sending apparatus and the target PDN-GW, so that the target PDN-GW sends the IP packet to a target device; or the second processing module is configured to search, according to the source IP address of the IP packet, for a target SGW corresponding to the IP packet; and the second sending module is configured to send the IP packet to the target S-GW by using a second data channel established between the data sending apparatus and the target SGW, so that the target S-GW sends the IP packet to the target PDN-GW by using a third data channel established between the target S-GW and the target PDN-GW, and the target PDN-GW sends the IP packet to a target device; or the second processing module is configured to search, according to the source IP address of the IP packet, for a target SGW and a target PDN-GW that correspond to the IP packet; and the second sending module is configured to send the IP packet to the target S-GW by using a routing function, so that the target S-GW sends the IP packet to the target PDN-GW by using a routing function, and the target PDN-GW sends the IP packet to a target device.

With reference to the fifth aspect, the first possible implementation of the fifth aspect, the second possible implementation of the fifth aspect, or the third possible implementation of the fifth aspect, in a ninth possible implementation of the fifth aspect, the downstream network element is a second radio access network element connected to the radio access network element;

the second processing module is configured to obtain an identifier of a home cell of the UE from the data packet; and the second sending module is configured to: when the identifier of the home cell is an identifier of a cell that belongs to the second radio access network element, send the data packet to the second radio access network element, so that the second radio access network element searches, according to an identifier of the UE, for an S1-U data channel maintained for the UE, the second radio access network element sends the IP packet to a serving gateway SGW by using the S1-U data channel, the SGW sends the IP packet to a PDN-GW by using an S5 data channel corresponding to the UE, and the PDN-GW sends the IP packet to a target device.

With reference to the fifth aspect, the first possible implementation of the fifth aspect, the second possible implementation of the fifth aspect, or the third possible implementation of the fifth aspect, in a tenth possible implementation of the fifth aspect, the downstream network element is a second radio access network element;

the second processing module is configured to obtain a second predetermined identifier from the data packet, where the second predetermined identifier is used to indicate that the data packet is an uplink control message; and the second sending module is configured to send, to the second radio access network element according to the second predetermined identifier, a control instruction corresponding to the uplink control message.

According to a sixth aspect of the present invention, a data sending apparatus is provided, and the apparatus includes:

a third receiving module, configured to receive a data packet sent by a radio access network element, where the data packet is obtained by the radio access network element from a received physical-layer-protocol-data-unit, the physical-layer-protocol-data-unit is sent by user equipment UE to the radio access network element by using an uplink contention data channel, and the uplink contention data channel is a channel where uplink data is transmitted based on contention;

a third processing module, configured to obtain an IP packet from the data packet; and a third sending module, configured to send the IP packet to a destination device by using a data gateway.

In a first possible implementation of the sixth aspect, the third receiving module is configured to receive the data packet by using an S1-MME data channel corresponding to the UE; or the third receiving module is configured to receive the data packet by using a newly added data channel between the data sending apparatus and the radio access network element.

With reference to the sixth aspect or the first possible implementation of the sixth aspect, in a second possible implementation of the sixth aspect, the data gateway is:

a packet data network gateway PDN-GW; or a local gateway of the MME.

With reference to the second possible implementation of the sixth aspect, in a third possible implementation of the sixth aspect, the data gateway is the packet data network gateway PDN-GW; and the third sending module is configured to send the IP packet to a serving gateway SGW by using an S11 data channel corresponding to the UE, so that the SGW sends the IP packet to the PDN-GW by using an S5 data channel corresponding to the UE, and the PDN-GW sends the IP packet to the target device; or the third processing module is configured to search, according to a source IP address of the IP packet, for a target PDN-GW corresponding to the IP packet; and the third sending module is configured to send the IP packet to the target PDN-GW by using a fourth data channel established between the data sending apparatus and the target PDN-GW, so that the target PDN-GW sends the IP packet to the target device; or the third processing module is configured to search, according to a source IP address of the IP packet, for a target SGW corresponding to the IP packet; and the third sending module is configured to send the IP packet to the target S-GW by using a fifth data channel established between the data sending apparatus and the target SGW, so that the target S-GW sends the IP packet to a target PDN-GW by using a sixth data channel established between the target S-GW and the target PDN-GW, and the target PDN-GW sends the IP packet to the target device; or the third processing module is configured to search, according to a source IP address of the IP packet, for a target SGW corresponding to the IP packet; and the third sending module is configured to send the IP packet to the target S-GW by using a routing function, so that the target S-GW sends the IP packet to a target PDN-GW by using a routing function, and the target PDN-GW sends the IP packet to the target device.

The technical solutions provided in the embodiments of the present invention have the following beneficial effects:

UE can complete, by using only two interaction steps instead of six steps in the prior art, a process of sending a data packet to an eNodeB. Even a random access process in the six steps in the prior art includes four interaction steps, and by contrast, in the embodiments, only two interaction steps are required. Signaling that needs to be consumed when the UE sends data can be significantly reduced. This is relatively suitable for a scenario in which small data or occasional data is sent.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show only some embodiments of the present invention, and persons of ordinary skill in the art may still derive other drawings from these accompanying drawings without creative efforts.

DESCRIPTION OF EMBODIMENTS

To make the objectives, technical solutions, and advantages of the present invention clearer, the following further describes the embodiments of the present invention in detail with reference to the accompanying drawings.

Figure 1:
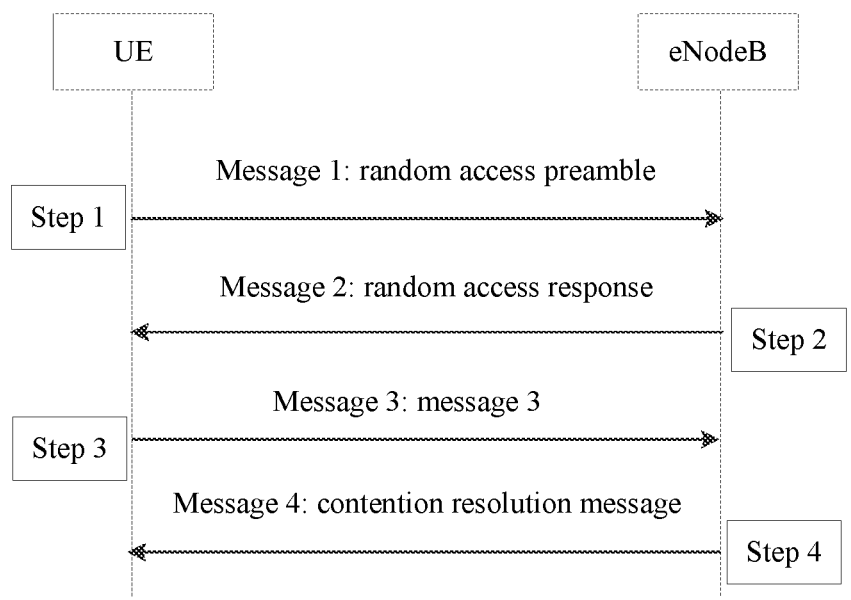
FIG. 1 is a schematic flowchart of a random access process in the prior art.

For ease of understanding of the embodiments of the present invention, a contention-based random access process in the prior art is briefly described first. Referring to FIG. 1, the contention-based random access process is a process in which UE in an idle state accesses an eNodeB in a contention manner.

Step 1: The UE sends a random access preamble to the eNodeB by using a PRACH.

The physical random access channel (Physical Random Access Channel, PRACH for short) is a channel used for random access.

The random access preamble is also referred to as a message 1. The random access preamble carries a preamble (English: Preamble). The preamble is used by the eNodeB to measure an uplink transmission delay between the UE and the eNodeB. The uplink transmission delay is related to a distance between the UE and the eNodeB.

The preamble is delivered by the eNodeB to the UE in advance in a system broadcast manner.

Step 2: The eNodeB sends a random access response to the UE by using a PDSCH.

The physical downlink shared channel (Physical Downlink Shared Channel, PDSCH for short) is a channel to which multiple UEs jointly listen.

The random access response (RAR) is also referred to as a message 2. The random access response carries an index of the received preamble, a temporary radio network temporary identifier (T-RNTI) allocated to the UE, timing advance (TA), grant information, and the like.

The UE determines, according to the random access response, whether the random access preamble sent by the UE is correctly received by the eNodeB.

Step 3: The UE sends a message 3 to the eNodeB by using a PUSCH.

Physical uplink shared channel (PUSCH)

After determining that the random access preamble is correctly received by the eNodeB, the UE sends the message 3 to the eNodeB according to the grant information in the message 2.

The message 3 usually includes an identifier of the UE or a random sequence generated by the UE.

Step 4: The eNodeB sends a contention resolution message to the UE by using the PDSCH.

Because multiple UEs may send a same random access preamble on a same PRACH resource, that is, when contention collision occurs, the multiple UEs may consider the message 2 as acknowledgements from the eNodeB for messages 1 sent by the multiple UEs.

The contention resolution message is also referred to as a message 4.

To resolve such a potential contention collision problem, the eNodeB adds all or some data content of a correctly decoded message 3 to the message 4, so that UE determines whether a message 3 received by the eNodeB is a message 3 sent by the UE. If the message 3 received by the eNodeB is the message 3 sent by the UE, the UE determines that the UE has completed a random access process. If the message 3 received by the eNodeB is not the message 3 sent by the UE, the UE attempts to perform a next random access process.

Figure 2A:
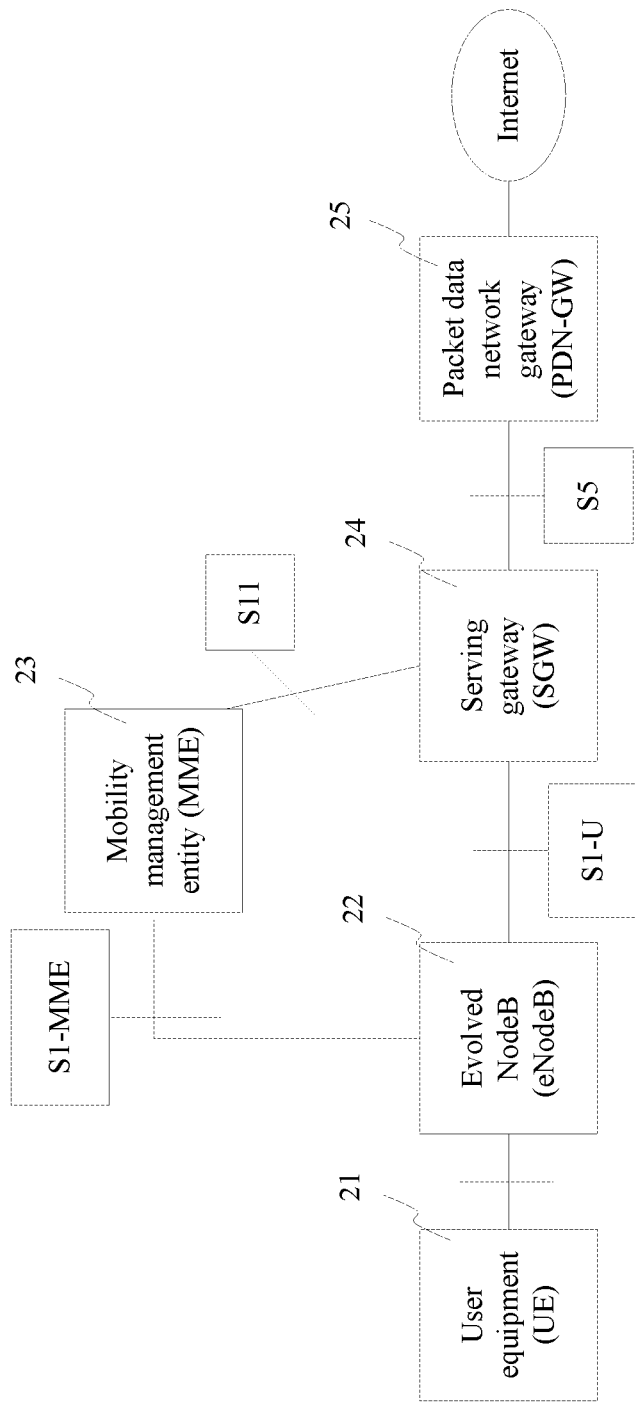
FIG. 2A to FIG. 2G are respectively schematic diagrams of architectures of data sending systems according to embodiments of the present invention.

Referring to FIG. 2A, FIG. 2A is a schematic structural diagram of a data sending system according to an embodiment of the present invention. The system includes user equipment 21, an evolved NodeB 22, a mobility management entity 23, a serving gateway 24, and a packet data network gateway 25.

The user equipment 21 is referred to as UE for short. The user equipment 21 and the evolved NodeB 22 are connected by using an air interface.

The evolved NodeB 22 is referred to as an eNodeB for short. The evolved NodeB 22 is connected to the mobility management entity 23 by using an S1-MME data channel.

The evolved NodeB 22 is further connected to the serving gateway 24 by using an S1-U data channel.

The mobility management entity (MME) 23 is connected to the serving gateway 24 by using an S11 data channel.

The serving gateway (SGW) 24 is connected to the packet data network gateway 25 by using an S5 data channel.

The packet data network gateway (Packet Data Network Gateway, PDN-GW for short) 25 is connected to the Internet.

It should be noted that each UE is corresponding to a respective S1-MME data channel, S1-U data channel, and S5 data channel.

Figure 2B:
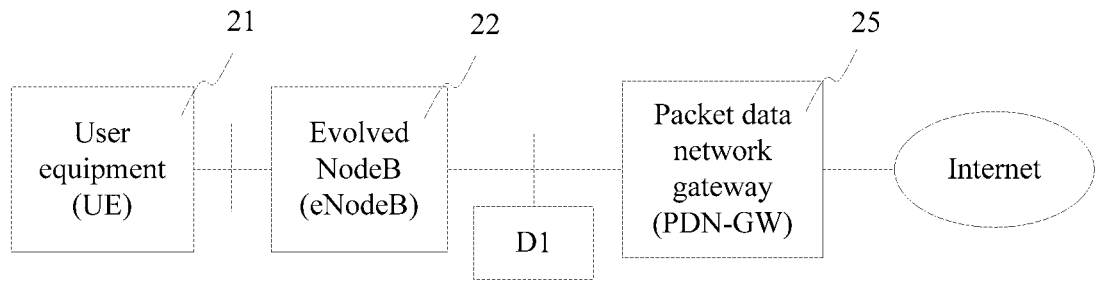

Referring to FIG. 2B, FIG. 2B is a schematic structural diagram of a data sending system according to another embodiment of the present invention. The system includes user equipment 21, an evolved NodeB 22, and a packet data network gateway 25.

Different from FIG. 2A, the evolved NodeB 22 is connected to the packet data network gateway 25 by using a newly established first data channel D1. If multiple packet data network gateways 25 exist, a first data channel D1 is established between the evolved NodeB 22 and each packet data network gateway 25.

The packet data network gateway 25 is connected to the Internet. The packet data network gateway 25 has a capability of sending an IP packet to a target device in the Internet.

Figure 2C:
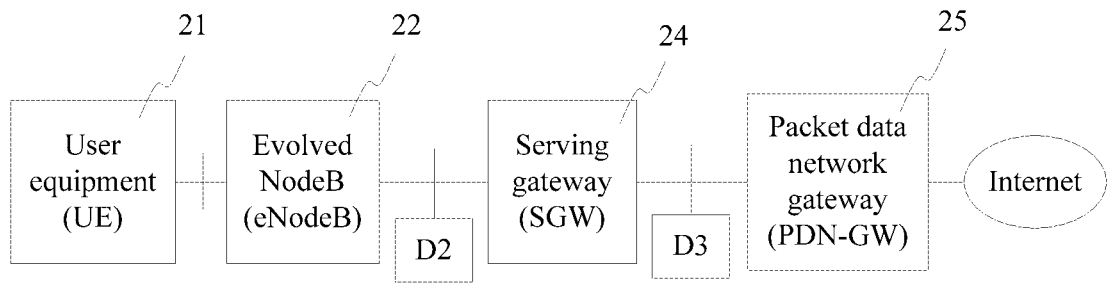

Referring to FIG. 2C, FIG. 2C is a schematic structural diagram of a data sending system according to another embodiment of the present invention. The system includes user equipment 21, an evolved NodeB 22, a serving gateway 24, and a packet data network gateway 25.

Different from FIG. 2A, the evolved NodeB 22 is connected to the serving gateway 24 by using a newly established second data channel D2. The serving gateway 24 is connected to the packet data network gateway 25 by using a newly established third data channel D3.

Figure 2D:
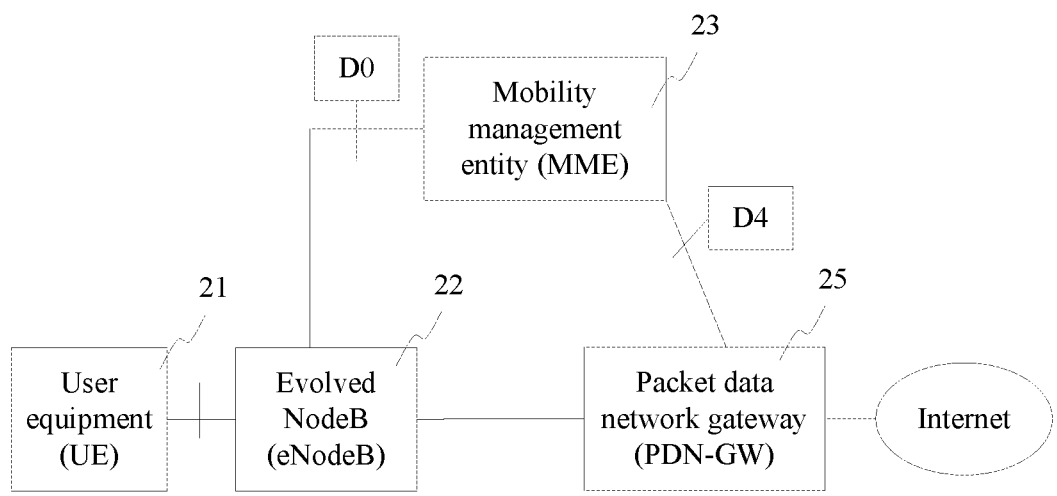

Referring to FIG. 2D, FIG. 2D is a schematic structural diagram of a data sending system according to another embodiment of the present invention. The system includes user equipment 21, an evolved NodeB 22, a mobility management entity 23, and a packet data network gateway 25.

Different from FIG. 2A, the evolved NodeB 22 and the mobility management entity 23 are connected by using a newly added data channel D0.

The mobility management entity 23 is connected to the packet data network gateway 25 by using a newly added fourth data channel D4. If multiple packet data network gateways 25 exist, a newly added fourth data channel D4 is established between the mobility management entity 23 and each packet data network gateway 25.

Figure 2E:
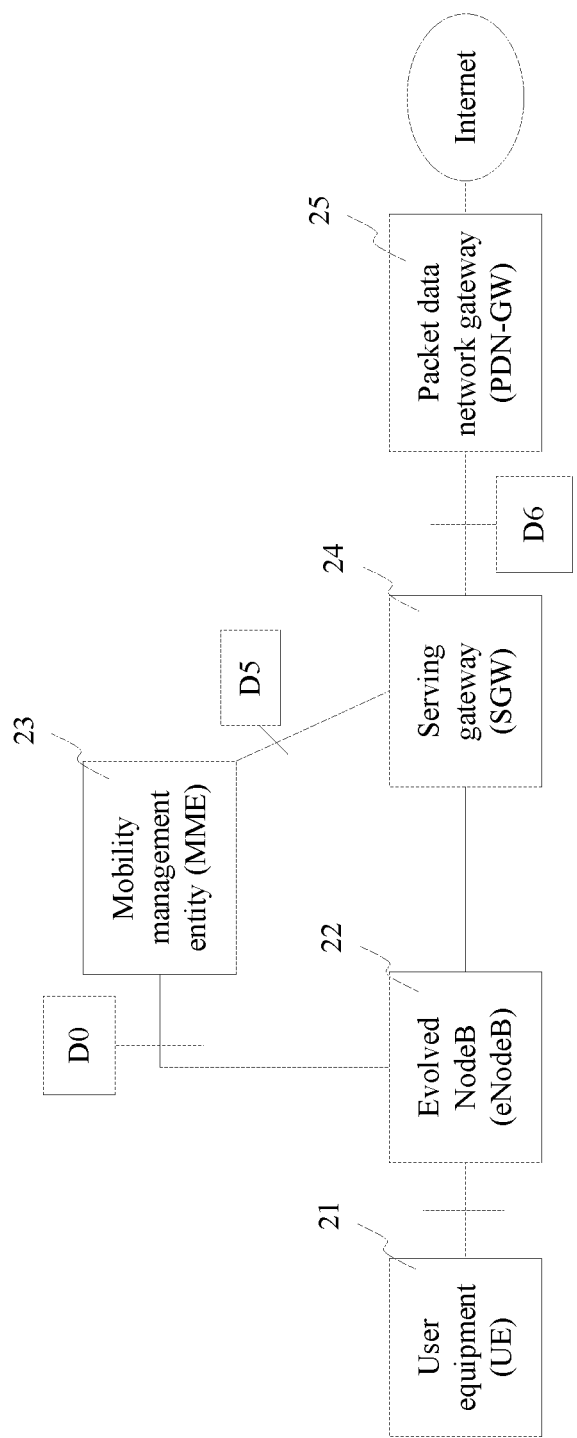

Referring to FIG. 2E, FIG. 2E is a schematic structural diagram of a data sending system according to another embodiment of the present invention. The system includes user equipment 21, an evolved NodeB 22, a mobility management entity 23, a serving gateway 24, and a packet data network gateway 25.

Different from FIG. 2A, the evolved NodeB 22 and the mobility management entity 23 are connected by using a newly added data channel D0.

The mobility management entity 23 is connected to the serving gateway 24 by using a newly added fifth data channel D5. The serving gateway 24 is connected to the packet data network gateway 25 by using a newly established sixth data channel D6.

Figure 2F:
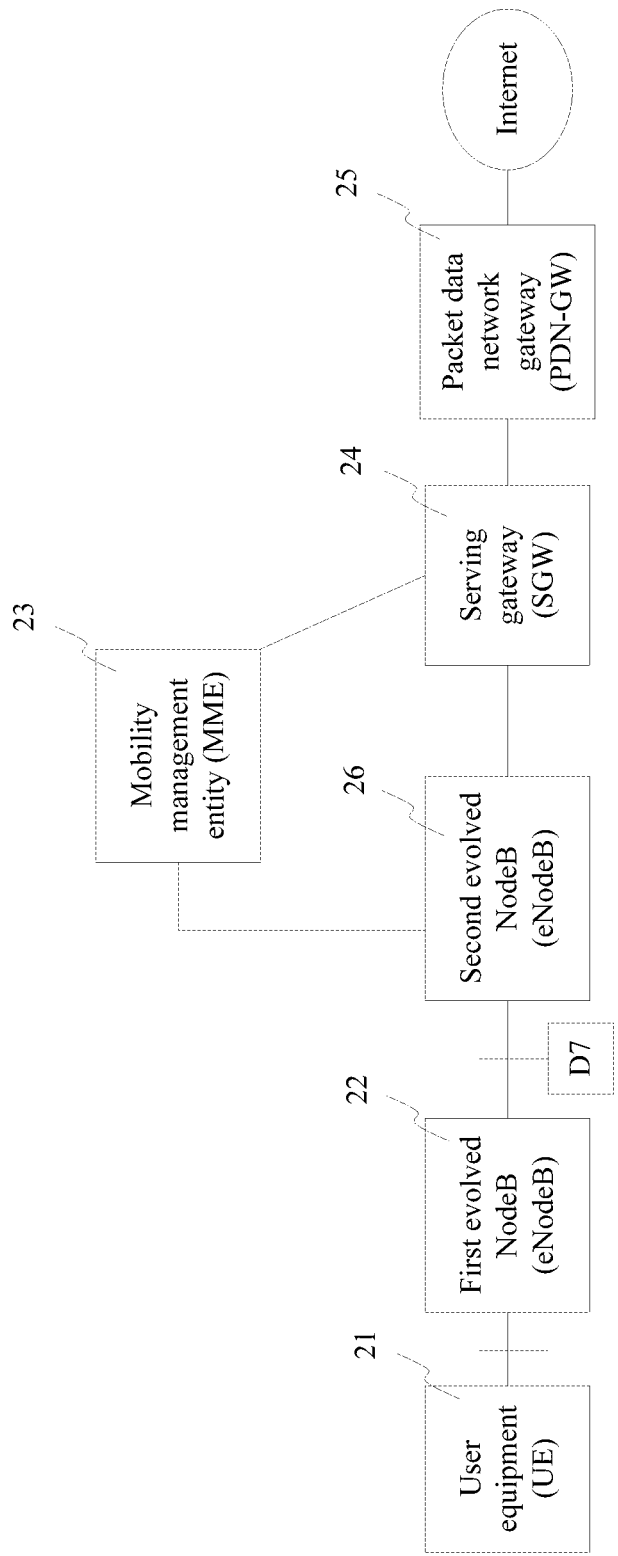

Referring to FIG. 2F, FIG. 2F is a schematic structural diagram of a data sending system according to another embodiment of the present invention. The system includes user equipment 21, a first evolved NodeB 22, a second evolved NodeB 26, a mobility management entity 23, a serving gateway 24, and a packet data network gateway 25.

Different from FIG. 2A, the first evolved NodeB 22 and the second evolved NodeB 26 are connected by using a newly established seventh data channel D7.

Figure 2G:
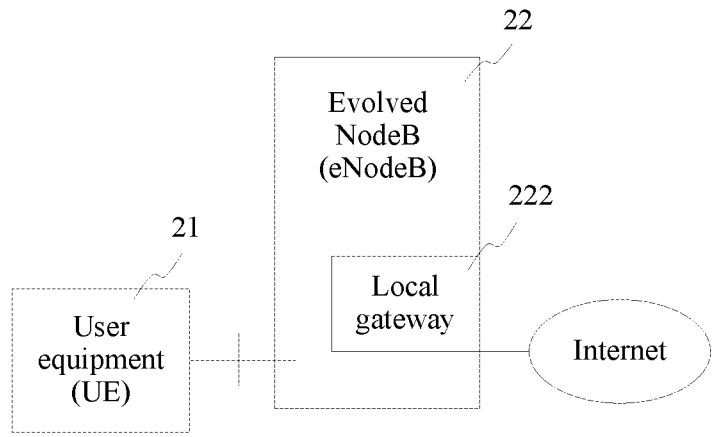

Referring to FIG. 2G; FIG. 2G is a schematic structural diagram of a data sending system according to another embodiment of the present invention. The system includes user equipment 21, an evolved NodeB 22, and a local gateway 222.

Different from FIG. 2A, the local gateway 222 is a gateway of the evolved NodeB 22. The local gateway 222 is directly connected to the Internet.

In the foregoing data sending systems, each radio access network element is an evolved NodeB. If a data sending system is another mobile communications system or a wireless communications system, such as a mobile communications system of a future version or a Wireless Fidelity (Wireless Fidelity, WiFi) network, a radio access network element may be another base station-type network element, a wireless router, or the like.

Figure 3:
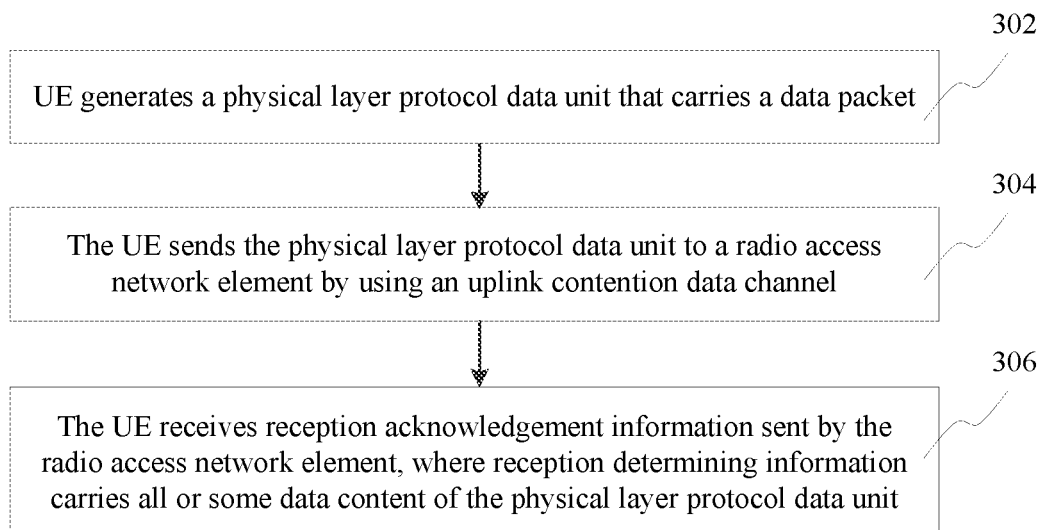
FIG. 3 is a flowchart of a data sending method according to an embodiment of the present invention.

Referring to FIG. 3, FIG. 3 is a flowchart of a data sending method according to an embodiment of the present invention. This embodiment is described by using an example in which the data sending method is applied to the UE shown in any one of FIG. 2A to FIG. 2G. The method includes the following steps:

Step 302: The UE generates a physical-layer-protocol-data-unit that carries a data packet.

In this embodiment, the UE is UE in an idle state, and a radio access network element is an eNodeB.

The UE in the idle state is UE that loses uplink synchronization with an eNodeB when the UE does not transmit data in preset duration.

When the UE in the idle state needs to send data, the UE generates the physical-layer-protocol-data-unit that carries the data packet. The physical-layer-protocol-data-unit is similar to a random access preamble. A difference lies in that the physical-layer-protocol-data-unit carries the data packet.

Step 304: The UE sends the physical-layer-protocol-data-unit to a radio access network element by using an uplink contention data channel.

The uplink contention data channel is similar to a PRACH channel. Both are channels on which uplink transmission is performed based on contention. A difference lies in that the PRACH channel is used only to transmit a random access preamble, but the uplink contention data channel is used to transmit a physical-layer-protocol-data-unit that includes a data packet.

Step 306: The UE receives reception acknowledgement information sent by the radio access network element, where reception determining information carries all or some data content of the physical-layer-protocol-data-unit.

The reception acknowledgement information is similar to a random access response, and is used by the UE to acknowledge whether the radio access network element successfully receives the physical-layer-protocol-data-unit, that is, whether the physical-layer-protocol-data-unit is successfully sent.

If the physical-layer-protocol-data-unit is successfully sent, the current transmission ends. If the physical-layer-protocol-data-unit is not successfully sent, step 304 is performed again.

In conclusion, according to the data sending method provided in this embodiment, UE in an idle state can complete, by using only two interaction steps instead of six steps in the prior art, a process of sending a data packet to an eNodeB. Even a random access process in the six steps in the prior art includes four interaction steps, and by contrast, in this embodiment, signaling that needs to be consumed on the eNodeB side when the UE sends data can be significantly reduced. This is relatively suitable for a scenario in which small data or occasional data is sent.

Figure 4:
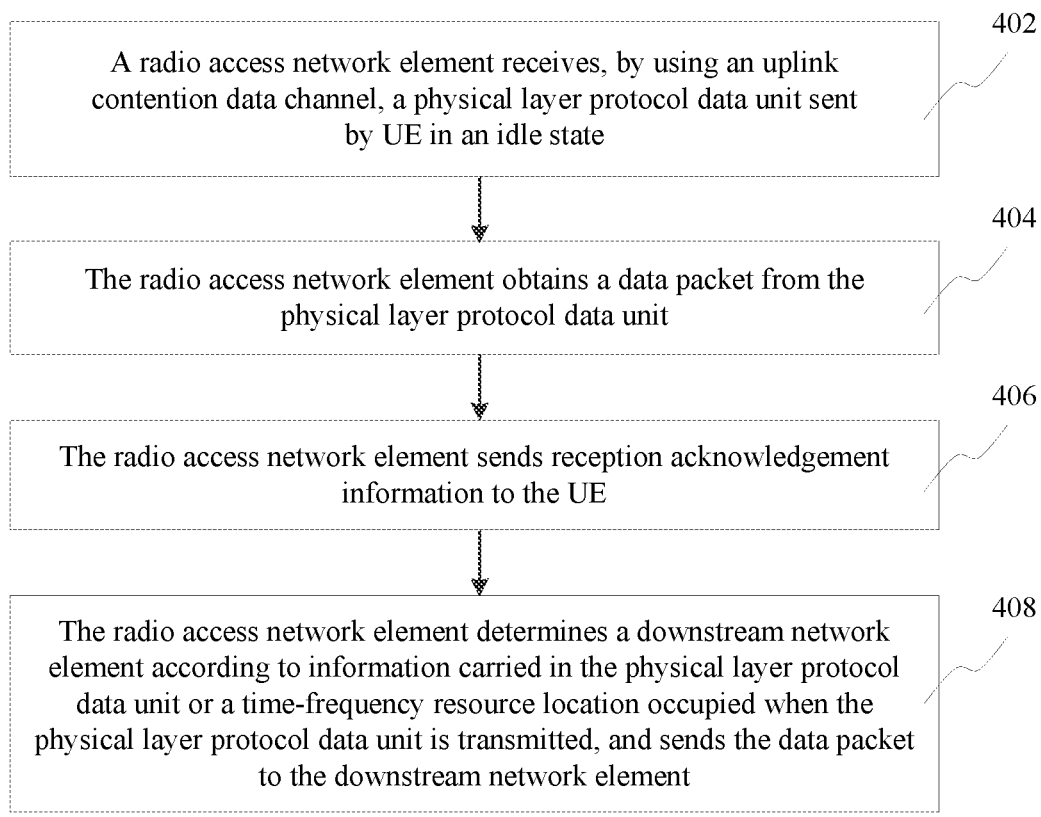
FIG. 4 is a flowchart of a data sending method according to another embodiment of the present invention.

Referring to FIG. 4, FIG. 4 is a flowchart of a data sending method according to an embodiment of the present invention. This embodiment is described by using an example in which the data sending method is applied to a radio access network element, and the radio access network element is the eNodeB shown in any one of FIG. 2A to FIG. 2G. The method includes the following steps:

Step 402: The radio access network element receives, by using an uplink contention data channel, a physical-layer-protocol-data-unit sent by UE in an idle state.

The uplink contention data channel is a channel where uplink data is transmitted based on contention.

Step 404: The radio access network element obtains a data packet from the physical-layer-protocol-data-unit.

Step 406: The radio access network element sends reception acknowledgement information to the UE.

The reception acknowledgement information carries all or some data content of the physical layer protocol unit.

Step 408: The radio access network element determines a downstream network element according to information carried in the physical-layer-protocol-data-unit or a time-frequency resource location or a code resource that is occupied when the physical-layer-protocol-data-unit is transmitted, and sends the data packet to the downstream network element.

The downstream network element is a network element located downstream of the radio access network element in terms of a transmission path of the data packet.

The downstream network element is configured to send the data packet to a target device in the Internet for processing, or the downstream network element directly processes the data packet.

In conclusion, according to the data sending method provided in this embodiment, a radio access network element can complete, by using only two interaction steps instead of six steps in the prior art, a process of sending a data packet by UE. Even a random access process in the six steps in the prior art includes four interaction steps, and by contrast, in this embodiment, signaling that needs to be consumed on an eNodeB when the UE sends data can be significantly reduced. This is relatively suitable for a scenario in which small data or occasional data is sent.

It should be noted that a communications system may include two types of uplink contention data channels. A first type of uplink contention data channel is an uplink contention data channel where UE sends uplink data in a "synchronous manner". A second type of uplink contention data channel is an uplink contention data channel where UE sends uplink data in an "asynchronous manner".

For the first type of uplink contention data channel, UE uses an uplink subframe boundary or an OFDM symbol boundary as a start location of a data block that carries uplink data, where the uplink subframe boundary or the OFDM symbol boundary is agreed in the communications system.

For the second type of uplink contention data channel, when UE transmits uplink data on the uplink contention data channel, a start location of a data block that carries the uplink data is not limited by an uplink subframe boundary or an OFDM symbol boundary, and the data block may be sent at any time.

The second type of uplink contention data channel has the following advantage: When there is to-be-transmitted uplink data, UE may immediately send the uplink data and does not need to wait for an agreed start location of a data block, so that the data can be rapidly transmitted.

In this embodiment of the present invention, the uplink contention data channel mainly indicates the second type of uplink contention data channel. However, alternatively, the uplink contention data channel may be the first type of uplink contention data channel. This is not limited herein.

Figure 5:
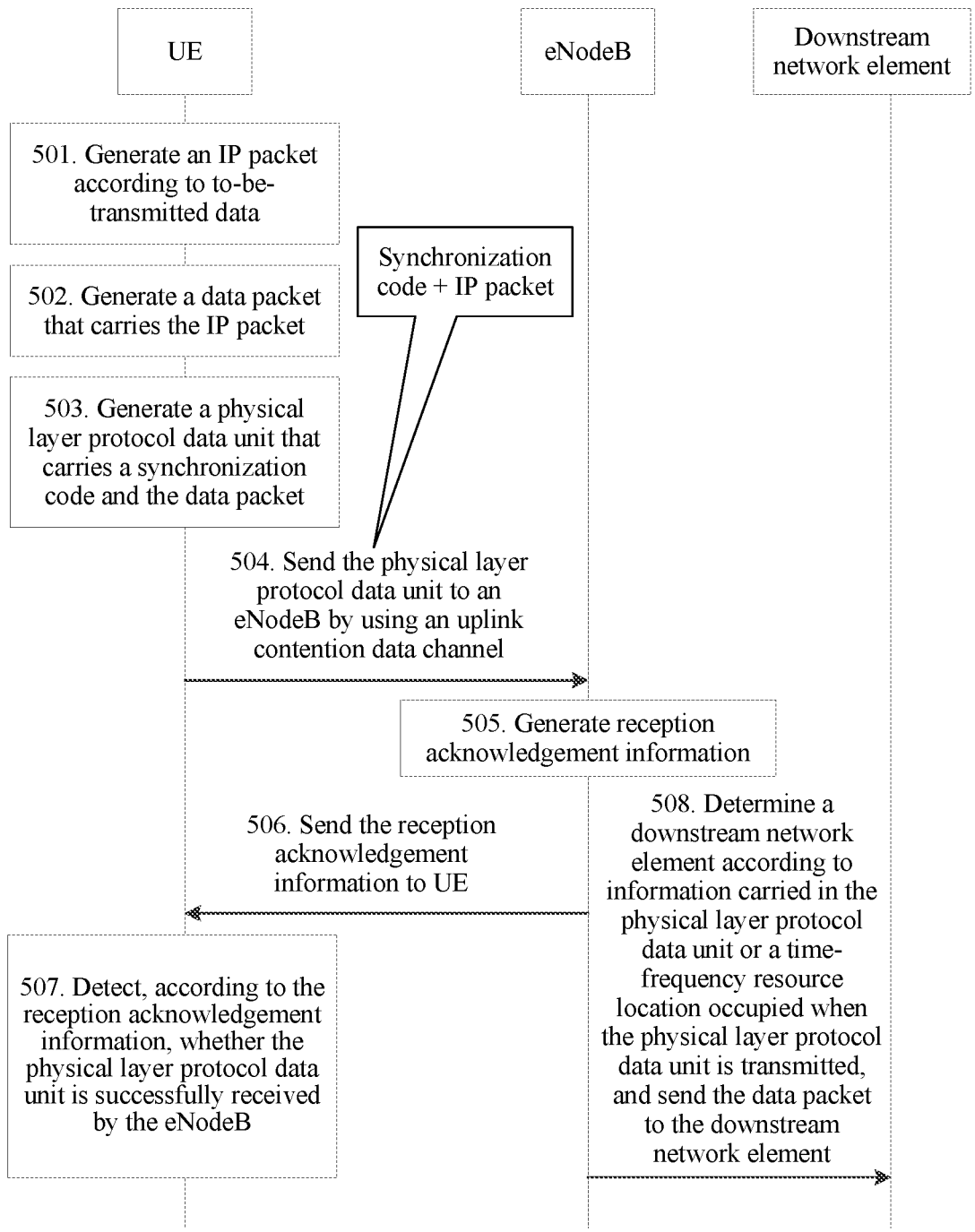
FIG. 5 is a flowchart of a data sending method according to another embodiment of the present invention.

Referring to FIG. 5, FIG. 5 is a flowchart of a data sending method according to another embodiment of the present invention. This embodiment is described by using an example in which the data sending method is applied to the data sending system shown in FIG. 2A. The method includes the following steps.

Step 501: UE generates an IP packet according to to-be-transmitted data.

In this embodiment, the UE is UE in an idle state, and a radio access network element is an eNodeB.

When the UE does not transmit data in preset duration, the UE enters the idle state. When entering the idle state, the UE deletes a context established between the UE and the eNodeB. Correspondingly, the eNodeB releases an S1-U data channel that is corresponding to the UE and that is between the eNodeB and an SGW. The UE in the idle state no longer maintains uplink synchronization with the eNodeB. Consequently, the UE loses uplink synchronization.

The UE in the idle state may need to transmit data to a background server in the Internet. For example, the UE intermittently sends a heartbeat signal to the background server.

The UE generates the IP packet according to the to-be-transmitted data. A source IP address of the IP packet is an IP address of the UE, and a destination IP address is an IP address of a target device in the Internet, for example, an IP address of the background server.

Step 502: The UE generates a data packet that carries the IP packet.

In some embodiments, the data packet is a NAS PDU message.

A control plane of an EPS includes a non-access stratum (NAS) and an access stratum (AS) of the UE from top to bottom. The AS stratum includes an RRC layer, a Packet Data Convergence Protocol (Packet Data Convergence Protocol, PDCP for short) layer, a Radio Link Control (Radio Link Control, RLC for short) layer, a Media Access Control (Media Access Control, MAC) layer, and a physical layer from top to bottom.

The NAS stratum of the UE encapsulates the IP packet in a form of a specific NAS message into a NAS message. The specific NAS message carries a predetermined identifier, such as a newly defined identifier value of the NAS message. The predetermined identifier is used to indicate that the NAS message carries the IP packet. In some embodiments, the NAS stratum of the UE further performs integrity protection on the NAS message.

Then, the NAS stratum of the UE uses the NAS message as the NAS PDU message and sends the NAS PDU message to the AS stratum of the UE. The RRC layer, the PDCP layer, the RLC layer, and the MAC layer in the AS stratum of the UE may perform transparent transmission processing on the NAS PDU message, and directly deliver the processed NAS PDU message to the physical layer for transmission.

The transparent transmission processing indicates that a current layer does not process data delivered by an upper layer, for example, does not add a corresponding protocol header.

Step 503: The UE generates a physical-layer-protocol-data-unit that carries a synchronization code and the data packet.

Because the UE loses uplink synchronization, and the UE is usually in a moving state, that is, uplink timing advance required for sending uplink data is unknown, the UE places the data packet after the synchronization code and generates the physical-layer-protocol-data-unit that carries the synchronization code and the data packet.

The synchronization code is one digit sequence agreed in advance or a group of digit sequences agreed in advance, and is similar to a group of preambles (Preamble) used in a random access process in a Long Term Evolution (Long Term Evolution, LTE for short) system, or is similar to a synchronization code in a Wireless Fidelity (WiFi) system.

In some embodiments, the physical-layer-protocol-data-unit may carry control information that is used to indicate a transport format of the data packet. The control information includes a modulation and coding scheme (Modulation and Coding Scheme, MCS for short), a size of a data block, and the like.

The eNodeB further publishes related information, such as an available time-frequency resource location and a period of an available time-frequency resource, of an uplink contention data channel in broadcast information.

Step 504: The UE sends the physical-layer-protocol-data-unit to an eNodeB by using an uplink contention data channel.

Several available time-frequency resource locations are provided on the uplink contention data channel, and the UE selects, from the available time-frequency resource locations according to a principle of proximity, a random principle, or another principle, a time-frequency resource location used in the current transmission.

The UE sends the physical-layer-protocol-data-unit at the selected time-frequency resource location.

The eNodeB receives the physical-layer-protocol-data-unit at a corresponding time-frequency resource location.

Step 505: The eNodeB generates reception acknowledgement information.

The eNodeB may receive, in a time period, physical-layer-protocol-data-unit s sent by several UEs.

The eNodeB performs uplink synchronization with each UE according to a synchronization code in each physical-layer-protocol-data-unit, and obtains a data packet from the physical-layer-protocol-data-unit after the uplink synchronization. In other words, the eNodeB performs uplink synchronization with UE according to a synchronization code in each physical-layer-protocol-data-unit by means of coherence detection. If more than one synchronization code is available, the eNodeB further identifies a synchronization code by means of coherence detection.

The eNodeB generates reception acknowledgement information according to a successfully received physical-layer-protocol-data-unit.

The reception acknowledgement information includes: a time-frequency resource location occupied when the physical-layer-protocol-data-unit is transmitted, and all data content or some captured data content of the physical-layer-protocol-data-unit.

If a synchronization code is a group of digit sequences agreed in advance, the reception acknowledgement information further alternatively includes an index of the synchronization code, so as to explicitly indicate a specific synchronization code that is received and a corresponding time-frequency resource location for receiving each synchronization code. Specifically, a time-frequency resource location is represented by using an index of a synchronization code and an index of a time-frequency resource location for receiving the synchronization code. For example, reception acknowledgement information is shown in the following Table 1:

| Index of a synchronization code 1 | Index of a time-frequency resource location for receiving the synchronization code 1 | Captured n-digit sequence |
|---|---|---|
| Index of a synchronization code 2 | Index of a time-frequency resource location for receiving the synchronization code 2 | Captured n-digit sequence |
| Index of a synchronization code 3 | Index of a time-frequency resource location for receiving the synchronization code 3 | Captured n-digit sequence |
| Index of a synchronization code 4 | Index of a time-frequency resource location for receiving the synchronization code 4 | Captured n-digit sequence |
| Index of a synchronization code 5 | Index of a time-frequency resource location for receiving the synchronization code 5 | Captured n-digit sequence |
| ... | ... | ... |

A form of the captured data content is not limited. The captured data content may be:

an n-digit sequence located at a tail of the physical-layer-protocol-data-unit, where n is a positive integer.

Alternatively, when the data packet carries an identifier of the UE, the captured data content is the identifier of the UE.

Alternatively, when the data packet carries an identifier of the UE and an identifier of a home cell, the captured data content is the identifier of the UE and the identifier of the home cell.

The reception acknowledgement information may be all carried on a PDSCH. Alternatively, similar to a random access response message in the LTE system, information about a time-frequency resource location for receiving a synchronization code is carried on a physical downlink control channel (PDCCH). That is, an RA radio network temporary identifier (RA-RNTI) is used to scramble scheduling signaling of the reception acknowledgement information. Different RA-RNTIs correspond to different time-frequency resource locations on the uplink contention data channel.

Step 506: The eNodeB sends the reception acknowledgement information to the UE.

The eNodeB may send the reception acknowledgement information to the UE by using the PDSCH channel.

Correspondingly, because the PDSCH channel is a channel of a broadcast type, each UE receives the reception acknowledgement information.

Step 507: The UE detects, according to the reception acknowledgement information, whether the physical-layer-protocol-data-unit is successfully received by the eNodeB.

The UE detects whether the synchronization code used in the current transmission exists in the reception acknowledgement information. If the synchronization code used in the current transmission exists, the UE detects whether the time-frequency resource location for receiving the synchronization code by the eNodeB is consistent with the time-frequency resource location used in the current transmission. If the time-frequency resource location for receiving the synchronization code by the eNodeB is consistent with the time-frequency resource location used in the current transmission, the UE detects whether the data content carried in the reception acknowledgement information is consistent with content at a corresponding location of the physical-layer-protocol-data-unit sent this time. If the data content carried in the reception acknowledgement information is consistent with the content at the corresponding location of the physical-layer-protocol-data-unit sent this time, the UE determines that the physical-layer-protocol-data-unit sent this time is successfully received by the eNodeB.

If a detection result of any step in the three-step detection process fails to meet a corresponding condition, the UE determines that the physical-layer-protocol-data-unit sent this time is not successfully received by the eNodeB, and the UE attempts to resend the physical-layer-protocol-data-unit to the eNodeB.

It should be noted that the first two steps in the foregoing detection process are not necessarily performed in a particular sequence. The time-frequency resource location may be first detected, and then the synchronization code is detected.

It should be additionally noted that, if the eNodeB successfully obtains the synchronization code from the physical layer protocol unit, but fails to obtain the data packet, or if the eNodeB successfully obtains, from the physical layer protocol unit, the control information that indicates the transport format of the data packet, but fails to obtain the data packet, in some embodiments, in step 505, the eNodeB allocates an uplink transmission resource and/or an uplink timing calibration value to the UE sending the synchronization code or the control information, adds the uplink transmission resource and/or the uplink timing calibration value to the reception acknowledgement information, and sends the reception acknowledgement information to the UE.

The control information includes the MCS, the size of the data block, and the like.

When the UE resends the physical-layer-protocol-data-unit to the eNodeB, in a possible implementation, the UE resends the physical-layer-protocol-data-unit to the eNodeB by using the uplink contention data channel. In another possible implementation, the UE obtains, from the reception acknowledgement information, the uplink resource and/or the uplink timing calibration value that are/is allocated by the eNodeB, and resends the physical-layer-protocol-data-unit to the eNodeB according to the uplink resource and/or the uplink timing calibration.

Step 508: The eNodeB determines a downstream network element according to information carried in the physical-layer-protocol-data-unit or a time-frequency resource location or a code resource that is occupied when the physical-layer-protocol-data-unit is transmitted, and sends the data packet to the downstream network element.

The downstream network element sends the data packet to the target device in the Internet, or the downstream network element processes the data packet.

The data packet carries the IP packet. The IP packet is usually sent by the UE to the target device in the Internet.

Figure 6A:
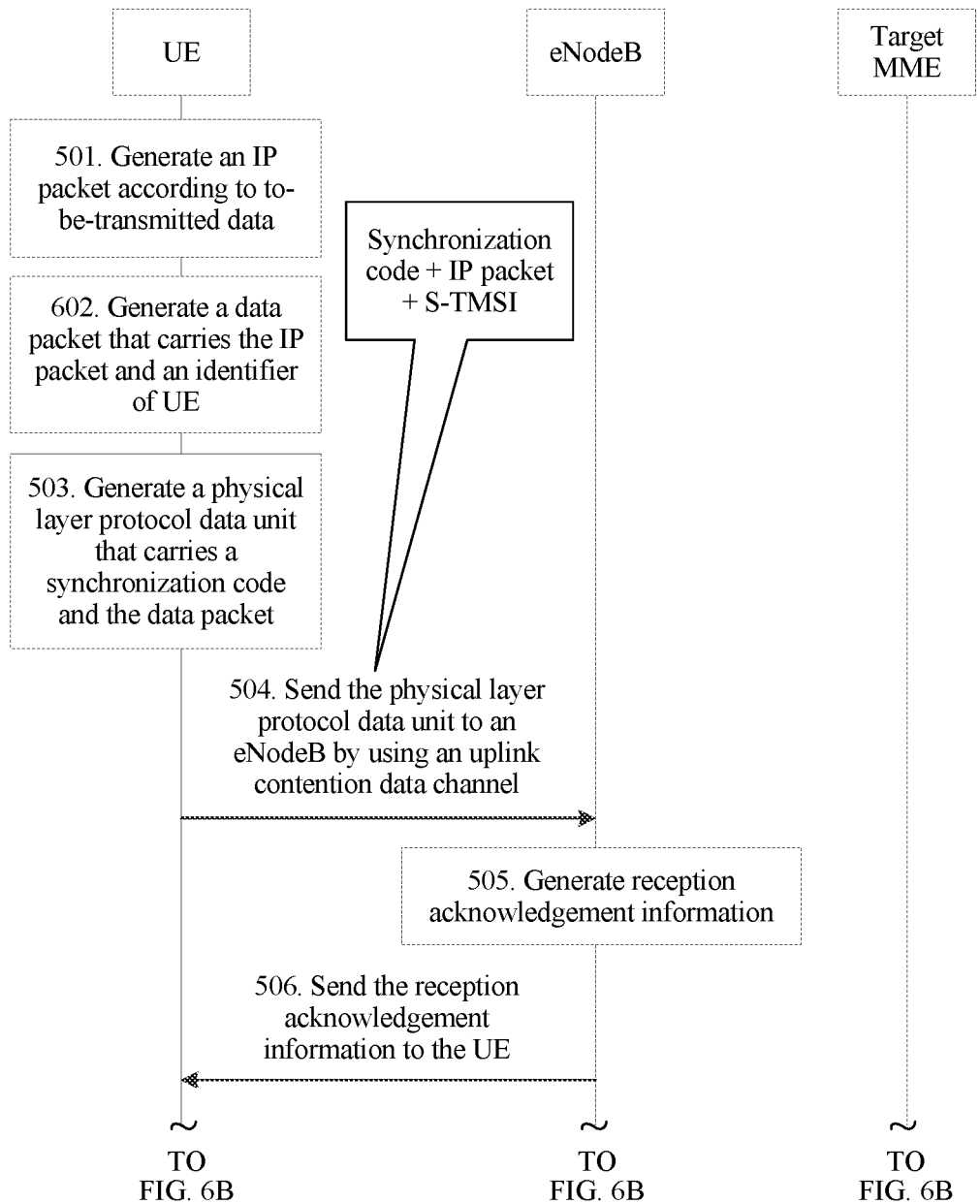
FIG. 6A and FIG. 6B are a flowchart of a data sending method according to another embodiment of the present invention.
Figure 6B:
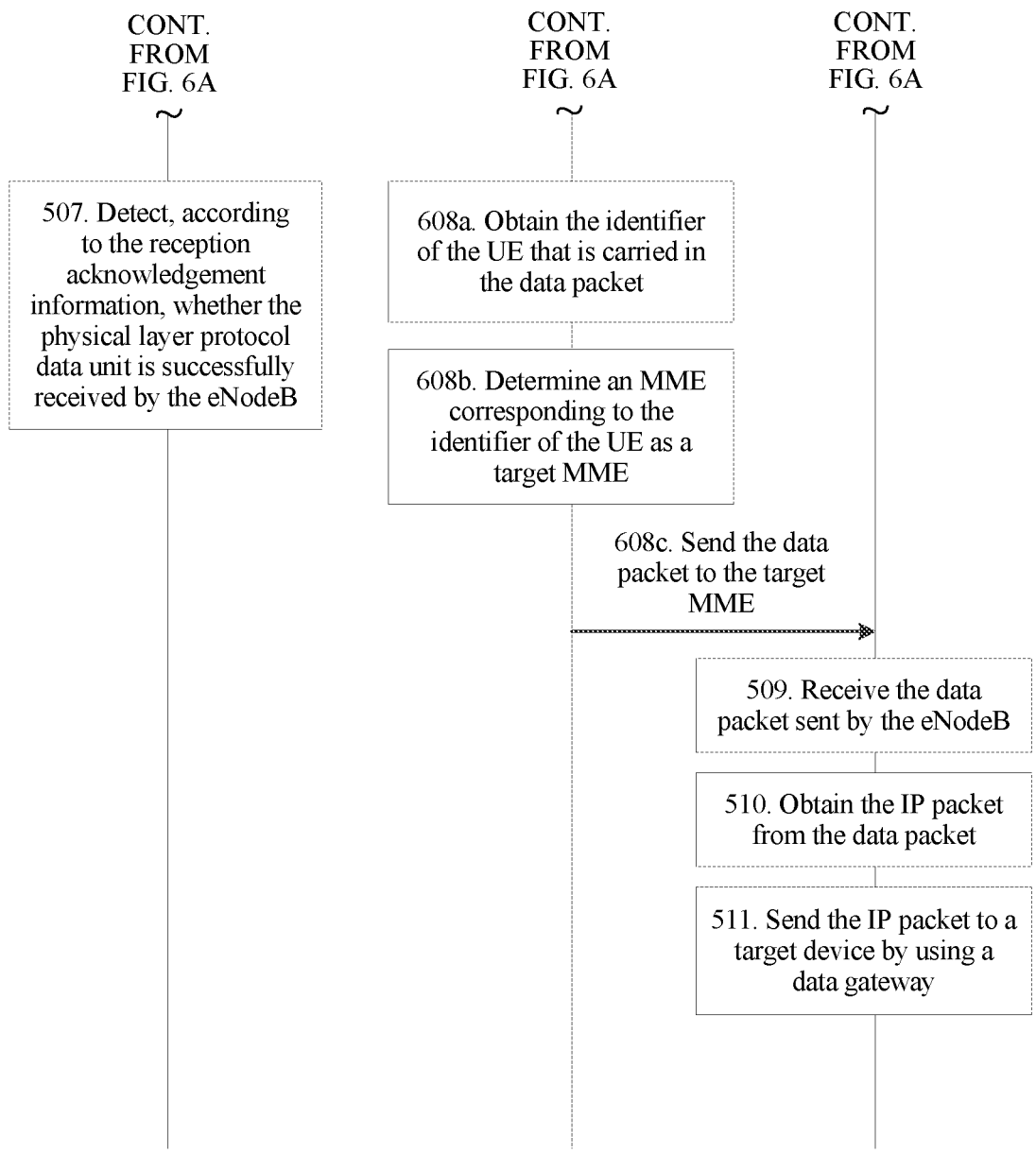

Corresponding to the data sending systems shown in FIG. 2A, FIG. 2D, and FIG. 2E, the downstream network element of the eNodeB is an MME. When at least two MMEs exist, the eNodeB needs to determine a target MME, and forwards the data packet to the target MME. As shown in FIG. 6A and FIG. 6B, step 502 may be replaced with step 602, and step 508 may be replaced with step 608*a* to step 608*c*.

Step 602: The UE generates a data packet that carries the IP packet and an identifier of the UE.

The identifier of the UE may be a system architecture evolution-temporary mobile subscriber identity (System Architecture Evolution-Temporary Mobile Subscriber Identity, S-TMSI for short).

In some embodiments, a NAS stratum of the UE uses a NAS message that carries the IP packet as a NAS PDU message, and sends the NAS PDU message to an AS stratum of the UE. An RRC layer in the AS stratum of the UE encapsulates the NAS PDU message and the S-TMSI into an RRC message. A PDCP layer, an RLC layer, and a MAC layer in the AS stratum may perform transparent transmission processing on the RRC message, and directly deliver the processed RRC message to a physical layer for transmission.

Step 608*a*: The eNodeB obtains the identifier of the UE that is carried in the data packet.

The eNodeB obtains the NAS PDU message and the S-TMSI from the RRC message.

Step 608*b*: The eNodeB determines an MME corresponding to the identifier of the UE as a target MME.

The eNodeB searches for the MME corresponding to the S-TMSI.

Step 608*c*: The eNodeB sends the data packet to the target MME.

The eNodeB sends the RRC message to the target MME.

For transferring a data packet between an eNodeB and an MME, an S1-MME data channel needs to be established between the eNodeB and the MME for each UE according to an S-TMSI. The eNodeB sends a data packet to a target MME by using an S1-MME data channel corresponding to UE, and the target MME receives the data packet by using the S1-MME data channel corresponding to the UE. The MME identifies the source UE of the data packet according to the source S1-MME data channel of the data packet.

The data sending method further includes the following steps.

Step 509: The target MME receives the data packet sent by the eNodeB.

Step 510: The target MME obtains the IP packet from the data packet.

The target MME determines, by using a predetermined identifier in the data packet, that the data packet is a data packet that carries the IP packet, and the target MME obtains the IP packet from the data packet.

If the UE performs integrity protection on the IP packet, the target MME needs to perform integrity check on the IP packet.

Step 511: The target MME sends the IP packet to a target device by using a data gateway.

Figure 7A:
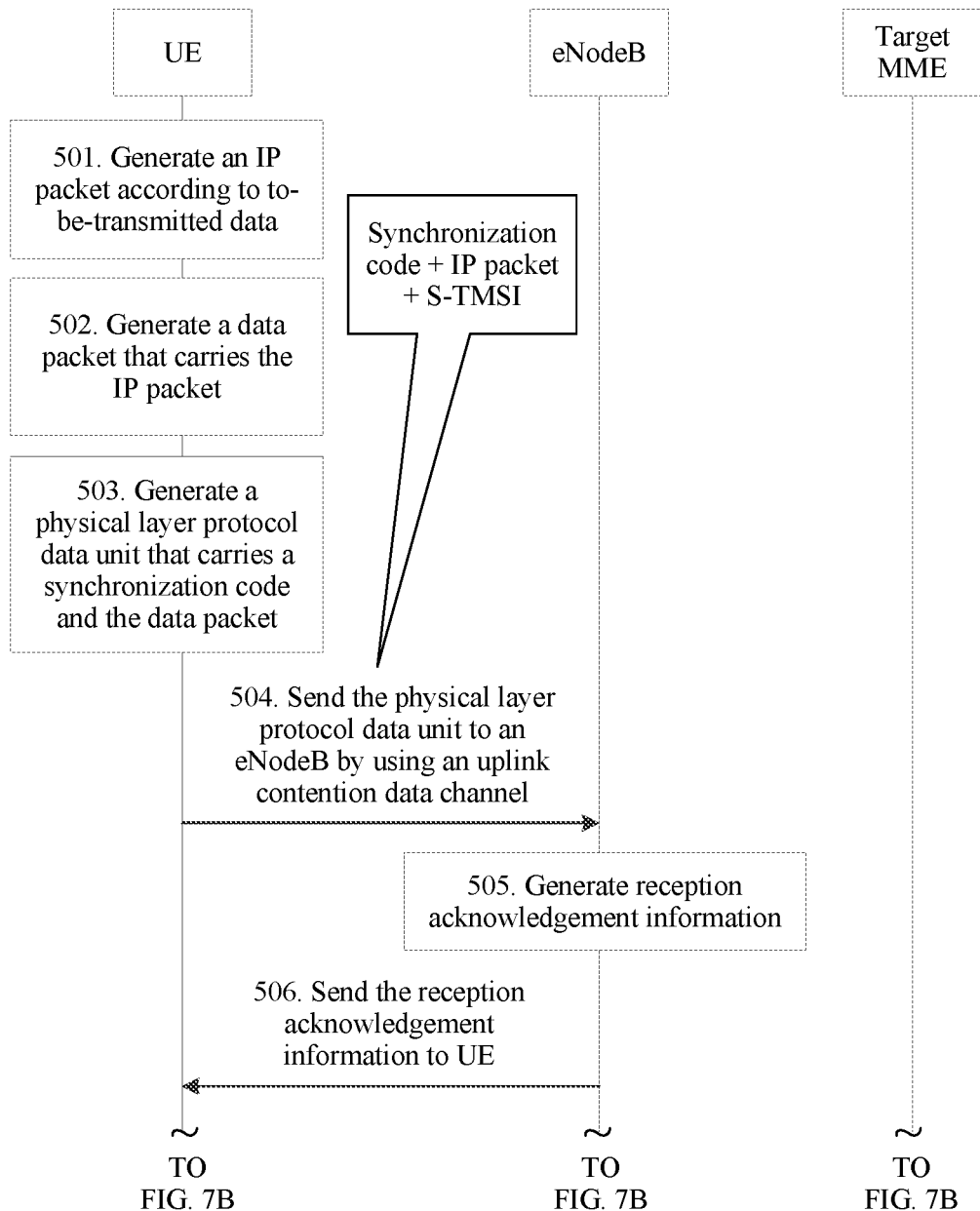
FIG. 7A and FIG. 7B are a flowchart of a data sending method according to another embodiment of the present invention.
Figure 7B:
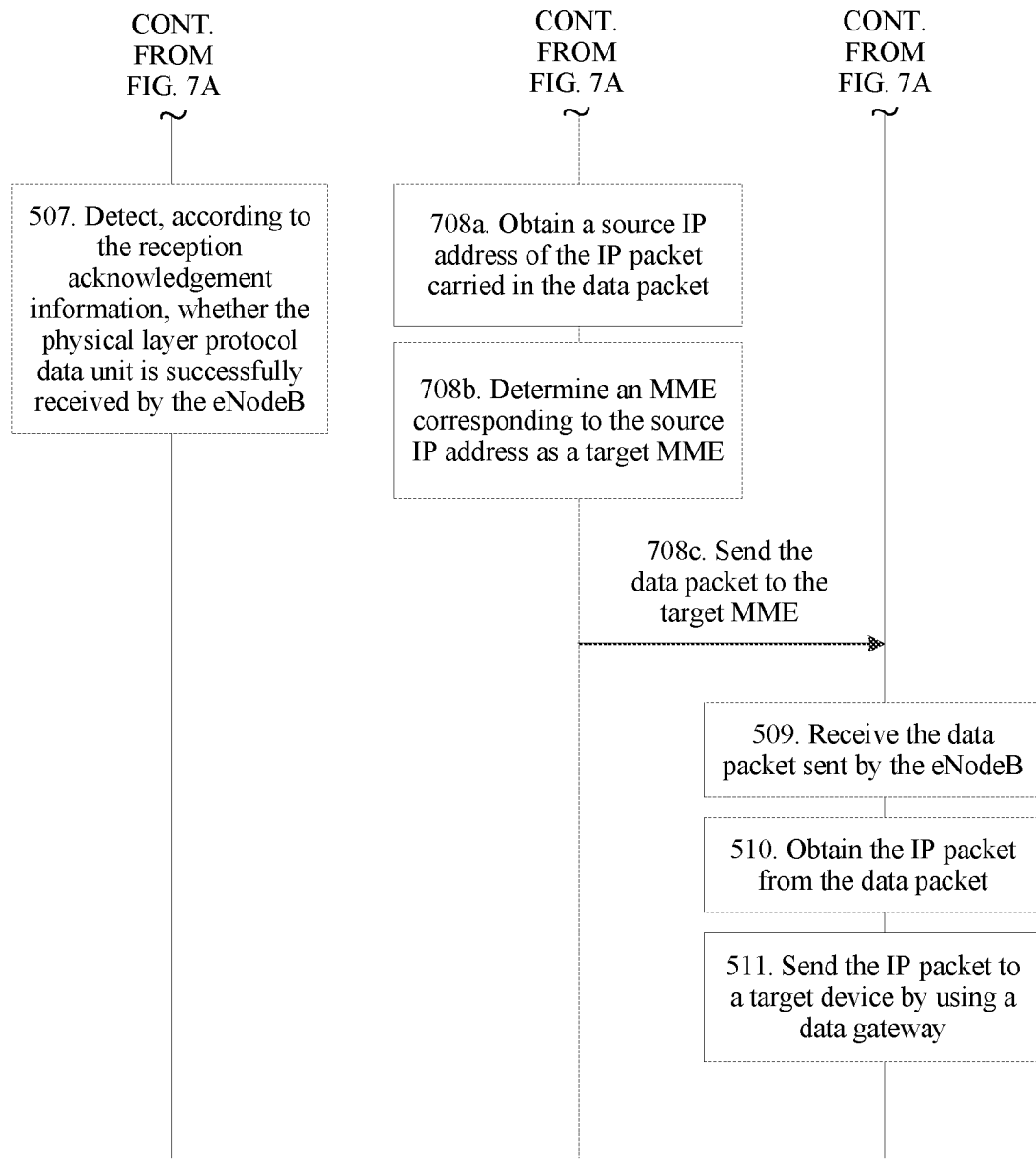

In another possible implementation, the eNodeB may determine a target MME by using a source IP address of the IP packet carried in the data packet. In this case, as shown in FIG. 7A and FIG. 7B, the UE does not need to add an S-TMSI to the data packet, and step 508 may be replaced with step 708*a* to step 708*c*.

Step 708*a*: The eNodeB obtains a source IP address of the IP packet carried in the data packet.

Step 708*b*: The eNodeB determines an MME corresponding to the source IP address as a target MME.

Step 708*c*: The eNodeB sends the data packet to the target MME.

Figure 8A:
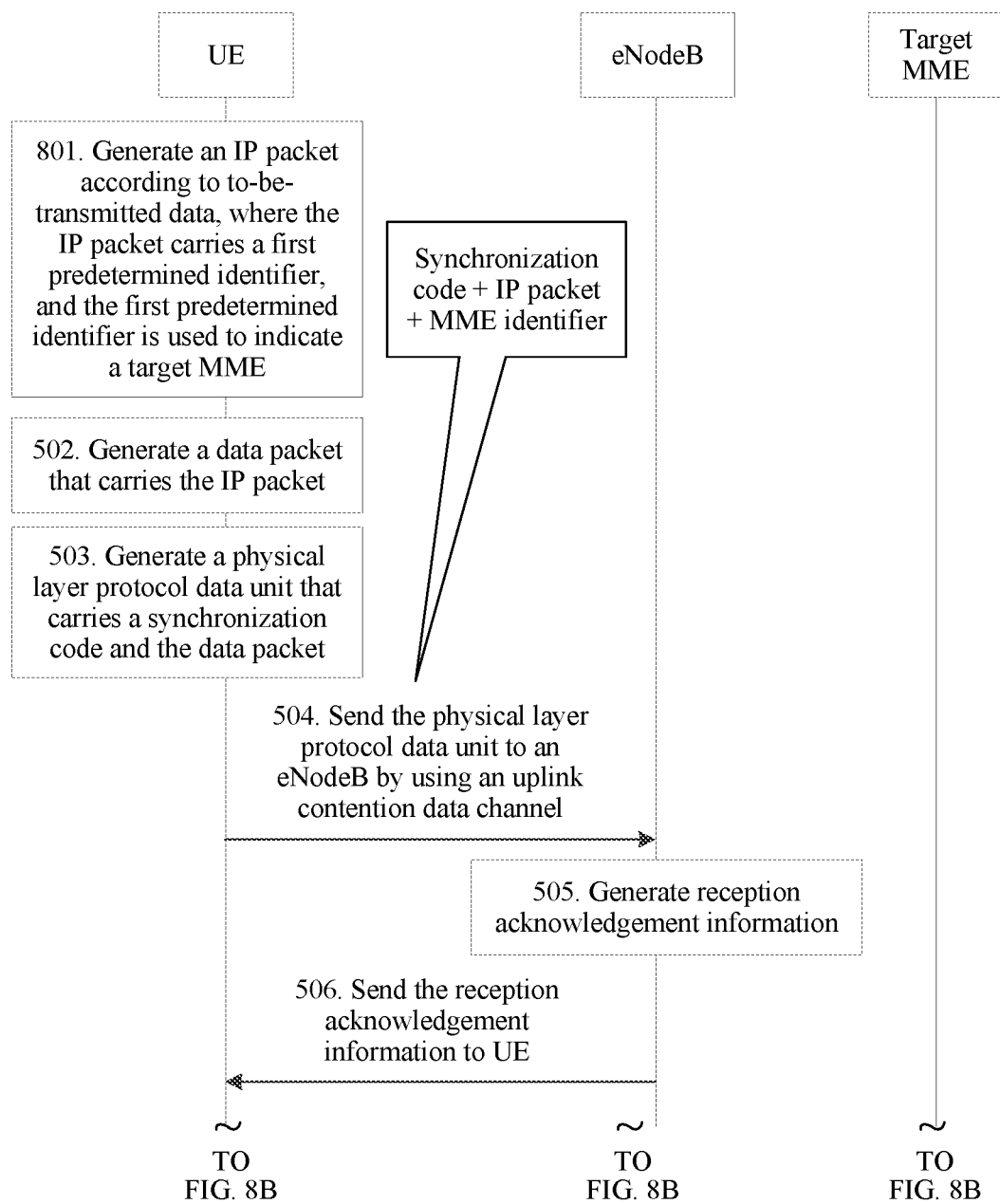
FIG. 8A and FIG. 8B are a flowchart of a data sending method according to another embodiment of the present invention.
Figure 8B:
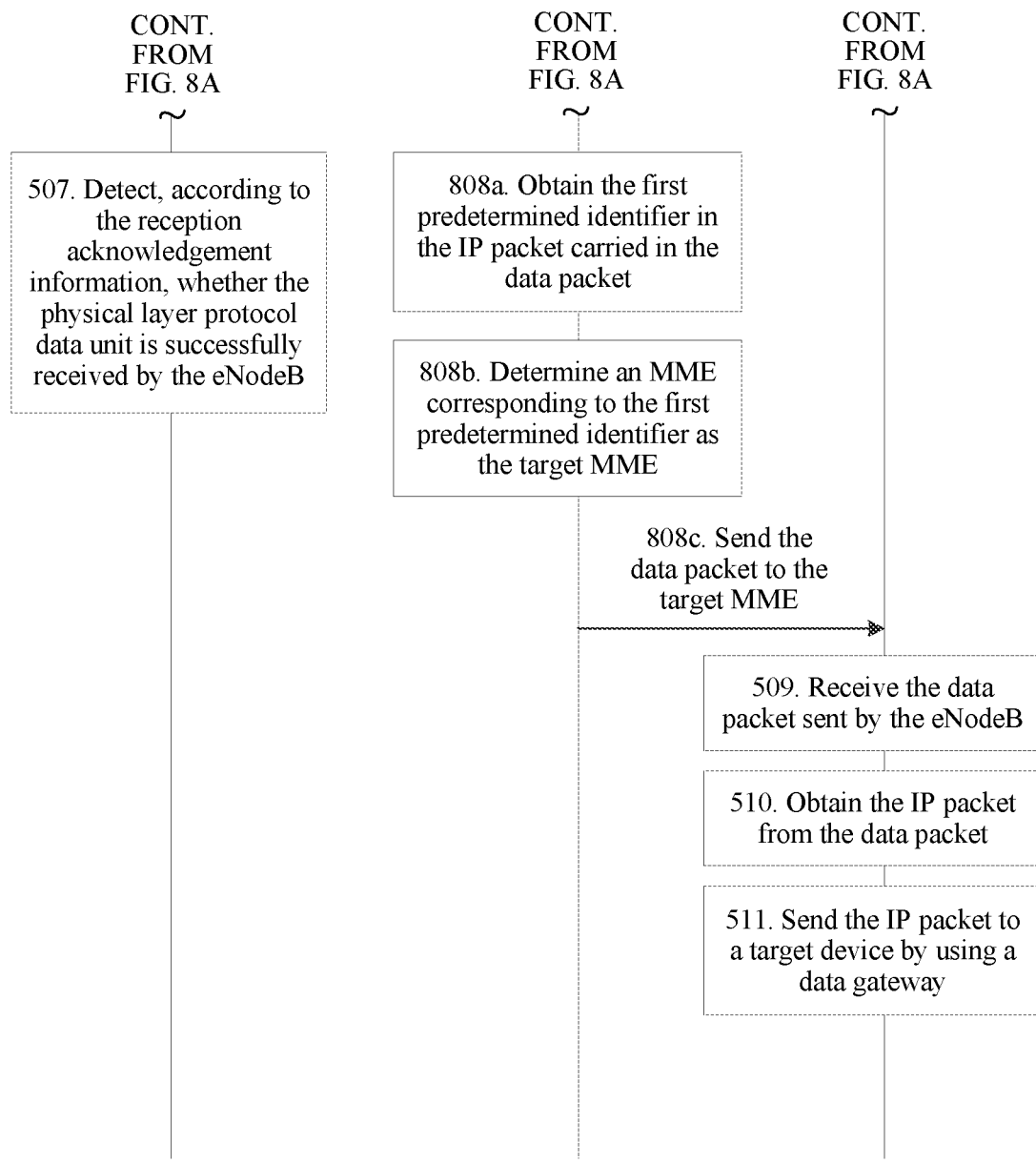

In another possible implementation, the eNodeB may determine a target MME by using a predetermined identifier in an IP packet carried in a data packet. In this case, as shown in FIG. 8A and FIG. 8B, step 501 may be replaced with step 801, and step 508 may be replaced with step 808*a* to step 808*c*.

Step 801: UE generates an IP packet according to to-be-transmitted data, where the IP packet carries a first predetermined identifier, and the first predetermined identifier is used to indicate a target MME.

The first predetermined identifier may be an MME identifier or other MME identifier information.

Step 808a: The eNodeB obtains the first predetermined identifier in the IP packet carried in the data packet.

Step 808b: The eNodeB determines an MME corresponding to the first predetermined identifier as the target MME.

Step 808c: The eNodeB sends the data packet to the target MME.

Figure 9A:
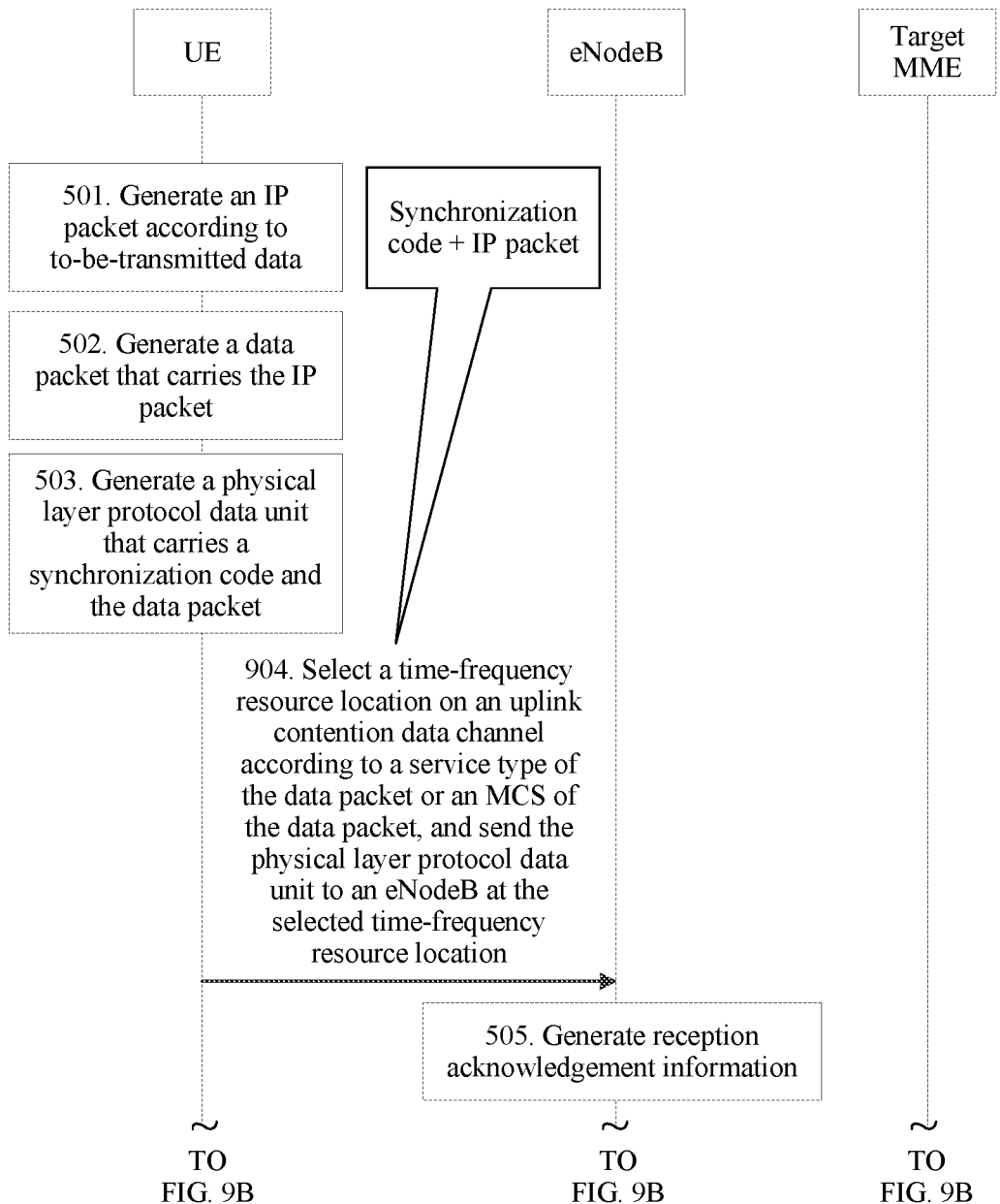
FIG. 9A and FIG. 9B are a flowchart of a data sending method according to another embodiment of the present invention.
Figure 9B:
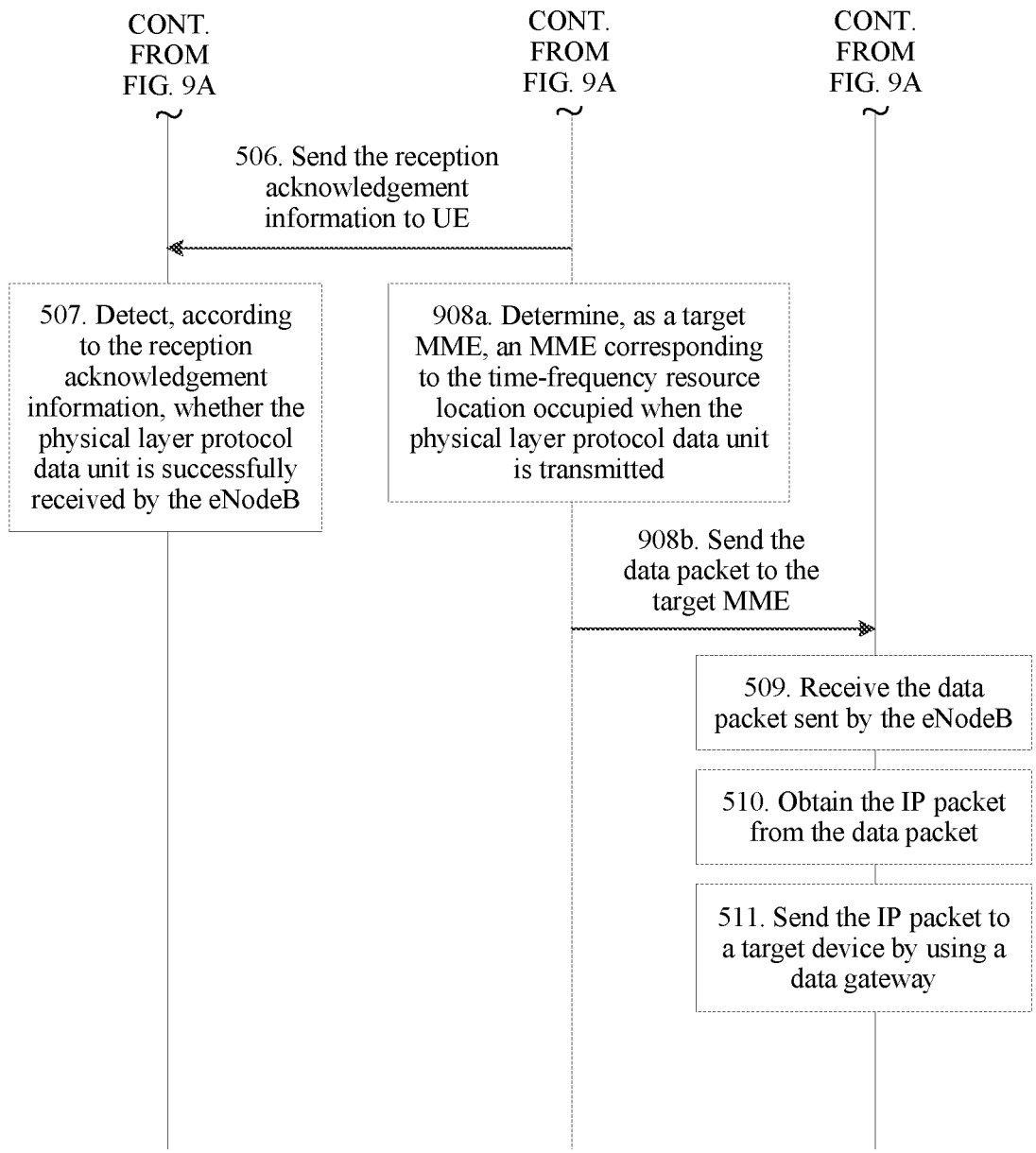

In another possible implementation, the eNodeB may determine a target MME by using a time-frequency resource location or a code resource that is occupied when the physical-layer-protocol-data-unit is transmitted on an uplink contention data channel. In this case, as shown in FIG. 9A and FIG. 9B, step 504 may be replaced with step 904, and step 508 may be replaced with step 908a and step 908b.

Step 904: The UE selects a time-frequency resource location on an uplink contention data channel according to a service type of the data packet or an MCS of the data packet, and sends the physical-layer-protocol-data-unit to the eNodeB at the selected time-frequency resource location.

The eNodeB pre-configures different time-frequency resource locations on the uplink contention data channel for different service types. Different service types correspond to respective time-frequency resource locations on the uplink contention data channel. For example, an M2M service is corresponding to a subframe whose subframe sequence number is an odd number on the uplink contention data channel, and a trunking service is corresponding to a subframe whose subframe sequence number is an even number on the uplink contention data channel. The eNodeB sends, to the UE in a manner of a broadcast message or dedicated signaling, configuration information related to the time-frequency resource locations on the uplink contention data channel. The UE selects the corresponding time-frequency resource location according to the service type of the data packet.

Alternatively, the eNodeB pre-configures different time-frequency resource locations on the uplink contention data channel for different MCSs. Different MCSs correspond to respective time-frequency resource locations on the uplink contention data channel. The eNodeB sends, to the UE in a manner of a broadcast message or dedicated signaling, configuration information related to the time-frequency resource locations on the uplink contention data channel. The UE selects the corresponding time-frequency resource location according to the MCS used for the data packet.

Step 908a: The eNodeB determines, as a target MME, an MME corresponding to the time-frequency resource location or a code resource that is occupied when the physical-layer-protocol-data-unit is transmitted.

For example, when a sequence number of a subframe used by the eNodeB to receive the physical-layer-protocol-data-unit is an odd number, the eNodeB determines an MME corresponding to an M2M service as a target MME. When a sequence number of a subframe used by the eNodeB to receive the physical-layer-protocol-data-unit is an even number, the eNodeB determines an MME corresponding to a trunking service as a target MME.

Step 908b: The eNodeB sends the data packet to the target MME.

Figure 10A:
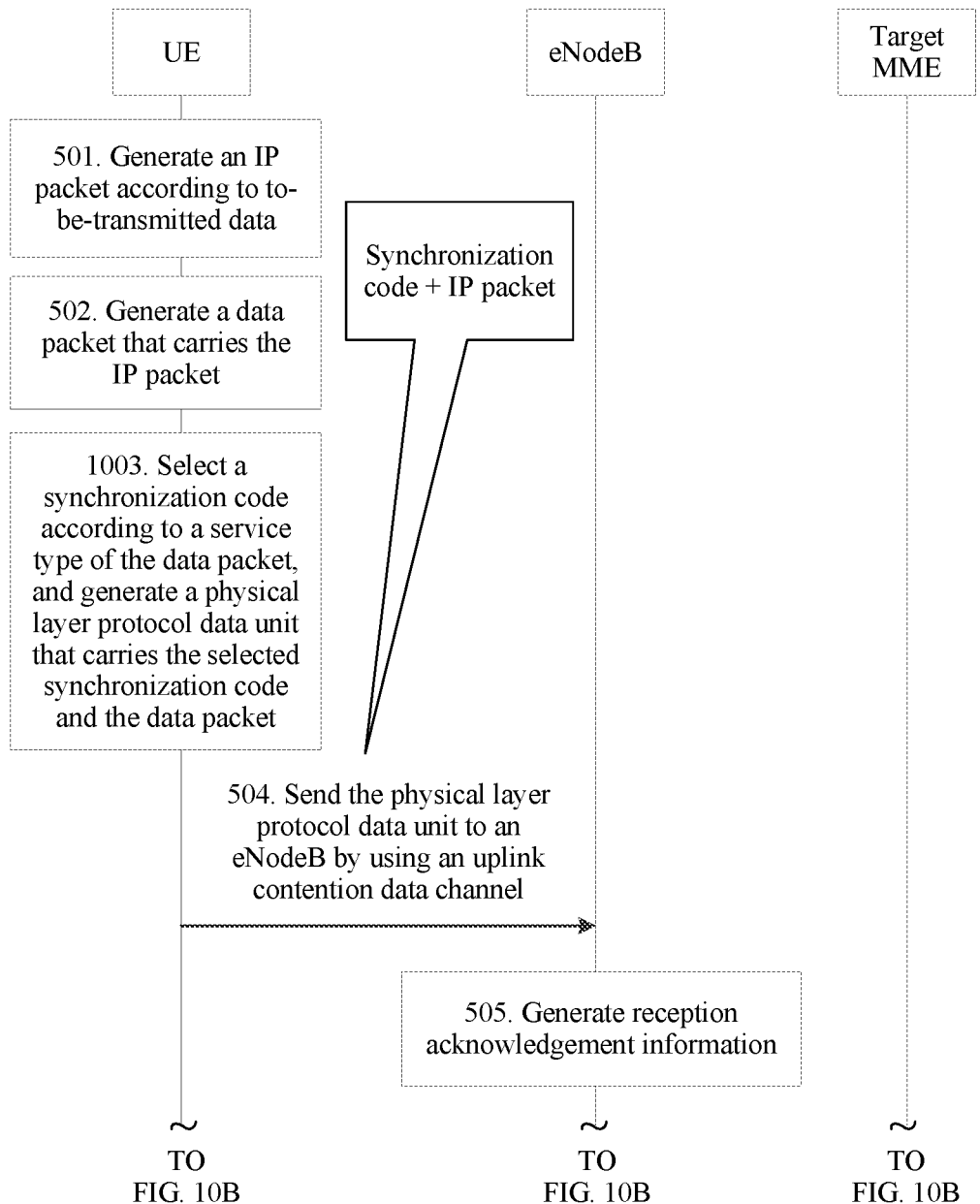
FIG. 10A and FIG. 10B are a flowchart of a data sending method according to another embodiment of the present invention.
Figure 10B:
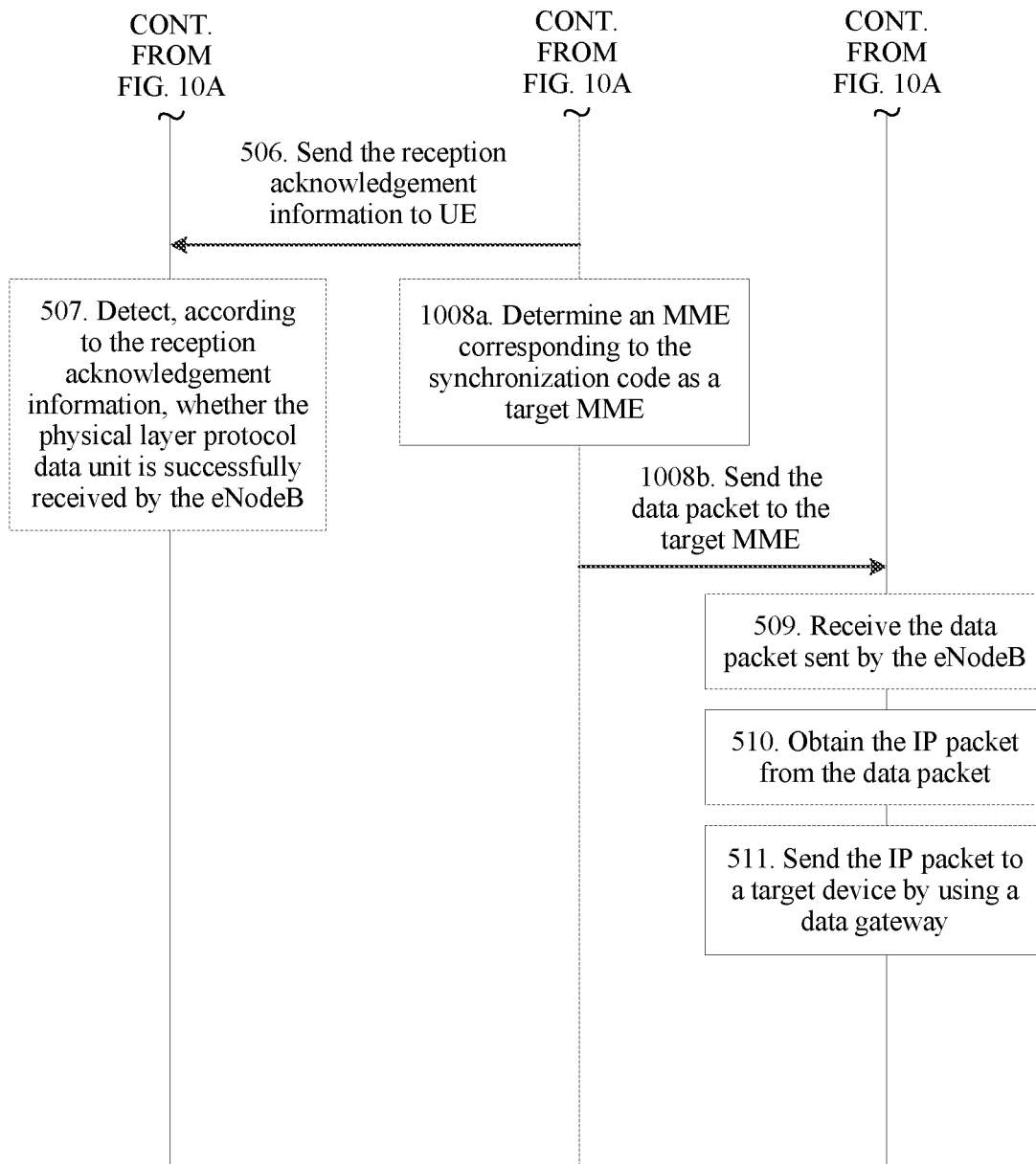

In another possible implementation, the eNodeB may determine a target MME by using a synchronization code used by the UE. In this case, as shown in FIG. 10A and FIG. 10B, step 503 may be replaced with step 1003, and step 508 may be replaced with step 1008a and step 1008b.

Step 1003: The UE selects a synchronization code according to a service type of the data packet, and generates a physical-layer-protocol-data-unit that carries the selected synchronization code and the data packet.

Similar to that in FIG. 9A and FIG. 9B, the eNodeB pre-configures different synchronization codes for different service types.

The eNodeB may send, to the UE in advance in a manner of a broadcast message or dedicated signaling, configuration information related to the synchronization codes. The UE selects the corresponding synchronization code according to the service type of the data packet.

Step 1008a: The eNodeB determines an MME corresponding to the synchronization code as a target MME.

Step 1008b: The eNodeB sends the data packet to the target MME.

In FIG. 6A to FIG. 10B, the target MME further needs to send the IP packet to a destination device in the Internet by using a data gateway. The data gateway may be a PDN-GW, another gateway, or a local gateway of the MME.

Figure 11:
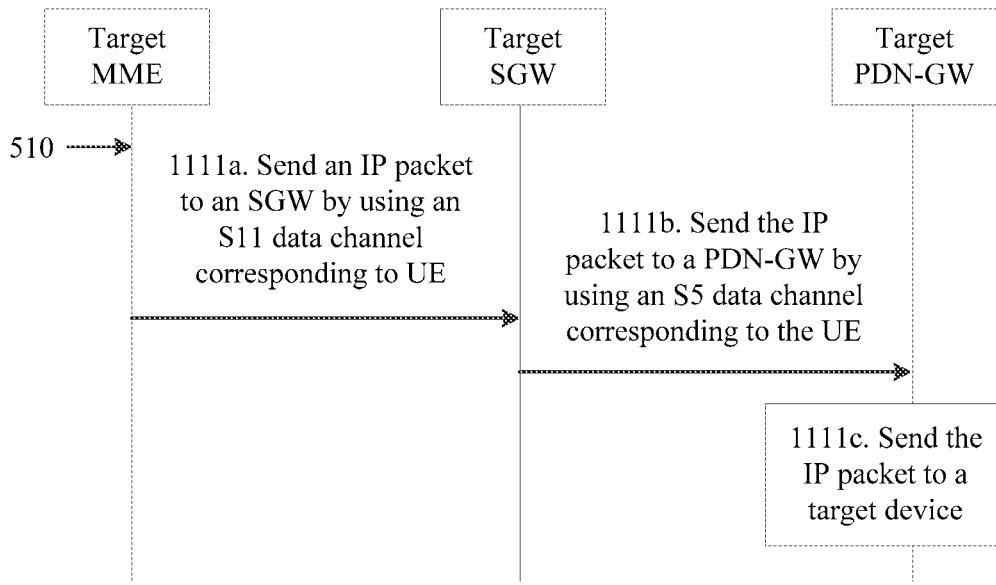
FIG. 11 is a flowchart of a data sending method according to another embodiment of the present invention.

When the data gateway is the PDN-GW, and the data sending system shown in FIG. 2A is used, as shown in FIG. 11, step 511 in FIG. 6B may be replaced with step 1111a to step 1111c.

Step 1111a: The MME sends the IP packet to an SGW by using an S11 data channel corresponding to the UE.

An S11 data channel is established between the MME and the SGW for each UE. After receiving the data packet by using the S1-MME data channel corresponding to the UE, the MME finds, according to an identifier of the S1-MME data channel, the identifier of the UE, or a source IP address of the IP packet, the S11 data channel corresponding to the UE, and sends the IP packet to the SGW by using the S11 data channel corresponding to the UE.

The identifier of the UE may be the S-TMSI.

The MME stores a correspondence between an S1-MME data channel of each UE and an S11 data channel of the UE.

Step 1111b: The SGW sends the IP packet to a PDN-GW by using an S5 data channel corresponding to the UE.

An S5 data channel is established between the SGW and the PDN-GW for each UE.

After receiving the IP packet by using the S11 data channel corresponding to the UE, the SGW sends the IP packet to the PDN-GW by using the S5 data channel corresponding to the UE.

The SGW stores a correspondence between an S11 data channel of each UE and an S5 data channel of the UE.

Step 1111c: The PDN-GW sends the IP packet to a target device.

Figure 12:
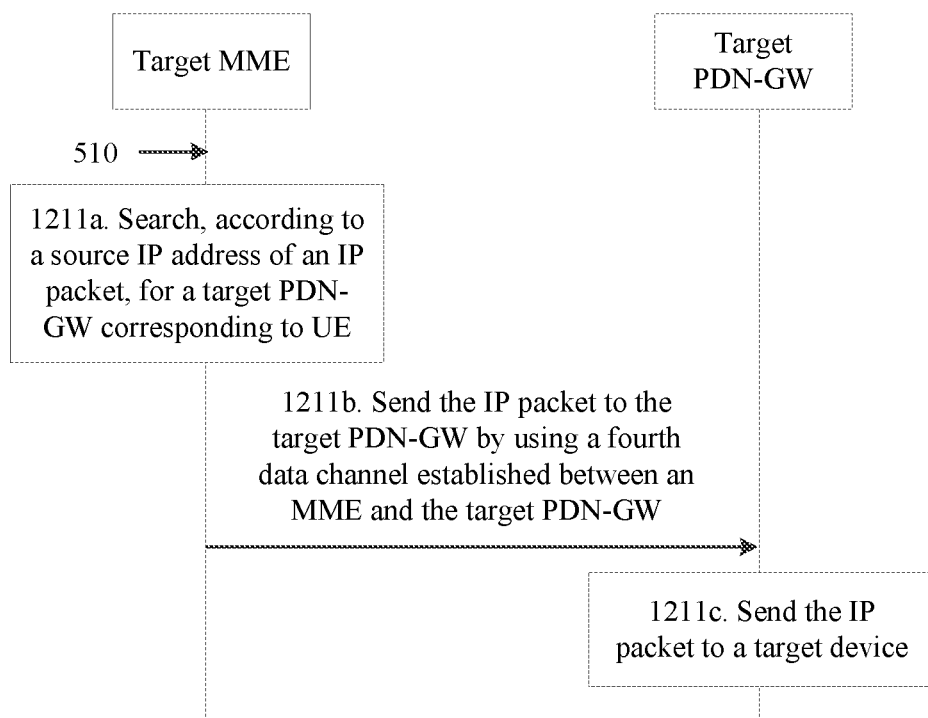
FIG. 12 is a flowchart of a data sending method according to another embodiment of the present invention.

When the data gateway is the PDN-GW, and the data sending system shown in FIG. 2D is used, as shown in FIG. 12, step 511 in FIG. 6B may be replaced with step 1211a to step 1211c.

Step 1211a: The MME searches, according to a source IP address of the IP packet, for a target PDN-GW corresponding to the UE.

After receiving the data packet from the eNB and obtaining the IP packet by means of parsing, the MME searches, according to the source IP address of the IP packet, for the target PDN-GW corresponding to the UE.

Step 1211b: The MME sends the IP packet to the target PDN-GW by using a fourth data channel established between the MME and the target PDN-GW.

A newly added fourth data channel D4 is pre-established between the MME and each PDN-GW.

The MME sends the IP packet to the target PDN-GW by using the fourth data channel established between the MME and the target PDN-GW.

Step 1211c: The target PDN-GW sends the IP packet to a target device.

It should be additionally noted that an establishment process of the fourth data channel D4 may include the following steps.

In a first step, the MME sends a data channel establishment request message to an SGW.

The data channel establishment request message carries identifier information of the target PDN-GW and information about a first tunnel endpoint identifier (Tunnel Endpoint Identifier, TEID for short). After a request from the eNB is received, or according to configuration of a network manager, or after a specific terminal is attached to a network, or after a specific terminal enters an idle state, the MME triggers the first step, and sends the data channel establishment request message to the SGW.

In a second step, the SGW sends a data channel establishment request message to the PDN-GW.

After receiving the data channel establishment request message sent by the MME, the SGW determines the target PDN-GW according to the identifier information of the target PDN-GW in the data channel establishment request message sent by the MME, and sends the data channel establishment request message to the target PDN-GW. The data channel establishment request message carries information about a second tunnel endpoint identifier.

In a third step, the PDN-GW returns a data channel establishment response message to the SGW.

The data channel establishment response message carries information about a third tunnel endpoint identifier.

In a fourth step, the SGW returns a data channel establishment response message to the MME.

The data channel establishment response message carries information about a fourth tunnel endpoint identifier.

Figure 13:
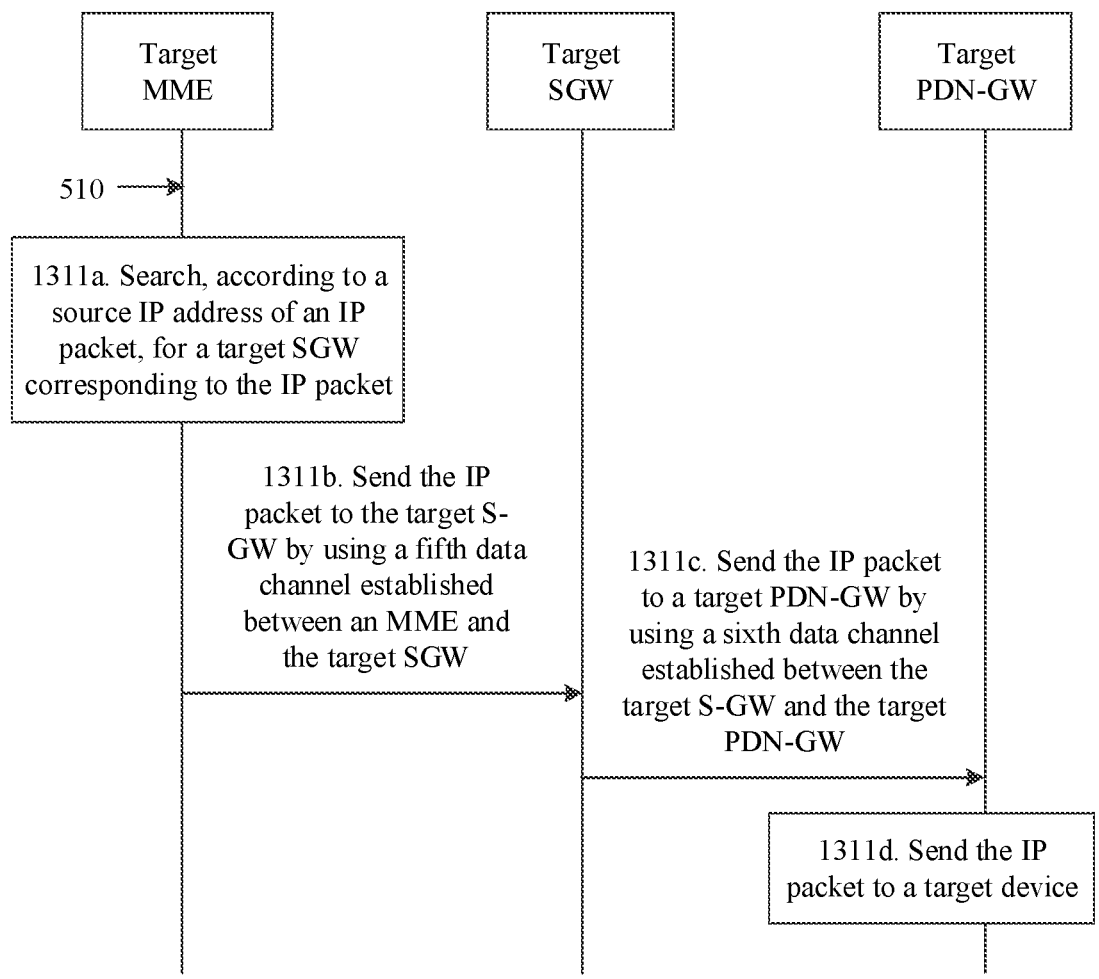
FIG. 13 is a flowchart of a data sending method according to another embodiment of the present invention.

The information about the first tunnel endpoint identifier is used by the SGW to determine a specific MME to which a downlink IP packet is sent. The information about the second tunnel endpoint identifier is used by the PDN-GW to determine a specific SGW to which the downlink IP packet is sent. The information about the third tunnel endpoint identifier is used by the SGW to determine that an uplink IP packet is sent to a specific PDN-GW to which an uplink IP packet is sent. The information about the fourth tunnel endpoint identifier is used by the MME to determine a specific SGW to which the uplink IP packet is sent When the data gateway is the PDN-GW, and the data sending system shown in FIG. 2E is used, as shown in FIG. 13, step 511 in FIG. 6B may be replaced with step 1311a to step 1311d.

Step 1311a: The MME searches, according to a source IP address of the IP packet, for a target SGW corresponding to the IP packet.

After receiving the data packet and obtaining the IP packet by means of parsing, the MME searches for the corresponding target SGW according to the source IP address of the IP packet.

Step 1311b: The MME sends the IP packet to the target S-GW by using a fifth data channel established between the MME and the target SGW.

A newly added fifth data channel D5 is established between the MME and each SGW.

The MME sends the IP packet to the target SGW by using the fifth data channel D5 established between the MME and the target SGW.

Step 1311c: The target S-GW sends the IP packet to a target PDN-GW by using a sixth data channel established between the target S-GW and the target PDN-GW.

A newly added sixth data channel D6 is established between the SGW and each PDN-GW.

The SGW searches for the corresponding target PDN-GW according to the source IP address of the IP packet. For example, the SGW obtains in advance, by using the PDN-GW, the MME, or the eNB, a network segment of an IP address allocated by each PDN-GW to the UE. After receiving the IP packet, the SGW determines the corresponding target PDN-GW according to a network segment to which the source IP address of the IP packet belongs.

The SGW sends the IP packet to the target PDN-GW by using the sixth data channel D6 established between the SGW and the target PDN-GW.

Step 1311d: The target PDN-GW sends the IP packet to a target device.

Figure 14:
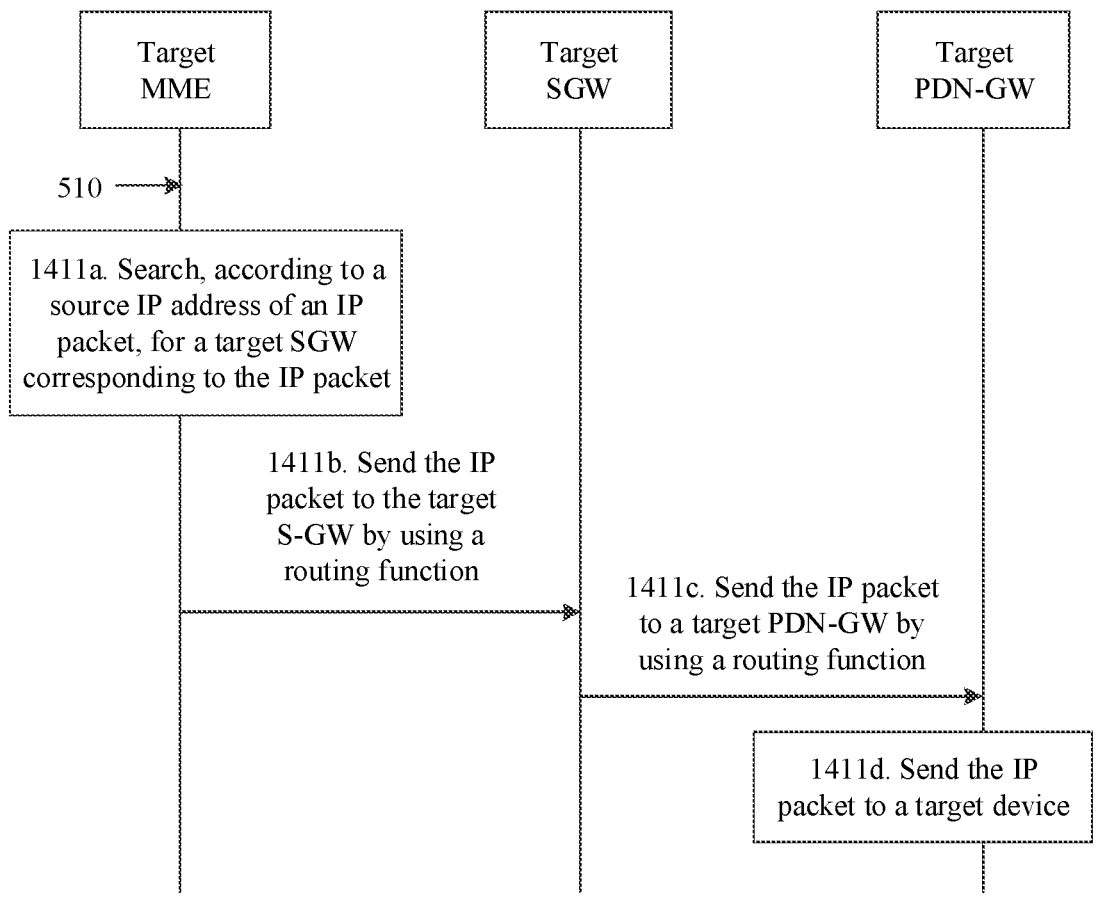
FIG. 14 is a flowchart of a data sending method according to another embodiment of the present invention.

When the data gateway is the PDN-GW, and the MME, the SGW, and the PDN-GW all support a routing function, as shown in FIG. 14, step 511 in FIG. 6B may be replaced with step 1411a to step 1411d.

Step 1411a: The MME searches, according to a source IP address of the IP packet, for a target SGW corresponding to the IP packet.

After receiving the data packet from the eNB and obtaining the IP packet by means of parsing, the MME searches for the corresponding target SGW according to the source IP address of the IP packet.

Step 1411b: The MME sends the IP packet to the target S-GW by using a routing function.

Step 1411c: The target S-GW sends the IP packet to a target PDN-GW by using a routing function.

Step 1411d: The target PDN-GW sends the IP packet to a target device.

Corresponding to the data sending systems shown in FIG. 2A, FIG. 2B, FIG. 2C, FIG. 2F, and FIG. 2G different from a case in which the eNodeB sends the data packet to the MME in the foregoing implementations, in another possible implementation, the eNodeB may determine a target data gateway, and directly forward the IP packet carried in the data packet to the target data gateway, and the target data gateway sends the IP packet to a target device in the Internet.

In some embodiments, the data gateway is a PDN-GW, another gateway, or a local gateway of the radio access network element.

Figure 15:
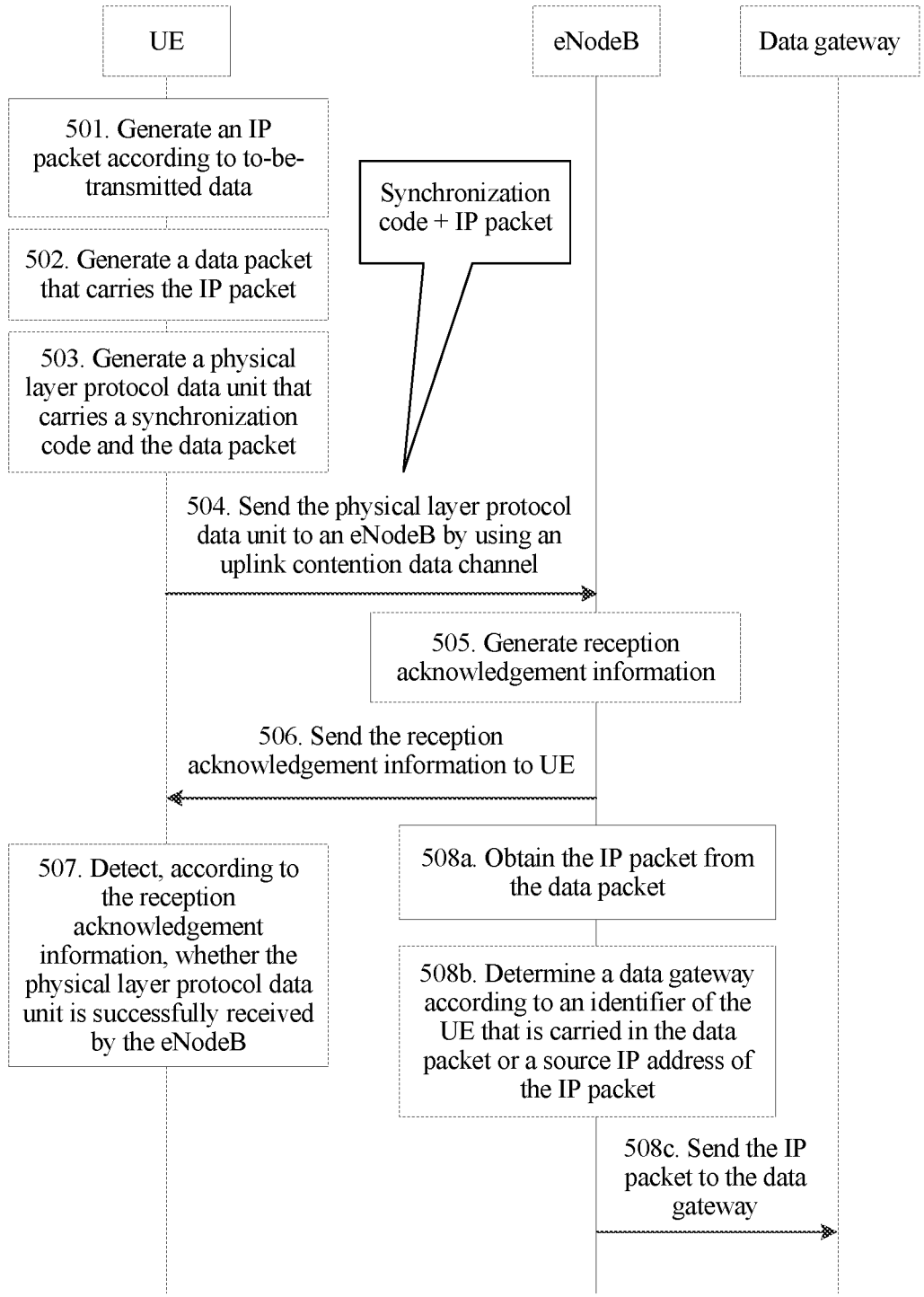
FIG. 15 is a flowchart of a data sending method according to another embodiment of the present invention.

In this case, as shown in FIG. 15, step 508 in FIG. 5 may be replaced with step 508a to step 508c.

Step 508a: The eNodeB obtains the IP packet from the data packet.

The eNodeB determines, by using a predetermined identifier in the data packet, that the data packet is a data packet that carries the IP packet.

If the UE performs integrity protection on the IP packet, the eNodeB needs to perform integrity check on the IP packet. An integrity protection key that is of the UE and that is required for the integrity check is obtained by the eNodeB from an MME.

Step 508b: The eNodeB determines a data gateway according to an identifier of the UE that is carried in the data packet or a source IP address of the IP packet.

Step 508c: The eNodeB sends the IP packet to the data gateway.

Then, the data gateway sends the IP packet to a target device in the Internet.

For example, in the data sending system shown in FIG. 2G the data gateway is a local gateway of the eNodeB. The eNodeB sends the IP packet to the local gateway according to the source IP address, and the local gateway sends the IP packet to the destination device in the Internet.

Figure 16A:
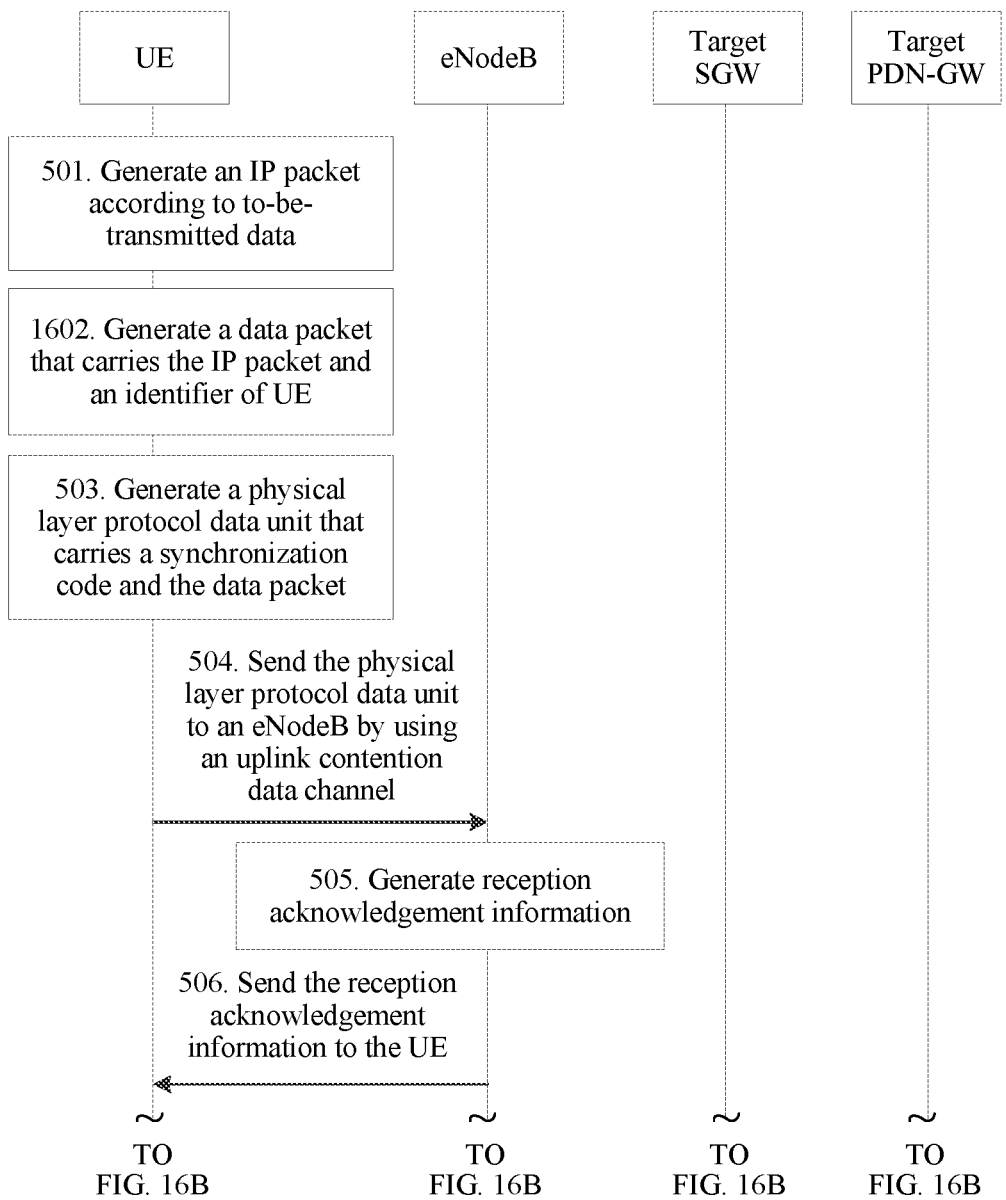
FIG. 16A and FIG. 16B are a flowchart of a data sending method according to another embodiment of the present invention.
Figure 16B:
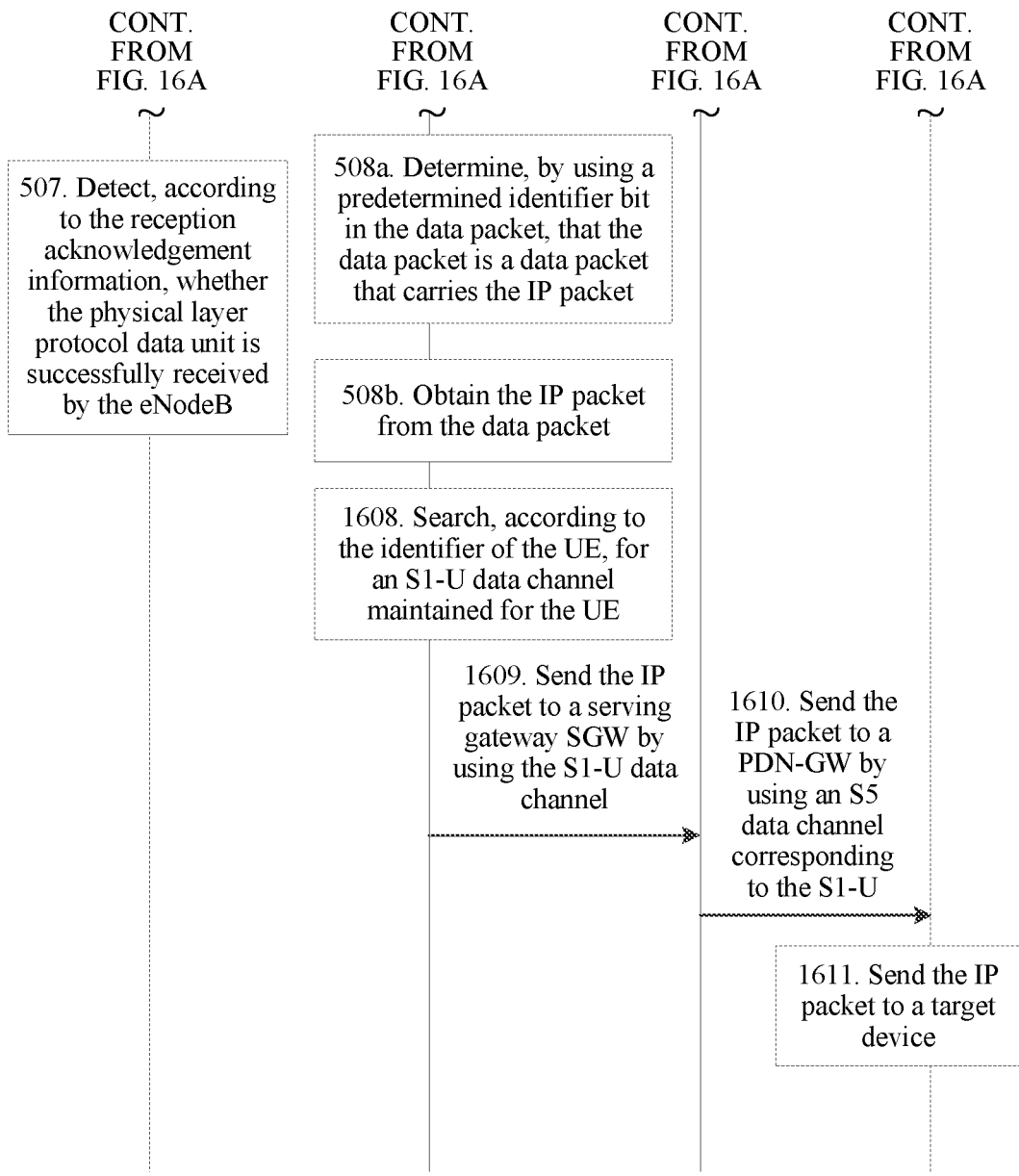

When the data gateway is the PDN-GW, and the data sending system shown in FIG. 2A is used, as shown in FIG. 16A and FIG. 16B, step 502 may be replaced with step 1602, and step 508c may be replaced with step 1608 to step 1611.

Step 1602: The UE generates a data packet that carries the IP packet and an identifier of the UE.

In some embodiments, the identifier of the UE is a cell radio network temporary identifier (C-RNTI).

In this embodiment, the UE is in a predetermined idle state. In the predetermined idle state, the UE stores the C-RNTI of the UE. Correspondingly, the eNodeB maintains an S1-U data channel of the UE that is established before the UE is in the predetermined idle state.

When a data packet needs to be generated, the UE generates the data packet that carries the IP packet and the C-RNTI.

Step 1608: The eNodeB searches, according to the identifier of the UE, for an S1-U data channel maintained for the UE.

The S1-U data channel is a data channel maintained by the eNodeB when the UE is in the predetermined idle state.

The eNodeB searches, according to the identifier of the UE that is carried in the data packet, that is, the C-RNTI, for the S1-U data channel maintained for the UE.

Step 1609: The eNodeB sends the IP packet to a serving gateway SGW by using the S1-U data channel.

Step 1610: The SGW sends the IP packet to a PDN-GW by using an S5 data channel corresponding to the S1-U data channel.

Step 1611: The PDN-GW sends the IP packet to a target device.

Figure 17A:
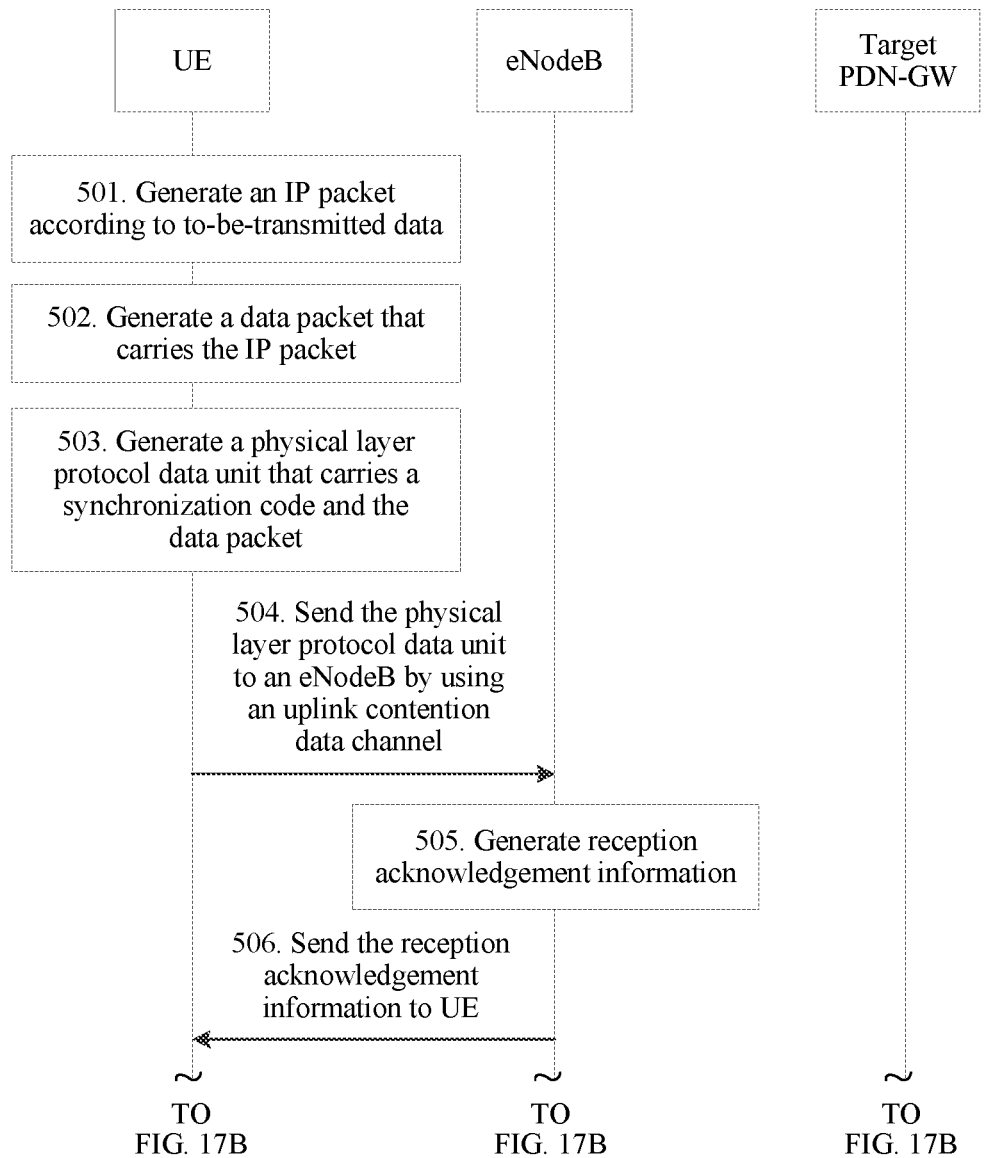
FIG. 17A and FIG. 17B are a flowchart of a data sending method according to another embodiment of the present invention.
Figure 17B:
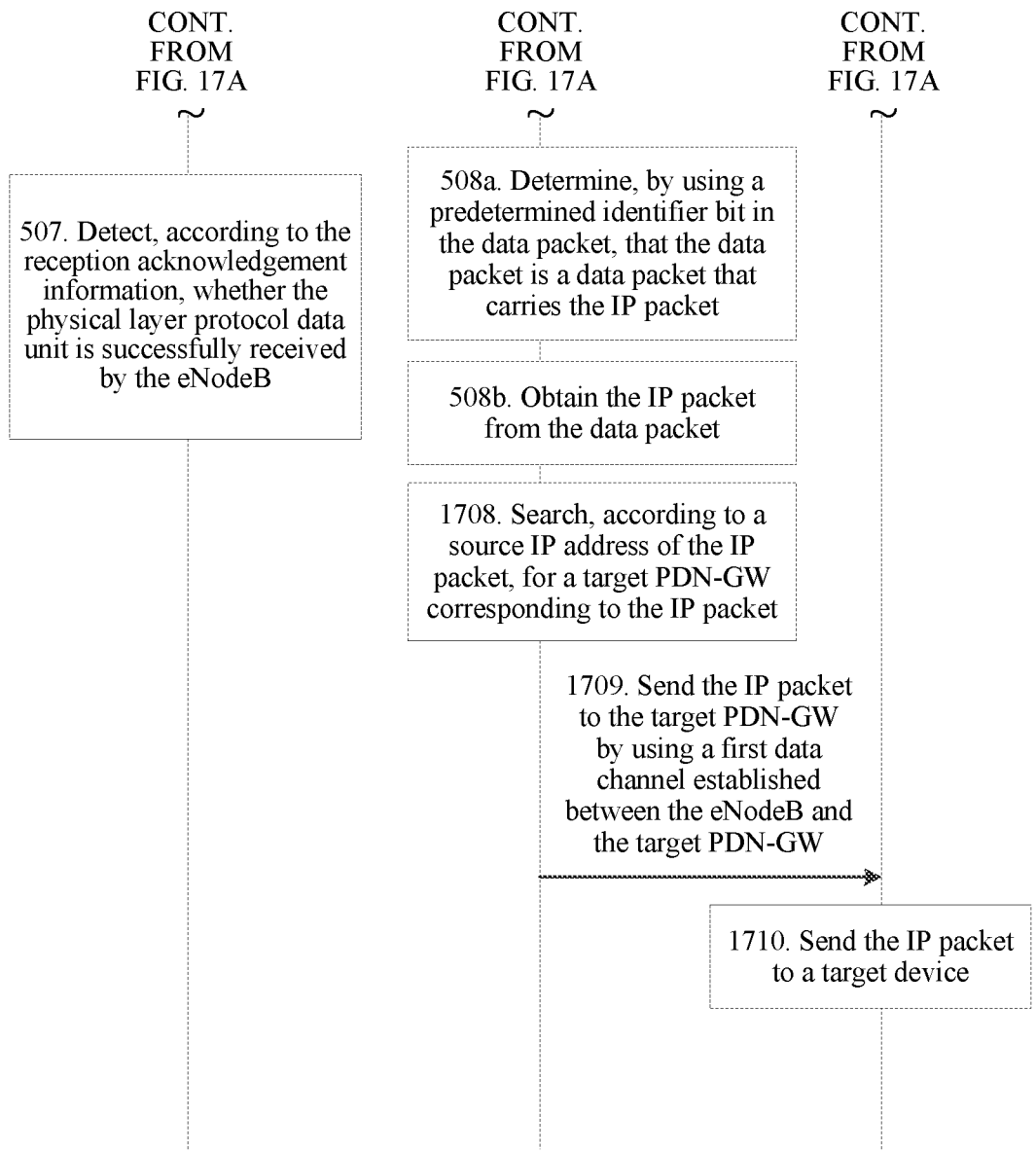

When the data gateway is the PDN-GW, and the data sending system shown in FIG. 2B is used, as shown in FIG. 17B, step 508c may be replaced with step 1708 to step 1710.

Step 1708: The eNodeB searches, according to a source IP address of the IP packet, for a target PDN-GW corresponding to the IP packet.

A correspondence between the source IP address and the target PDN-GW may be obtained in advance by the eNodeB from an MME.

Step 1709: The eNodeB sends the IP packet to the target PDN-GW by using a first data channel established between the eNodeB and the target PDN-GW.

A newly added first data channel D1 is established between the eNodeB and each PDN-GW.

The eNodeB sends the IP packet to the target PDN-GW by using the first data channel D1 established between the eNodeB and the target PDN-GW.

Step 1710: The target PDN-GW sends the IP packet to a target device.

It should be noted that an establishment process of the first data channel D1 may include the following steps.

In a first step, the eNB sends a data channel establishment request message to an SGW.

The data channel establishment request message carries identifier information of the target PDN-GW and information about a fifth tunnel endpoint identifier (Tunnel Endpoint Identifier, TEID for short). After a request from an MME is received, or according to configuration of a network manager, or after a specific terminal enters an idle state, the eNB triggers the first step and sends the data channel establishment request message to the SGW.

In a second step, the SGW sends a data channel establishment request message to the PDN-GW.

After receiving the data channel establishment request message sent by the eNB, the SGW determines the target PDN-GW according to the identifier information of the target PDN-GW in the data channel establishment request message sent by the eNB, and sends the data channel establishment request message to the target PDN-GW. The data channel establishment request message carries information about a sixth tunnel endpoint identifier.

In a third step, the PDN-GW returns a data channel establishment response message to the SGW.

The data channel establishment response message carries information about a seventh tunnel endpoint identifier.

In a fourth step, the SGW returns a data channel establishment response message to the eNB.

The data channel establishment response message carries information about an eighth tunnel endpoint identifier.

The information about the fifth tunnel endpoint identifier is used by the SGW to determine a specific eNB to which a downlink IP packet is sent. The information about the sixth tunnel endpoint identifier is used by the PDN-GW to determine a specific SGW to which the downlink IP packet is sent. The information about the seventh tunnel endpoint identifier is used by the SGW to determine that an uplink IP packet is sent to the PDN-GW. The information about the eighth tunnel endpoint identifier is used by the eNB to determine a specific SGW to which the uplink IP packet is sent.

In another possible implementation, an establishment process of the first data channel D1 may include the following steps.

In a first step, an MME sends a data channel establishment request message to an SGW.

After a request from the eNB is received, or according to configuration of a network manager, or after a specific terminal is attached to a network, or after a specific terminal enters an idle state, the MME triggers the first step, and sends the data channel establishment request message to the SGW.

In a second step, the SGW returns a data channel establishment response message to the MME.

After receiving the data channel establishment request message sent by the MME, the SGW returns the data channel establishment response message to the MME. The data channel establishment response message carries information about a ninth tunnel endpoint identifier.

In a third step, the MME sends a data channel establishment request message to the eNB.

The data channel establishment request message carries the information about the ninth tunnel endpoint identifier.

In a fourth step, the eNB returns a data channel establishment response message to the MME.

The data channel establishment response message carries information about a tenth tunnel endpoint identifier.

In a fifth step, the MME sends a data channel establishment acknowledgement message to the SGW.

The data channel establishment acknowledgement message carries the information about the tenth tunnel endpoint identifier.

The information about the ninth tunnel endpoint identifier is used by the eNB to determine a specific SGW to which an uplink IP packet is sent. The information about the tenth tunnel endpoint identifier is used by the SGW to determine a specific eNB to which a downlink IP packet is sent.

Figure 18A:
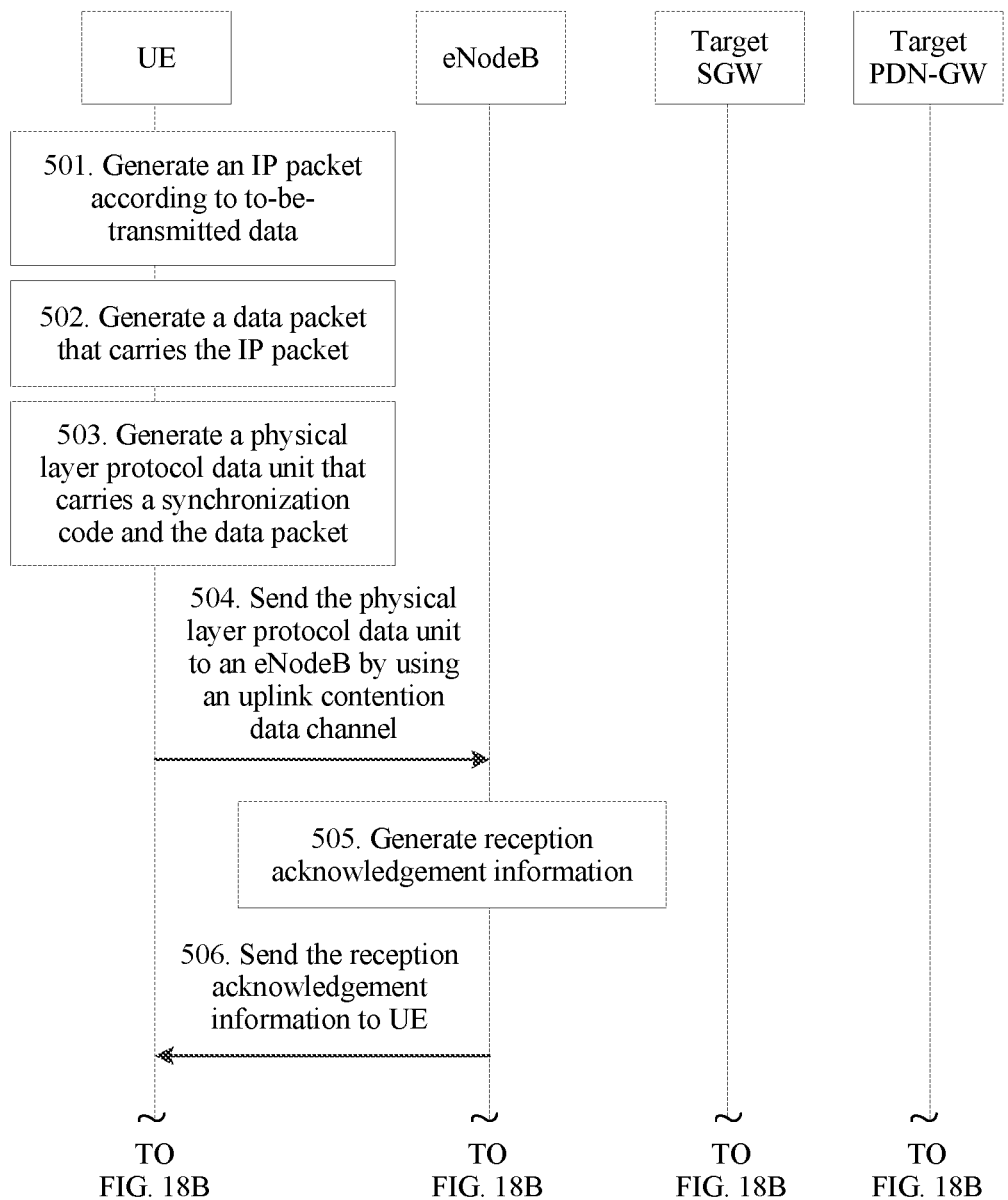
FIG. 18A and FIG. 18B are a flowchart of a data sending method according to another embodiment of the present invention.
Figure 18B:
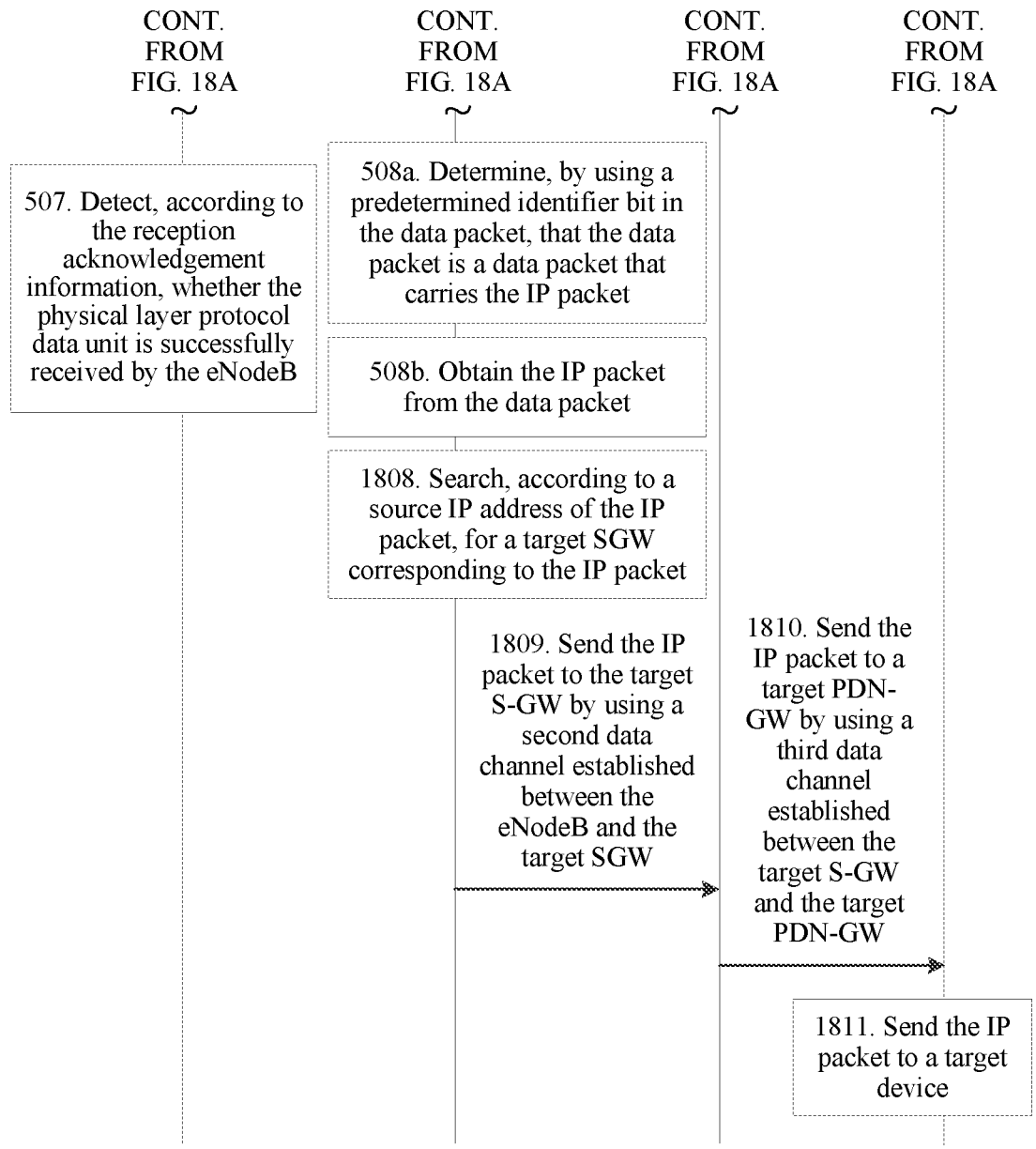

When the data gateway is the PDN-GW, and the data sending system shown in FIG. 2C is used, as shown in FIG. 18B, step 508c may be replaced with step 1808 to step 1811.

Step 1808: The eNodeB searches, according to a source IP address of the IP packet, for a target SGW corresponding to the IP packet.

The eNodeB searches for the corresponding target SGW according to the source IP address of the IP packet.

A correspondence between the source IP address and the target SGW may be obtained in advance by the eNodeB from an MME.

Step 1809: The eNodeB sends the IP packet to the target S-GW by using a second data channel established between the eNodeB and the target SGW.

A newly added second data channel D2 is established between the eNodeB and each SGW.

The eNodeB sends the IP packet to the target SGW by using the second data channel D2 established between the eNodeB and the target SGW.

Step 1810: The target S-GW sends the IP packet to a target PDN-GW by using a third data channel established between the target S-GW and the target PDN-GW.

A newly added third data channel D3 is established between the SGW and each PDN-GW.

The SGW searches for the corresponding target PDN-GW according to the source IP address of the IP packet.

The SGW sends the IP packet to the target SGW by using the third data channel D3 established between the SGW and the target PDN-GW.

Step 1811: The target PDN-GW sends the IP packet to a target device.

Figure 19A:
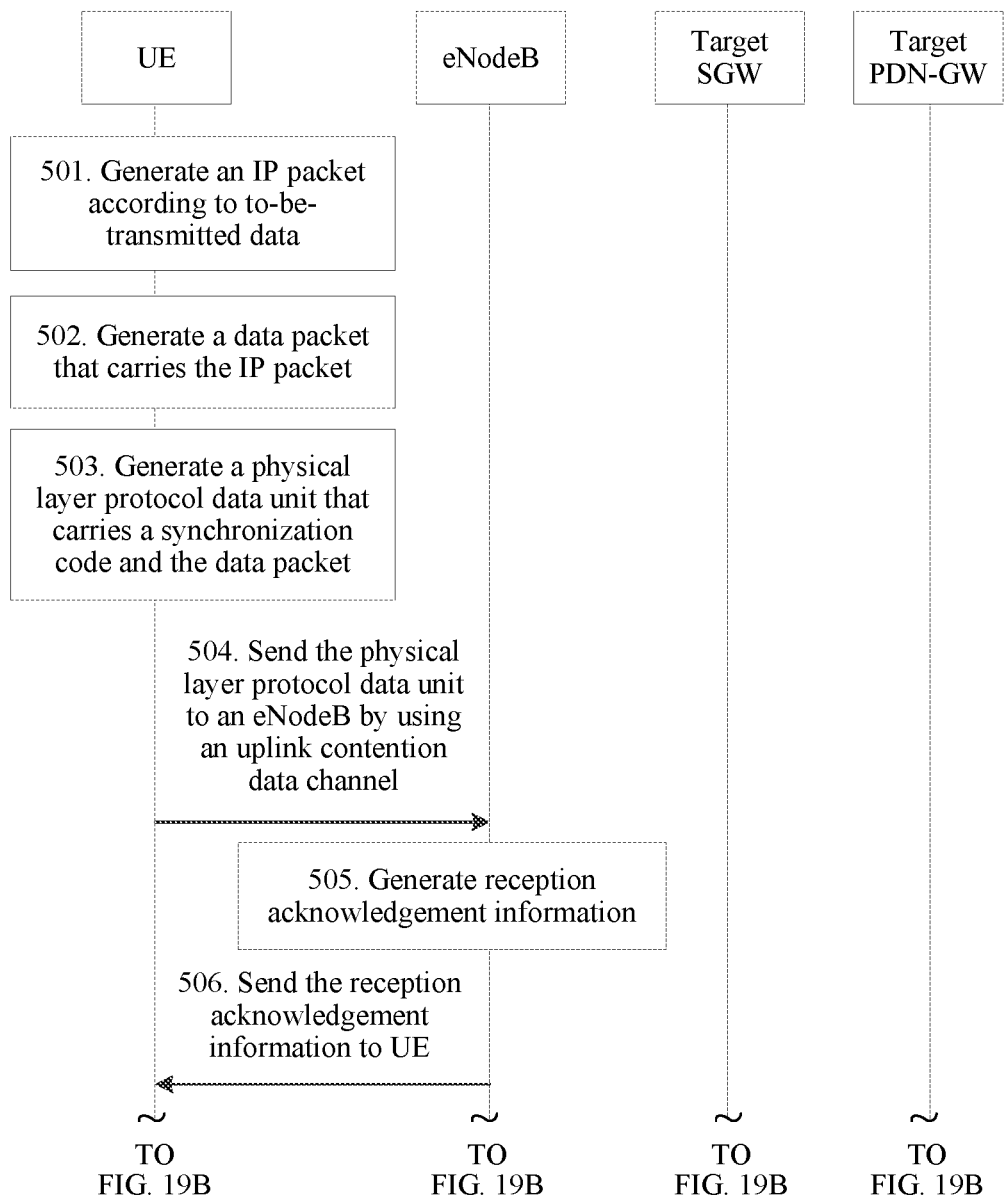
FIG. 19A and FIG. 19B are a flowchart of a data sending method according to another embodiment of the present invention.
Figure 19B:
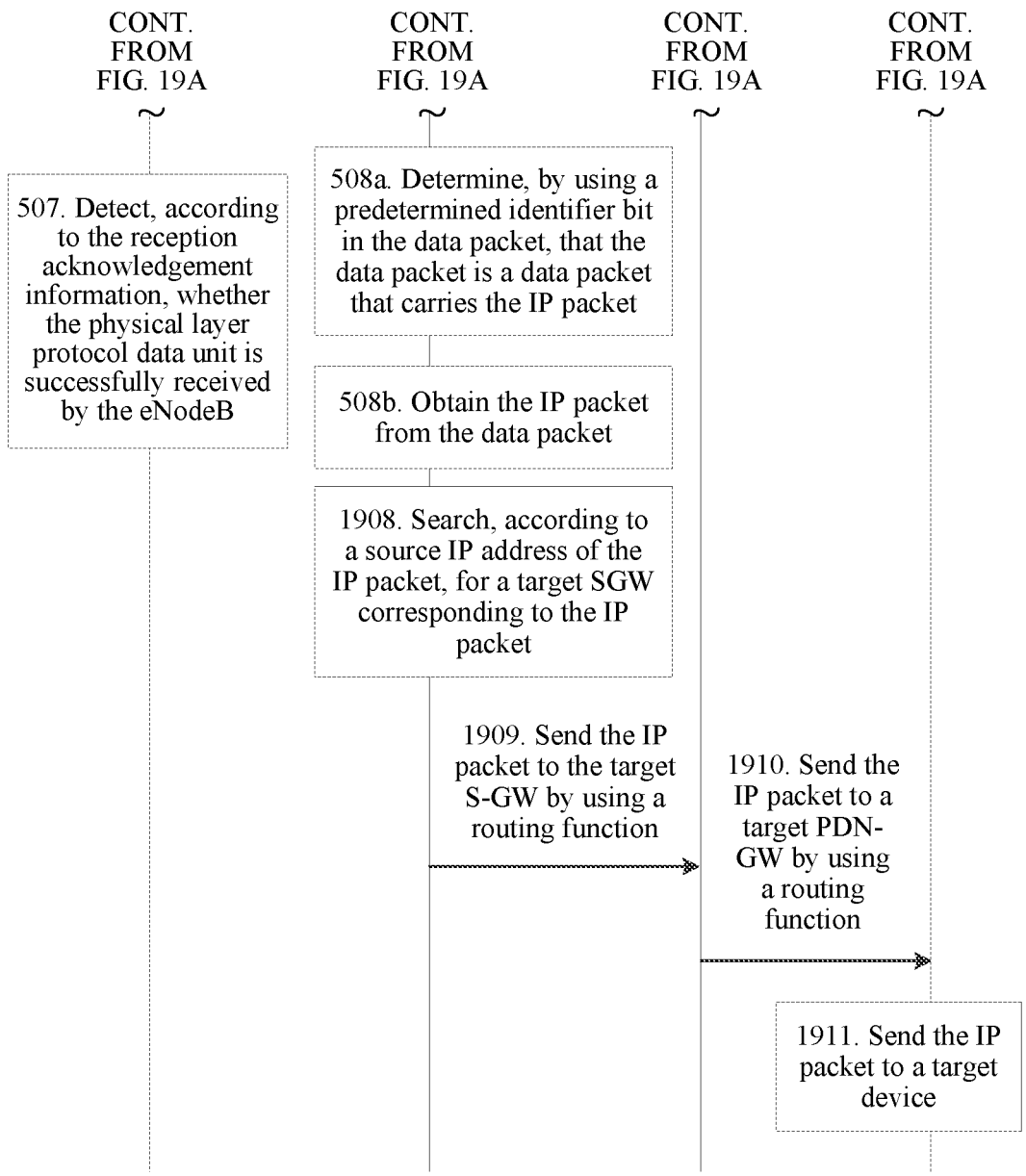

When the data gateway is the PDN-GW, and the eNode, the SGW, and the PDN-GW all support a routing function, as shown in FIG. 19B, step 508c may be replaced with step 1908 to step 1911.

Step 1908: The eNodeB searches, according to a source IP address of the IP packet, for a target SGW corresponding to the IP packet.

Step 1909: The eNodeB sends the IP packet to the target S-GW by using a routing function.

Step 1910: The target S-GW sends the IP packet to a target PDN-GW by using a routing function.

Step 1911: The target PDN-GW sends the IP packet to a target device.

Figure 20A:
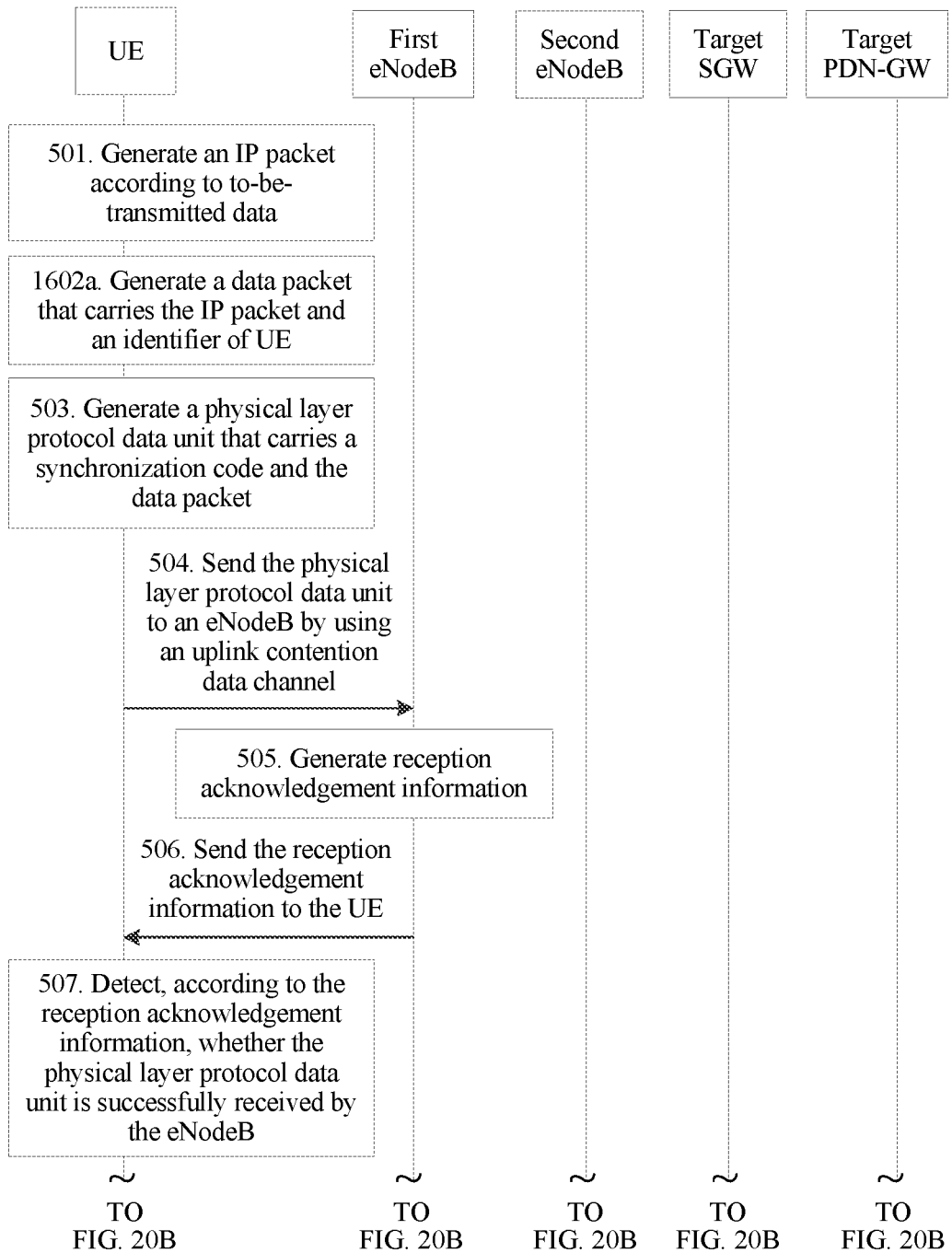
FIG. 20A and FIG. 20B are a flowchart of a data sending method according to another embodiment of the present invention.

Because the UE may keep moving, the UE may move from a cell that belongs to a first eNodeB to a cell that belongs to a second eNodeB. When the data sending system shown in FIG. 2F is used, and if an original camping cell of the UE is a cell that belongs to the second eNodeB 26, and the UE is currently located in a cell that belongs to the first eNodeB 22, as shown in FIG. 20A, step 1602 may be replaced with step 1602a, and the data sending method shown in FIG. 16A and FIG. 16B further includes step 1612, step 1613, step 1614, and step 1615.

Step 1602a: The UE generates a data packet that carries the IP packet, an identifier of the UE, and an identifier of a home cell.

In some embodiments, the identifier of the UE is a cell radio network temporary identifier (Cell Radio Network Temporary Identify, C-RNTI for short). The identifier of the home cell is an evolved universal terrestrial radio access network cell identifier (ECI) or an evolved universal terrestrial radio access network cell global identifier (ECGI) of the home cell.

In some embodiments, the identifier of the UE and the identifier of the home cell exist in a form of an extension header of the IP packet.

Step 1612: The first eNodeB obtains the identifier of the home cell in the data packet.

In some embodiments, the first eNodeB obtains the ECGI from the extension header of the IP packet.

Step 1613: When the identifier of the home cell is an identifier of the cell that belongs to the second eNodeB, the first eNodeB sends the data packet to the second eNodeB.

In order that a data packet can be transferred between different eNodeBs, a seventh data channel is pre-established between the first eNodeB and the second eNodeB.

The first eNodeB may send a data packet to the second eNodeB by using the seventh data channel D7 for processing.

In addition, when the identifier of the home cell is an identifier of the cell that belongs to the first eNodeB, the first eNodeB enters step 508a.

Step 1614: The second eNodeB queries, according to the identifier of the UE, for an S1-U data channel maintained for the UE, where the S1-U data channel is a data channel reserved by the second eNodeB when the UE is in an idle state.

The second eNodeB obtains the IP packet, the C-RNTI, and the ECGI from the data packet.

The second eNodeB determines, according to the ECGI, that the IP packet needs to be processed by the second eNodeB.

The second eNodeB searches, according to the C-RNTI, for the S1-U data channel corresponding to the UE.

Step 1615: The second eNodeB sends the IP packet to a serving gateway SGW by using the S1-U data channel.

Step 1610: The SGW sends the IP packet to a PDN-GW by using an S5 data channel corresponding to the S1-U data channel.

Step 1611: The PDN-GW sends the IP packet to a target device.

Figure 20B:
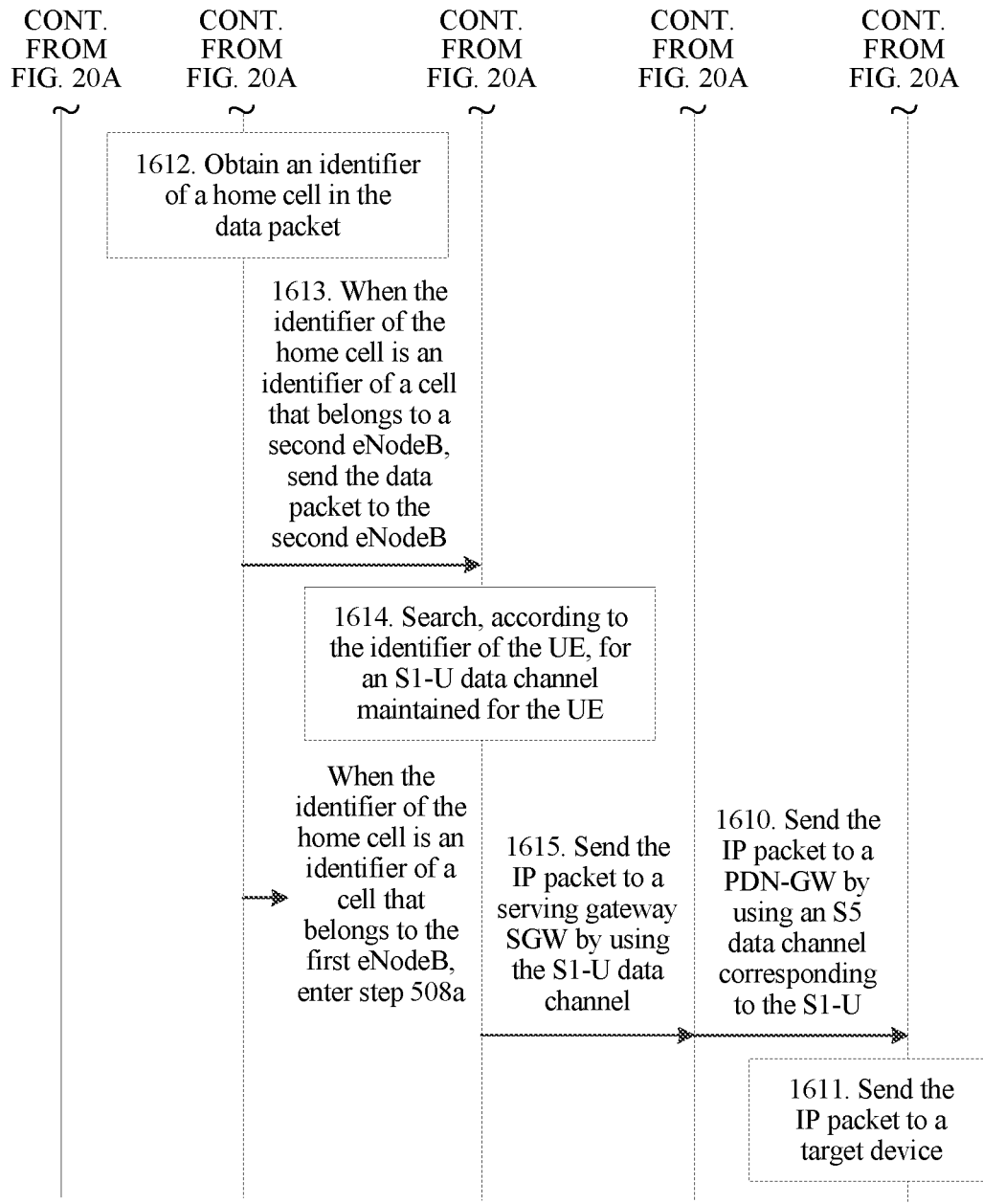
Figure 21A:
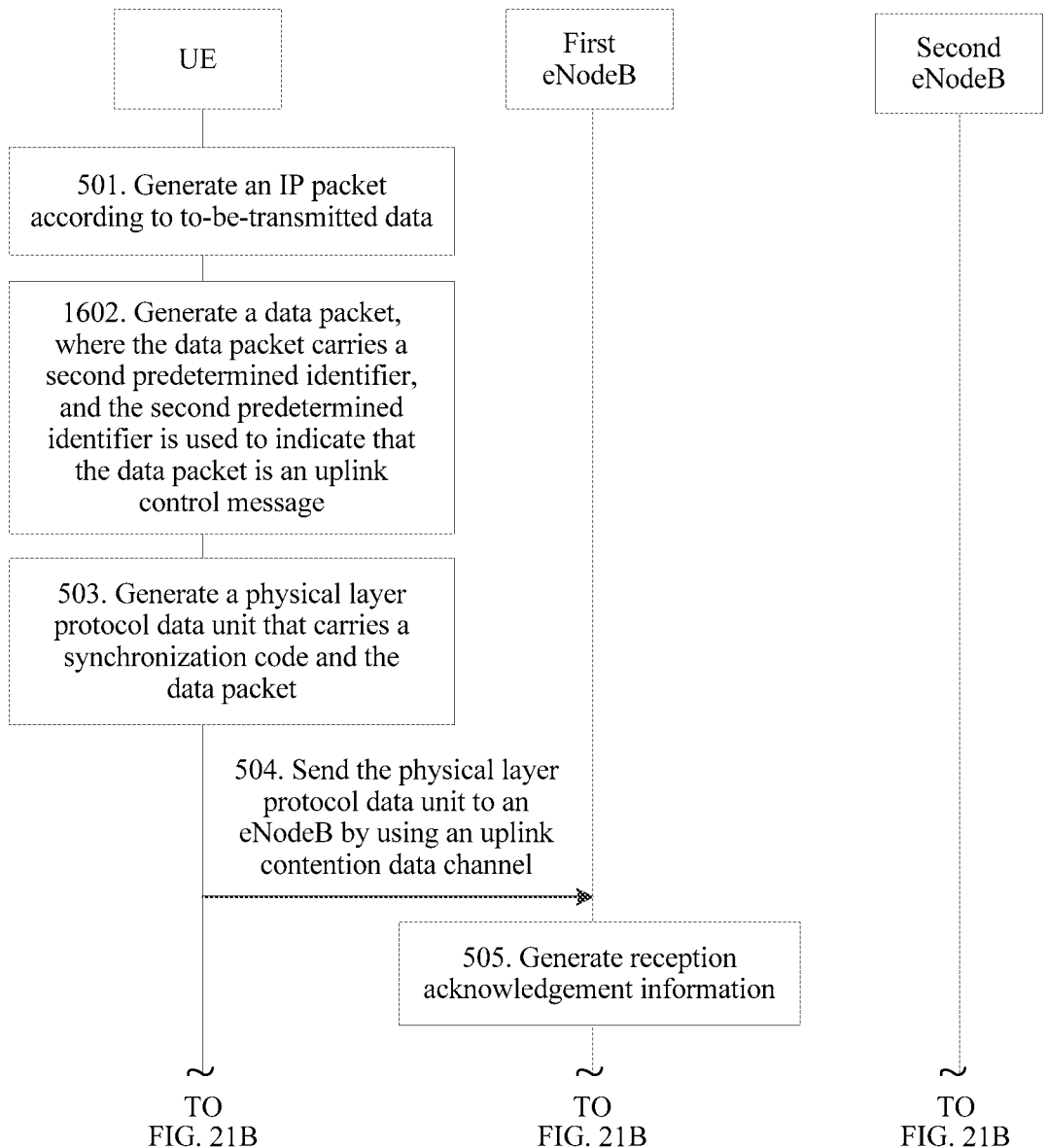
FIG. 21A and FIG. 21B are a flowchart of a data sending method according to another embodiment of the present invention.
Figure 21B:
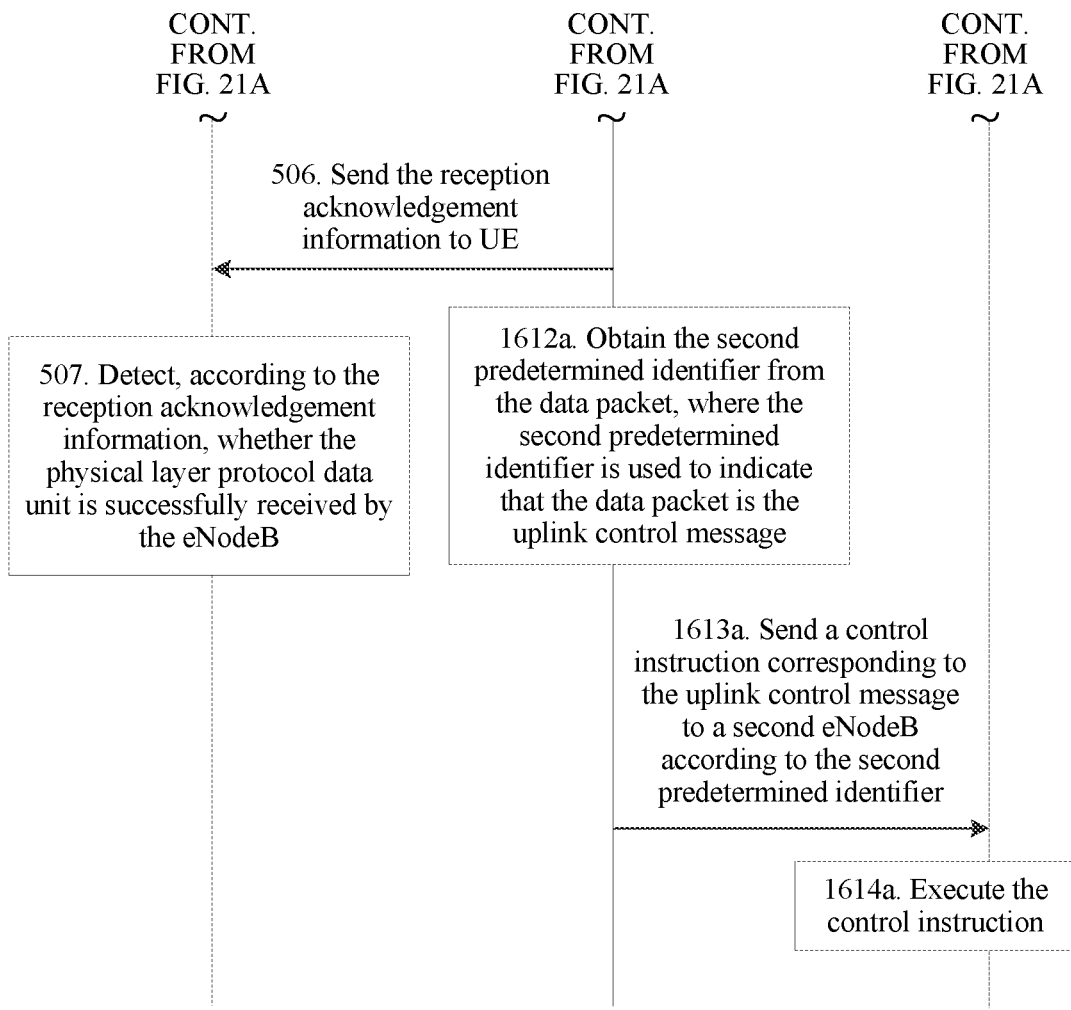

Alternatively, the data packet may be used by the UE as an uplink control message. As shown in FIG. 21A and FIG. 21B, step 1602a in FIG. 20A may be replaced with step 1602b, and step 1612, step 1613, step 1614, and step 1615 in FIG. 20B may be respectively replaced with step 1612a, step 1613a, and step 1614a.

Step 1602b: The UE generates a data packet, where the data packet carries a second predetermined identifier, and the second predetermined identifier is used to indicate that the data packet is an uplink control message.

In some embodiments, the second predetermined identifier exists in a form of an extension header of the data packet. The second predetermined identifier may be a predetermined identifier of a home cell and/or a predetermined identifier of the UE.

For example, the second predetermined identifier is a C-RNTI whose corresponding bits in the extension header are all 1, and the second predetermined identifier indicates that the UE has moved out of a cell range of the current C-RNTI. In addition, the extension header also carries an identifier of a home cell.

Step 1612a: A first eNodeB obtains the second predetermined identifier from the data packet, where the second predetermined identifier is used to indicate that the data packet is the uplink control message.

In some embodiments, the first eNodeB obtains, from the data packet, the C-RNTI whose corresponding bits in the extension header are all 1. Because the C-RNTI whose corresponding bits in the extension header are all 1 indicates that the UE has moved out of the cell range of the current C-RNTI, the eNodeB finds another eNodeB according to the identifier of the home cell.

Step 1613*a*: The first eNodeB sends, to a second eNodeB according to the second predetermined identifier, a control instruction corresponding to the uplink control message.

The first eNodeB sends the control instruction to the second eNodeB. The control instruction is used to instruct the another eNodeB to release the C-RNTI, a corresponding S1-U data channel, and the like.

Step 1614*a*: The second eNodeB executes the control instruction.

Persons skilled in the art may foresee that a function of the control instruction may not be limited to the foregoing example.

It should be further additionally noted that, as an exception of the foregoing embodiments, in a scenario in which the UE does not move, that is, uplink timing advance of the UE remains unchanged, and/or a cell coverage area is extremely small and the uplink timing advance is fixed at 0, because the uplink timing advance of the UE is known, the UE may generate a physical-layer-protocol-data-unit that carries only a data packet and does not carry a synchronization code.

The following describes apparatus embodiments of the present invention. For content that is not described in detail in the apparatus embodiments, refer to the foregoing corresponding method embodiments respectively.

Figure 22:
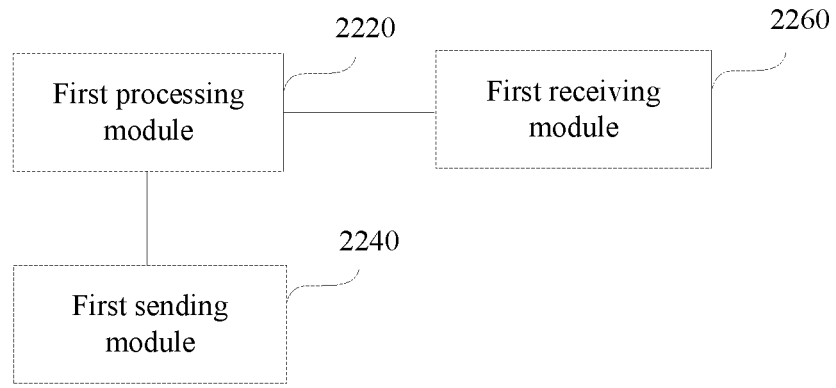
FIG. 22 is a structural block diagram of a data sending apparatus according to an embodiment of the present invention.

Referring to FIG. 22, FIG. 22 is a structural block diagram of a data sending apparatus according to an embodiment of the present invention. The data sending apparatus may be implemented as all or a part of UE by using software, hardware, or a combination of the software and the hardware. The apparatus includes:

a first processing module 2220, configured to generate a physical-layer-protocol-data-unit that carries a data packet;

a first sending module 2240, configured to send the physical-layer-protocol-data-unit to a radio access network element by using an uplink contention data channel, where the uplink contention data channel is a channel where uplink data is transmitted based on contention; and a first receiving module 2260, configured to receive reception acknowledgement information sent by the radio access network element, where the reception acknowledgement information carries all or some data content of the physical-layer-protocol-data-unit.

In conclusion, the data sending apparatus provided in this embodiment can complete, by using only two interaction steps instead of six steps in the prior art, a process of sending a data packet to an eNodeB. Even a random access process in the six steps in the prior art includes four interaction steps, and by contrast, in this embodiment, signaling that needs to be consumed on the eNodeB side when the UE sends data can be significantly reduced. This is relatively suitable for a scenario in which small data or occasional data is sent.

In an optional embodiment provided based on the embodiment shown in FIG. 22, the first processing module 2220 is further configured to: when uplink timing advance is known, generate a physical-layer-protocol-data-unit that carries only the data packet.

Alternatively, the first processing module 2220 is further configured to: when the uplink timing advance is unknown, generate a physical-layer-protocol-data-unit that carries a synchronization code and the data packet.

In an optional embodiment provided based on the embodiment shown in FIG. 22, the first processing module 2220 is further configured to select the synchronization code according to a service type of the data packet. Different service types correspond to respective synchronization codes.

The first processing module 2220 is further configured to generate the physical-layer-protocol-data-unit that carries the selected synchronization code and the data packet.

In an optional embodiment provided based on the embodiment shown in FIG. 22, the first processing module 2220 is further configured to select a time-frequency resource location on the uplink contention data channel according to the service type of the data packet. Different service types correspond to respective time-frequency resource locations. The first sending module 2240 is further configured to send the physical-layer-protocol-data-unit to the radio access network element at the selected time-frequency resource location.

Alternatively, the first processing module 2220 is further configured to select a time-frequency resource location on the uplink contention data channel according to a modulation and coding scheme of the data packet. Different modulation and coding schemes correspond to respective time-frequency resource locations.

The first sending module 2240 is further configured to send the physical-layer-protocol-data-unit to the radio access network element at the selected time-frequency resource location.

In an optional embodiment provided based on the embodiment shown in FIG. 22, the data packet carries any one of the following types or any combination of the following types:

an IP packet;

an IP packet and an identifier of the UE;

an IP packet, an identifier of the UE, and an identifier of a home cell of the UE;

an IP packet and a first predetermined identifier, where the first predetermined identifier is used to indicate a target mobility management entity MME; or a second predetermined identifier, where the second predetermined identifier is used to indicate that the data packet is an uplink control message.

In an optional embodiment provided based on the embodiment shown in FIG. 22, the first receiving module 2260 is further configured to detect, according to the reception acknowledgement information, whether the physical-layer-protocol-data-unit is successfully received by the radio access network element.

The first sending module 2240 is further configured to: if the physical-layer-protocol-data-unit is not successfully received by the radio access network element, resend the physical-layer-protocol-data-unit to the radio access network element.

In an optional embodiment provided based on the embodiment shown in FIG. 22, the first sending module 2240 is further configured to resend the physical-layer-protocol-data-unit to the radio access network element by using the uplink contention data channel.

Alternatively, the first sending module 2240 is further configured to: obtain, from the reception acknowledgement information, an uplink resource and/or an uplink timing calibration value that are/is allocated by the radio access network element, and resend the physical-layer-protocol-data-unit to the radio access network element according to the uplink resource and/or the uplink timing calibration.

In an optional embodiment provided based on the embodiment shown in FIG. 22, the reception acknowledgement information further carries:

information about the time-frequency resource location occupied when the physical-layer-protocol-data-unit is transmitted on the uplink contention data channel, or information about the synchronization code.

Figure 23:
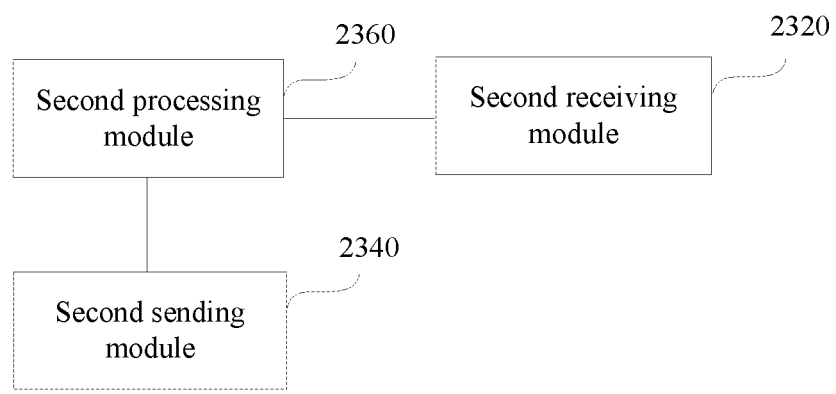
FIG. 23 is a structural block diagram of a data sending apparatus according to another embodiment of the present invention.

Referring to FIG. 23, FIG. 23 is a structural block diagram of a data sending apparatus according to an embodiment of the present invention. The apparatus includes:

a second receiving module 2320, configured to receive, by using an uplink contention data channel, a physical-layer-protocol-data-unit sent by UE, where the uplink contention data channel is a channel where uplink data is transmitted based on contention;

a second sending module 2340, configured to send reception acknowledgement information to the UE, where the reception acknowledgement information carries all or some data content of the physical-layer-protocol-data-unit; and a second processing module 2360, configured to obtain a data packet from the physical-layer-protocol-data-unit.

The second processing module 2360 is further configured to determine a downstream network element according to information carried in the physical-layer-protocol-data-unit or a time-frequency resource location occupied when the physical-layer-protocol-data-unit is transmitted.

The second sending module 2340 is further configured to send the data packet to the downstream network element.

In conclusion, the data sending apparatus provided in this embodiment can complete, by using only two interaction steps instead of six steps in the prior art, a process of sending a data packet by UE. Even a random access process in the six steps in the prior art includes four interaction steps, and by contrast, in this embodiment, signaling that needs to be consumed on an eNodeB when the UE sends data can be significantly reduced. This is relatively suitable for a scenario in which small data or occasional data is sent.

In an optional embodiment provided based on the embodiment shown in FIG. 23, the second processing module 2360 is further configured to: when uplink timing advance is known, directly obtain the data packet from the physical-layer-protocol-data-unit.

Alternatively, the second processing module 2360 is further configured to: when the uplink timing advance is unknown, perform uplink synchronization by using a synchronization code carried in the physical-layer-protocol-data-unit, and obtain the data packet from the physical-layer-protocol-data-unit after the uplink synchronization is completed.

In an optional embodiment provided based on the embodiment shown in FIG. 23, the reception acknowledgement information further carries:

information about the time-frequency resource location occupied when the physical-layer-protocol-data-unit is transmitted on the uplink contention data channel, or information about the synchronization code.

In an optional embodiment provided based on the embodiment shown in FIG. 23, the second processing module 2360 is configured to: when failing to obtain the data packet from the physical-layer-protocol-data-unit, allocate an uplink transmission resource and/or an uplink timing calibration value to the UE. The uplink transmission resource and/or the uplink timing calibration value are/is used to retransmit the physical-layer-protocol-data-unit.

The second processing module 2360 is further configured to add the uplink transmission resource and/or the uplink timing calibration value to the reception acknowledgement information.

In an optional embodiment provided based on the embodiment shown in FIG. 23, the downstream network element is an MME.

The second processing module 2360 is configured to: obtain an identifier of the UE that is carried in the data packet, and determine an MME corresponding to the identifier of the UE as a target MME; or obtain a source IP address of an IP packet carried in the data packet, and determine an MME corresponding to the source IP address as the target MME; or obtain a first predetermined identifier carried in the data packet, and determine an MME corresponding to the first predetermined identifier as the target MME; or determine, as the target MME, an MME corresponding to the synchronization code carried in the physical-layer-protocol-data-unit; or determine, as the target MME, an MME corresponding to the time-frequency resource location occupied when the physical-layer-protocol-data-unit is transmitted.

The second sending module 2340 is configured to send the data packet to the target MME.

In an optional embodiment provided based on the embodiment shown in FIG. 23, the second sending module 2340 is configured to send the data packet to the target MME by using an S1-MME data channel corresponding to the UE.

Alternatively, the second sending module 2340 is configured to send the data packet to the target MME by using a newly added data channel between the data sending apparatus and the target MME.

In an optional embodiment provided based on the embodiment shown in FIG. 23, the downstream network element is a data gateway.

The second processing module 2360 is configured to obtain the IP packet from the data packet.

The second processing module 2360 is configured to determine the data gateway according to an identifier of the UE that is carried in the data packet or a source IP address of the IP packet.

The second sending module 2340 is configured to send the IP packet to the data gateway.

In an optional embodiment provided based on the embodiment shown in FIG. 23, the data gateway is:

a PDN-GW; or a local gateway of the radio access network element.

In an optional embodiment provided based on the embodiment shown in FIG. 23, the data gateway is the PDN-GW.

The second processing module 2360 is configured to search, according to the identifier of the UE, for an S1-U data channel maintained for the UE. The second sending module 2340 is configured to send the IP packet to a serving gateway SGW by using the S1-U data channel, so that the SGW sends the IP packet to the PDN-GW by using an S5 data channel corresponding to the S1-U data channel, and the PDN-GW sends the IP packet to a target device.

Alternatively, the second processing module 2360 is configured to search, according to the source IP address of the IP packet, for a target PDN-GW corresponding to the IP packet. The second sending module 2340 is configured to send the IP packet to the target PDN-GW by using a first data channel established between the data sending apparatus and the target PDN-GW, so that the target PDN-GW sends the IP packet to a target device.

Alternatively, the second processing module 2360 is configured to search, according to the source IP address of the IP packet, for a target SGW corresponding to the IP packet. The second sending module 2340 is configured to send the IP packet to the target S-GW by using a second data channel established between the data sending apparatus and the target SGW, so that the target S-GW sends the IP packet to the target PDN-GW by using a third data channel established between the target S-GW and the target PDN-GW, and the target PDN-GW sends the IP packet to a target device.

Alternatively, the second processing module 2360 is configured to search, according to the source IP address of the IP packet, for a target SGW and a target PDN-GW that correspond to the IP packet. The second sending module 2340 is configured to send the IP packet to the target S-GW by using a routing function, so that the target S-GW sends the IP packet to the target PDN-GW by using a routing function, and the target PDN-GW sends the IP packet to a target device.

In an optional embodiment provided based on the embodiment shown in FIG. 23, the downstream network element is a second radio access network element connected to the radio access network element.

The second processing module 2360 is configured to obtain an identifier of a home cell of the UE from the data packet.

The second sending module 2340 is configured to: when the identifier of the home cell is an identifier of a cell that belongs to the second radio access network element, send the data packet to the second radio access network element, so that the second radio access network element searches, according to an identifier of the UE, for an S1-U data channel maintained for the UE, the second radio access network element sends the IP packet to a serving gateway SGW by using the S1-U data channel, the SGW sends the IP packet to a PDN-GW by using an S5 data channel corresponding to the UE, and the PDN-GW sends the IP packet to a target device.

In an optional embodiment provided based on the embodiment shown in FIG. 23, the downstream network element is a second radio access network element.

The second processing module 2360 is configured to obtain a second predetermined identifier from the data packet. The second predetermined identifier is used to indicate that the data packet is an uplink control message.

The second sending module 2340 is configured to send, to the second radio access network element according to the second predetermined identifier, a control instruction corresponding to the uplink control message.

Figure 24:
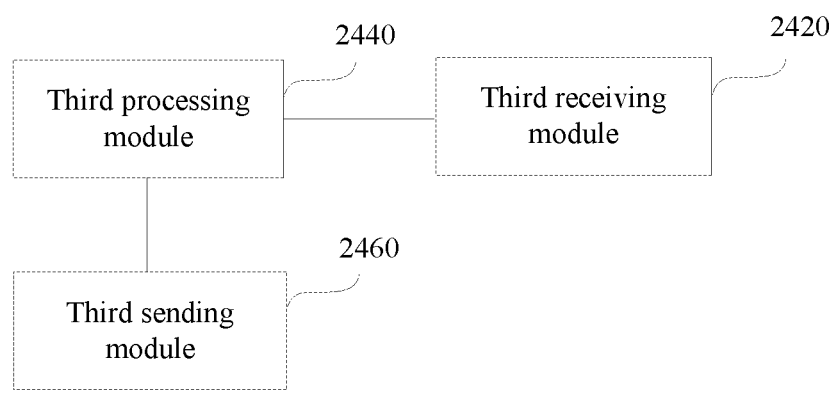
FIG. 24 is a structural block diagram of a data sending apparatus according to another embodiment of the present invention.

Referring to FIG. 24, FIG. 24 is a structural block diagram of a data sending apparatus according to an embodiment of the present invention. The data sending apparatus may be implemented as all or a part of an MME by using software, hardware, or a combination of the software and the hardware. The apparatus includes:

a third receiving module 2420, configured to receive a data packet sent by a radio access network element, where the data packet is obtained by the radio access network element from a received physical-layer-protocol-data-unit, the physical-layer-protocol-data-unit is sent by user equipment UE to the radio access network element by using an uplink contention data channel, and the uplink contention data channel is a channel where uplink data is transmitted based on contention;

a third processing module 2440, configured to obtain an IP packet from the data packet; and a third sending module 2460, configured to send the IP packet to a destination device by using a data gateway.

In an optional embodiment provided based on the embodiment shown in FIG. 24, the third receiving module 2420 is configured to receive the data packet by using an S1-MME data channel corresponding to the UE.

Alternatively, the third receiving module 2420 is configured to receive the data packet by using a newly added data channel between the data sending apparatus and the radio access network element.

In an optional embodiment provided based on the embodiment shown in FIG. 24, the data gateway is:
 a PDN-GW; or
 a local gateway of the MME.

In an optional embodiment provided based on the embodiment shown in FIG. 24, the data gateway is the PDN-GW.

The third sending module 2460 is configured to send the IP packet to a serving gateway SGW by using an S11 data channel corresponding to the UE, so that the SGW sends the IP packet to the PDN-GW by using an S5 data channel corresponding to the UE, and the PDN-GW sends the IP packet to the target device.

Alternatively, the third processing module 2440 is configured to search, according to a source IP address of the IP packet, for a target PDN-GW corresponding to the IP packet. The third sending module 2460 is configured to send the IP packet to the target PDN-GW by using a fourth data channel established between the data sending apparatus and the target PDN-GW, so that the target PDN-GW sends the IP packet to the target device.

Alternatively, the third processing module 2440 is configured to search, according to a source IP address of the IP packet, for a target SGW corresponding to the IP packet. The third sending module 2460 is configured to send the IP packet to the target S-GW by using a fifth data channel established between the data sending apparatus and the target SGW, so that the target S-GW sends the IP packet to a target PDN-GW by using a sixth data channel established between the target S-GW and the target PDN-GW, and the target PDN-GW sends the IP packet to the target device.

Alternatively, the third processing module 2440 is configured to search, according to a source IP address of the IP packet, for a target SGW corresponding to the IP packet. The third sending module 2460 is configured to send the IP packet to the target S-GW by using a routing function, so that the target S-GW sends the IP packet to a target PDN-GW by using a routing function, and the target PDN-GW sends the IP packet to the target device.

It should be noted that, when the data sending apparatus provided in the foregoing embodiments sends uplink data, division of the foregoing function modules is only used as an example for description. In practical application, the foregoing functions may be allocated to different function modules for implementation as required. That is, an internal structure of a device is divided into different function modules, so as to implement all or some of the functions described above. In addition, the data sending apparatus provided in the foregoing embodiments is based on a same concept as the embodiments of the data sending method. For a specific implementation process, refer to the method embodiments. Details are not repeatedly described herein.

The first processing module, the second processing module, and the third processing module may be implemented by a processor by executing an instruction in a memory. The first sending module, the second sending module, and the third sending module may be implemented by a processor by controlling a transceiver or a transmitter. The first receiving module, the second receiving module, and the third receiving module may be implemented by a processor by controlling a transceiver or a receiver.

Figure 25:
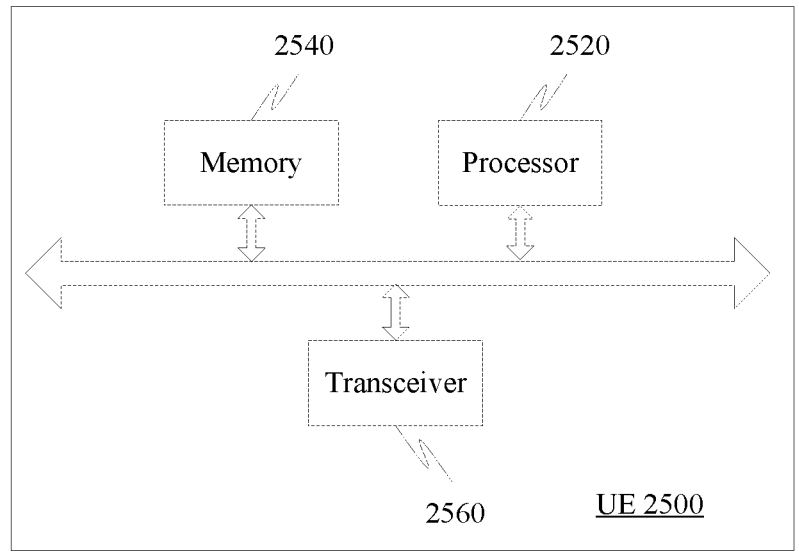
FIG. 25 is a structural block diagram of UE according to another embodiment of the present invention.

Referring to FIG. 25, FIG. 25 is a structural block diagram of UE 2500 according to an embodiment of the present invention. The UE 2500 includes a processor 2520, a memory 2540, and a transceiver 2560. The memory 2540 is configured to store at least one instruction, and as configured, the instruction is executed by the processor 2520.

The processor 2520 is configured to generate a physical-layer-protocol-data-unit that carries a data packet.

The processor 2520 is configured to control the transceiver 2560 to send the physical-layer-protocol-data-unit to a radio access network element by using an uplink contention data channel. The uplink contention data channel is a channel where uplink data is transmitted based on contention.

The processor 2520 is configured to control the transceiver 2560 to receive reception acknowledgement information sent by the radio access network element. The reception acknowledgement information carries all or some data content of the physical-layer-protocol-data-unit.

In an optional embodiment provided based on the embodiment shown in FIG. 25, the processor 2520 is configured to: when uplink timing advance is known, generate a physical-layer-protocol-data-unit that carries only the data packet.

Alternatively, the processor 2520 is configured to: when the uplink timing advance is unknown, generate a physical-layer-protocol-data-unit that carries a synchronization code and the data packet.

In an optional embodiment provided based on the embodiment shown in FIG. 25, the processor 2520 is configured to select the synchronization code according to a service type of the data packet. Different service types correspond to respective synchronization codes.

The processor 2520 is configured to generate the physical-layer-protocol-data-unit that carries the selected synchronization code and the data packet.

In an optional embodiment provided based on the embodiment shown in FIG. 25, the processor 2520 is configured to select a time-frequency resource location on the uplink contention data channel according to the service type of the data packet. Different service types correspond to respective time-frequency resource locations. The processor 2520 is configured to control the transceiver 2560 to send the physical-layer-protocol-data-unit to the radio access network element at the selected time-frequency resource location.

Alternatively, the processor 2520 is configured to select a time-frequency resource location on the uplink contention data channel according to an MCS of the data packet. Different MCSs correspond to respective time-frequency resource locations. The processor 2520 is configured to control the transceiver 2560 to send the physical-layer-protocol-data-unit to the radio access network element at the selected time-frequency resource location.

In some embodiments, the data packet carries any one of the following types or any combination of the following types:

an IP packet;

an IP packet and an identifier of the UE;

an IP packet, an identifier of the UE, and an identifier of a home cell of the UE;

an IP packet and a first predetermined identifier, where the first predetermined identifier is used to indicate a target mobility management entity MME; or a second predetermined identifier, where the second predetermined identifier is used to indicate that the data packet is an uplink control message.

In an optional embodiment provided based on the embodiment shown in FIG. 25, the processor 2520 is configured to detect, according to the reception acknowledgement information, whether the physical-layer-protocol-data-unit is successfully received by the radio access network element.

The processor 2520 is configured to: if the physical-layer-protocol-data-unit is not successfully received by the radio access network element, res end the physical-layer-protocol-data-unit to the radio access network element.

In an optional embodiment provided based on the embodiment shown in FIG. 25, the processor 2520 is configured to resend the physical-layer-protocol-data-unit to the radio access network element by using the uplink contention data channel.

Alternatively, the processor 2520 is configured to: obtain, from the reception acknowledgement information, an uplink resource and/or an uplink timing calibration value that are/is allocated by the radio access network element, and resend the physical-layer-protocol-data-unit to the radio access network element according to the uplink resource and/or the uplink timing calibration.

In an optional embodiment provided based on the embodiment shown in FIG. 25, the reception acknowledgement information further carries:

information about the time-frequency resource location occupied when the physical-layer-protocol-data-unit is transmitted on the uplink contention data channel, or information about the synchronization code.

Figure 26:
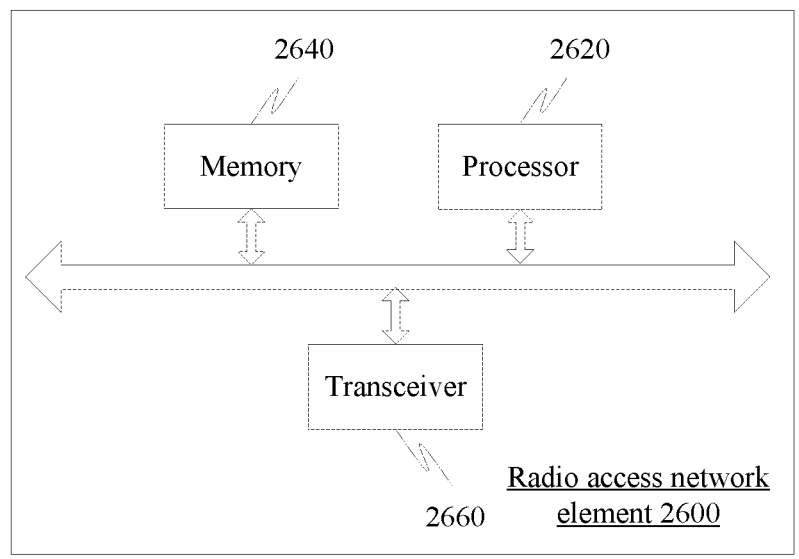
FIG. 26 is a structural block diagram of a radio access network element according to another embodiment of the present invention.

Referring to FIG. 26, FIG. 26 is a structural block diagram of a radio access network element 2600 according to an embodiment of the present invention. The radio access network element 2600 includes a processor 2620, a memory 2640, and a transceiver 2660. The memory 2640 is configured to store at least one instruction, and as configured, the instruction is executed by the processor 2620.

The processor 2620 is configured to receive, by using an uplink contention data channel, a physical-layer-protocol-data-unit sent by user equipment UE. The uplink contention data channel is a channel where uplink data is transmitted based on contention.

The processor 2620 is configured to obtain a data packet from the physical-layer-protocol-data-unit.

The processor 2620 is configured to control the transceiver 2660 to send reception acknowledgement information to the UE. The reception acknowledgement information carries all or some data content of the physical-layer-protocol-data-unit.

The processor 2620 is configured to determine a downstream network element according to information carried in the physical-layer-protocol-data-unit or a time-frequency resource location occupied when the physical-layer-protocol-data-unit is transmitted.

The processor 2620 is configured to control the transceiver 2660 to send the data packet to the downstream network element.

In an optional embodiment provided based on the embodiment shown in FIG. 26, the processor 2620 is configured to: when uplink timing advance is known, directly obtain the data packet from the physical-layer-protocol-data-unit.

Alternatively, the processor 2620 is configured to: when the uplink timing advance is unknown, perform uplink synchronization by using a synchronization code carried in the physical-layer-protocol-data-unit, and obtain the data packet from the physical-layer-protocol-data-unit after the uplink synchronization is completed.

In some embodiments, the reception acknowledgement information further carries:

information about the time-frequency resource location occupied when the physical-layer-protocol-data-unit is transmitted on the uplink contention data channel, or information about the synchronization code.

In an optional embodiment provided based on the embodiment shown in FIG. 26, the processor 2620 is configured to: when failing to obtain the data packet from the physical-layer-protocol-data-unit, allocate an uplink transmission resource and/or an uplink timing calibration value to the UE. The uplink transmission resource and/or the uplink timing calibration value are/is used to retransmit the physical-layer-protocol-data-unit.

The processor 2620 is configured to add the uplink transmission resource and/or the uplink timing calibration value to the reception acknowledgement information.

In an optional embodiment provided based on the embodiment shown in FIG. 26, the downstream network element is an MME.

That the processor 2620 is configured to determine a downstream network element according to information carried in the physical-layer-protocol-data-unit or a time-frequency resource location occupied when the physical-layer-protocol-data-unit is transmitted includes:

the processor 2620 is configured to: obtain an identifier of the UE that is carried in the data packet, and determine an MME corresponding to the identifier of the UE as a target MME; or the processor 2620 is configured to: obtain a source IP address of an IP packet carried in the data packet, and determine an MME corresponding to the source IP address as the target MME; or the processor 2620 is configured to: obtain a first predetermined identifier carried in the data packet, and determine an MME corresponding to the first predetermined identifier as the target MME; or the processor 2620 is configured to determine, as the target MME, an MME corresponding to the synchronization code carried in the physical-layer-protocol-data-unit; or the processor 2620 is configured to determine, as the target MME, an MME corresponding to the time-frequency resource location occupied when the physical-layer-protocol-data-unit is transmitted.

The processor 2620 is configured to control the transceiver 2660 to send the data packet to the target MME.

In an optional embodiment provided based on the embodiment shown in FIG. 26, the processor 2620 is configured to control the transceiver 2660 to send the data packet to the target MME by using an S1-MME data channel corresponding to the UE.

Alternatively, the processor 2620 is configured to control the transceiver 2660 to send the data packet to the target MME by using a newly added data channel between the radio access network element 2600 and the target MME.

In an optional embodiment provided based on the embodiment shown in FIG. 26, the downstream network element is a data gateway.

The processor 2620 is configured to obtain the IP packet from the data packet.

The processor 2620 is configured to determine the data gateway according to an identifier of the UE that is carried in the data packet or a source IP address of the IP packet.

The processor 2620 is configured to control the transceiver 2660 to send the IP packet to the data gateway.

In some embodiments, the data gateway is a PDN-GW or a local gateway of the radio access network element.

In an optional embodiment provided based on the embodiment shown in FIG. 26, the data gateway is the packet data network gateway PDN-GW.

The processor 2620 is configured to: search, according to the identifier of the UE, for an S1-U data channel maintained for the UE, and send the IP packet to a serving gateway SGW by using the S1-U data channel, so that the SGW sends the IP packet to the PDN-GW by using an S5 data channel corresponding to the S1-U data channel, and the PDN-GW sends the IP packet to a target device.

Alternatively, the processor 2620 is configured to: search, according to the source IP address of the IP packet, for a target PDN-GW corresponding to the IP packet, and control the transceiver 2660 to send the IP packet to the target PDN-GW by using a first data channel established between the radio access network element 2600 and the target PDN-GW, so that the target PDN-GW sends the IP packet to a target device.

Alternatively, the processor 2620 is configured to: search, according to the source IP address of the IP packet, for a target SGW corresponding to the IP packet, and control the transceiver 2660 to send the IP packet to the target S-GW by using a second data channel established between the radio access network element 2600 and the target SGW, so that the target S-GW sends the IP packet to the target PDN-GW by using a third data channel established between the target S-GW and the target PDN-GW, and the target PDN-GW sends the IP packet to a target device.

Alternatively, the processor 2620 is configured to: search, according to the source IP address of the IP packet, for a target SGW and a target PDN-GW that correspond to the IP packet, and control the transceiver 2660 to send the IP packet to the target S-GW by using a routing function, so that the target S-GW sends the IP packet to the target PDN-GW by using a routing function, and the target PDN-GW sends the IP packet to a target device.

In an optional embodiment shown in FIG. 26, the downstream network element is a second radio access network element connected to the radio access network element.

The processor 2620 is configured to obtain an identifier of a home cell of the UE from the data packet.

The processor 2620 is configured to: when the identifier of the home cell is an identifier of a cell that belongs to the second radio access network element, control the transceiver 2660 to send the data packet to the second radio access network element, so that the second radio access network element searches, according to an identifier of the UE, for an S1-U data channel maintained for the UE, the second radio access network element sends the IP packet to a serving gateway SGW by using the S1-U data channel, the SGW sends the IP packet to a PDN-GW by using an S5 data channel corresponding to the UE, and the PDN-GW sends the IP packet to a target device.

In an optional embodiment shown in FIG. 26, the downstream network element is a second radio access network element.

The processor 2620 is configured to obtain a second predetermined identifier from the data packet. The second predetermined identifier is used to indicate that the data packet is an uplink control message.

The processor 2620 is configured to control, according to the second predetermined identifier, the transceiver 2660 to send a control instruction corresponding to the uplink control message to the second radio access network element.

Figure 27:
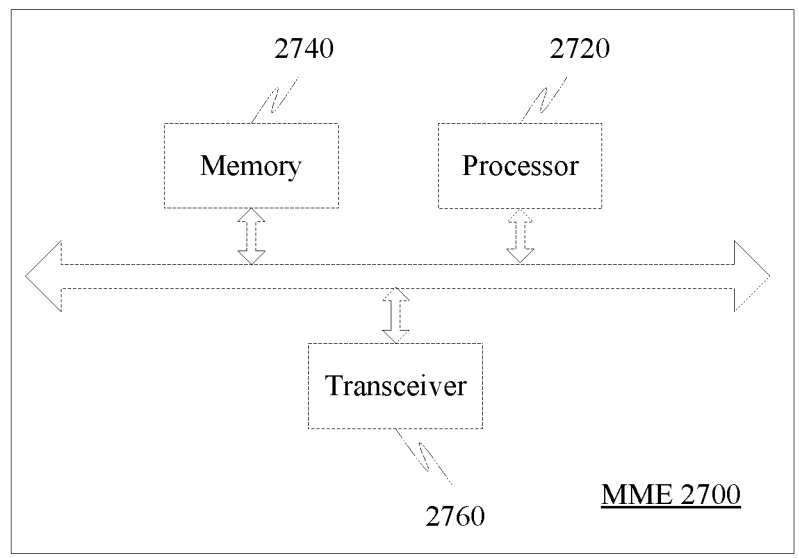
FIG. 27 is a structural block diagram of an MME according to another embodiment of the present invention.

Referring to FIG. 27, FIG. 27 is a schematic structural diagram of an MME 2700 according to an embodiment of the present invention. The MME 2700 includes a processor 2720, a memory 2740, and a transceiver 2760. The memory 2740 is configured to store at least one instruction, and as configured, the instruction is executed by the processor 2720.

The processor 2720 is configured to control the transceiver 2760 to receive a data packet sent by a radio access network element. The data packet is obtained by the radio access network element from a received physical-layer-protocol-data-unit. The physical-layer-protocol-data-unit is sent by user equipment UE to the radio access network element by using an uplink contention data channel. The uplink contention data channel is a channel where uplink data is transmitted based on contention.

The processor 2720 is configured to obtain an IP packet from the data packet.

The processor 2720 is configured to control the transceiver 2760 to send the IP packet to a destination device by using a data gateway.

In an optional embodiment provided based on the embodiment shown in FIG. 27, the processor 2720 is configured to control the transceiver 2760 to receive the data packet by using an S1-MME data channel corresponding to the UE.

Alternatively, the processor 2720 is configured to control the transceiver 2760 to receive the data packet by using a newly added data channel between the MME 2700 and the radio access network element.

In an optional embodiment provided based on the embodiment shown in FIG. 27, the data gateway is:
a PDN-GW or a local gateway of the MME.

In an optional embodiment provided based on the embodiment shown in FIG. 27, the data gateway is the PDN-GW.

The processor 2720 is configured to control the transceiver 2760 to send the IP packet to a serving gateway SGW by using an S11 data channel corresponding to the UE, so that the SGW sends the IP packet to the PDN-GW by using an S5 data channel corresponding to the UE, and the PDN-GW sends the IP packet to the target device.

Alternatively, the processor 2720 is configured to: search, according to a source IP address of the IP packet, for a target PDN-GW corresponding to the IP packet, and control the transceiver 2760 to send the IP packet to the target PDN-GW by using a fourth data channel established between the MME 2700 and the target PDN-GW, so that the target PDN-GW sends the IP packet to the target device.

Alternatively, the processor 2720 is configured to: search, according to a source IP address of the IP packet, for a target SGW corresponding to the IP packet, and control the transceiver 2760 to send the IP packet to the target S-GW by using a fifth data channel established between the MME 2700 and the target SGW, so that the target S-GW sends the IP packet to a target PDN-GW by using a sixth data channel established between the target S-GW and the target PDN-GW, and the target PDN-GW sends the IP packet to the target device.

Alternatively, the processor 2720 is configured to: search, according to a source IP address of the IP packet, for a target SGW corresponding to the IP packet, and control the transceiver 2760 to send the IP packet to the target S-GW by using a routing function, so that the target S-GW sends the IP packet to a target PDN-GW by using a routing function, and the target PDN-GW sends the IP packet to the target device.

The UE shown in FIG. 25 may be implemented as the UE shown in any one of FIG. 2A to FIG. 2G. The radio access network element shown in FIG. 26 may be implemented as the eNB shown in any one of FIG. 2A to FIG. 2G The MME shown in FIG. 27 may be implemented as the MME shown in any one of FIG. 2A, FIG. 2D, FIG. 2E, or FIG. 2F.

The sequence numbers of the foregoing embodiments of the present invention are only for description, and are not intended to indicate priorities of the embodiments.

Persons of ordinary skill in the art may understand that all or some of the steps of the foregoing embodiments may be implemented by hardware or a program instructing related hardware. The program may be stored in a computer-readable storage medium. The storage medium may include a read-only memory, a magnetic disk, or an optical disc.

The foregoing descriptions are only example embodiments of the present invention, but are not intended to limit the present invention. Any modification, equivalent replacement, and improvement made without departing from the spirit and principle of the present invention shall fall within the protection scope of the present invention.

What is claimed is:

1. A communication method, comprising:
    obtaining, by user equipment (UE), an available uplink time-frequency resource from broadcast information broadcast by a radio access network device;
    generating, by the UE, a physical-layer-protocol-data-unit that carries a data packet;
    selecting the available uplink time-frequency resource according to a service type of the data packet, wherein different service types correspond to respective uplink time-frequency resources;
    sending the physical-layer-protocol-data-unit to the radio access network device on the selected available uplink time-frequency resource; and
    receiving, by the UE, reception acknowledgement information sent by the radio access network device, wherein
    the reception acknowledgement information carries all or some data content of the physical-layer-protocol-data-unit,
    the reception acknowledgement information is used for determining whether the radio access network device has successfully received the physical-layer-protocol-data-unit, and different uplink time-frequency resources are preconfigured for at least one of different service types or for different modulation and coding schemes (MCS).

2. An apparatus applied for a mobile device, the apparatus comprising:
    a processor; and
    a memory configured to store computer readable instructions that, when executed by the processor, cause the apparatus to provide execution comprising:
        obtaining an available uplink time-frequency resource from broadcast information broadcast by a radio access network device;
        generating a physical-layer-protocol-data-unit that carries a data packet;
        selecting the available uplink time-frequency resource according to a service type of the data packet, wherein different service types correspond to respective available uplink time-frequency resources;

sending the physical-layer-protocol-data-unit to the radio access network device on the selected available uplink time-frequency resource; and receiving reception acknowledgement information sent by the radio access network device, wherein the reception acknowledgement information carries all or some data content of the physical-layer-protocol-data-unit, the reception acknowledgement information is used for determining whether the radio access network device has successfully received the physical-layer-protocol-data-unit, and different uplink time-frequency resources are preconfigured for at least one of different service types or for different modulation and coding schemes (MCS).

3. A non-transitory computer readable medium, applied for a mobile device, wherein the computer readable medium stores computer-executable instructions that, when executed by at least one processor, cause the at least one processor to provide execution comprising:

obtaining an available uplink time-frequency resource from broadcast information broadcast by a radio access network device;

generating a physical-layer-protocol-data-unit that carries a data packet;

selecting the available uplink time-frequency resource according to a service type of the data packet, wherein different service types correspond to respective available uplink time-frequency resources;

sending the physical-layer-protocol-data-unit to the radio access network device on the selected available uplink time-frequency resource; and receiving reception acknowledgement information sent by the radio access network device, wherein the reception acknowledgement information carries all or some data content of the physical-layer-protocol-data-unit, the reception acknowledgement information is used for determining whether the radio access network device has successfully received the physical-layer-protocol-data-unit, and different uplink time-frequency resources are preconfigured for at least one of different service types or for different modulation and coding schemes (MCS).

4. The communication method according to claim 1, further comprising:

when it is determined that the radio access network device has successfully received the physical-layer-protocol-data-unit, ending current transmission; or when it is determined that the radio access network device has not successfully received the physical-layer-protocol-data-unit, resending the physical-layer-protocol-data-unit to the radio access network on an available uplink time-frequency resource, wherein the available uplink time-frequency resource is broadcast by the radio access network device.

5. The non-transitory computer readable medium according to claim 3, wherein the at least one processor is further caused to provide execution comprising:

when it is determined that the radio access network device has successfully received the physical-layer-protocol-data-unit, ending current transmission; or when it is determined that the radio access network device has not successfully received the physical-layer-protocol-data-unit, resending the physical-layer-protocol-data-unit to the radio access network on an available uplink time-frequency resource, wherein the available uplink time-frequency resource is broadcast by the radio access network device.

6. The apparatus according to claim 2, wherein the apparatus is further caused to provide execution comprising:

when it is determined that the radio access network device has successfully received the physical-layer-protocol-data-unit, ending current transmission; or when it is determined that the radio access network device has not successfully received the physical-layer-protocol-data-unit, resending the physical-layer-protocol-data-unit to the radio access network on an available uplink time-frequency resource, wherein the available uplink time-frequency resource is broadcasted by the radio access network device.

7. The communication method according to claim 1, wherein the radio access network device determines a downstream network element according to information contained in the physical-layer-protocol-data-unit.

8. The communication method according to claim 1, wherein the physical-layer-protocol-data-unit is sent to the radio access network device using an uplink contention data channel.

9. The communication method according to claim 8, wherein the uplink contention data channel includes a first type of uplink contention data channel where the UE sends uplink data in a synchronous manner.

10. The communication method according to claim 8, wherein the uplink contention data channel includes a second type of uplink contention data channel where the UE sends uplink data in an asynchronous manner.

11. The communication method according to claim 9, wherein in the first type of uplink contention data channel, the UE uses an uplink subframe boundary or an Orthogonal Frequency Division Multiplexing (OFDM) symbol boundary as a start location of a data block carrying uplink data.

12. The communication method according to claim 10, wherein in the second type of uplink contention data channel, a start location of a data block is not limited by an uplink subframe boundary or an Orthogonal Frequency Division Multiplexing (OFDM) symbol boundary, and the data block may be sent at any time.

13. The communication method according to claim 1, wherein the data packet includes a non-access stratum (NAS) protocol data unit (PDU) message.

14. The communication method according to claim 1, wherein the physical-layer-protocol-data-unit carries a synchronization code and the data packet.

15. The communication method according to claim 1, wherein the physical-layer-protocol-data-unit carries transport information indicating a transport format of the data packet.

16. The communication method according to claim 1, wherein the UE selects the available uplink time-frequency resource based on a principle of proximity.

17. The communication method according to claim 1, wherein different synchronization codes are preconfigured for different service types.

18. The communication method according to claim 1, wherein a service type corresponds to a machine-to-machine (M2M) service when a subframe sequence number is an odd number on an uplink contention data channel, and the service type corresponds to a trunking service when the subframe sequence number is an even number on the uplink contention data channel.

* * * * *